US009852163B2

(12) United States Patent
Srivastava et al.

(10) Patent No.: US 9,852,163 B2
(45) Date of Patent: Dec. 26, 2017

(54) METHODS AND APPARATUS TO DE-DUPLICATE IMPRESSION INFORMATION

(71) Applicant: The Nielsen Company (US), LLC, Schaumburg, IL (US)

(72) Inventors: Seema Varma Srivastava, Sunnyvale, CA (US); Antonia Toupet, Sunnyvale, CA (US); Peng Fei Yi, Shanghai (CN)

(73) Assignee: The Nielsen Company (US), LLC, New York, NY (US)

( * ) Notice: Subject to any disclaimer, the term of this patent is extended or adjusted under 35 U.S.C. 154(b) by 617 days.

(21) Appl. No.: 14/261,082

(22) Filed: Apr. 24, 2014

(65) Prior Publication Data
US 2015/0186403 A1  Jul. 2, 2015

Related U.S. Application Data

(60) Provisional application No. 61/922,090, filed on Dec. 30, 2013.

(51) Int. Cl.
    | | |
    |---|---|
    | G06F 17/30 | (2006.01) |
    | H04N 21/442 | (2011.01) |
    | H04N 21/658 | (2011.01) |

(52) U.S. Cl.
CPC . *G06F 17/30303* (2013.01); *H04N 21/44222* (2013.01); *H04N 21/6582* (2013.01)

(58) Field of Classification Search
None
See application file for complete search history.

(56) References Cited

U.S. PATENT DOCUMENTS

| | | |
|---|---|---|
| 5,584,050 A | 12/1996 | Lyons |
| 5,594,934 A | 1/1997 | Lu et al. |
| 5,675,510 A | 10/1997 | Coffey et al. |

(Continued)

FOREIGN PATENT DOCUMENTS

| | | |
|---|---|---|
| AU | 2013205736 | 5/2013 |
| CN | 1898662 | 1/2007 |

(Continued)

OTHER PUBLICATIONS

Patent Cooperation Treaty, "International Search Report," issued in connection with Application No. PCT/US2014/068621, dated Feb. 27, 2015, 3 pages.

(Continued)

*Primary Examiner* — Amresh Singh
(74) *Attorney, Agent, or Firm* — Hanley, Flight & Zimmerman, LLC

(57) ABSTRACT

Methods and apparatus to de-duplicate impression information are disclosed. An example method to de-duplicate media impression information includes determining an overlap between cookies of a first database proprietor and cookies of a second database proprietor on client computers; determining duplicate impression information based on first impression information associated with the first database proprietor, second impression information associated with the second database proprietor, and the overlap; and determining unduplicated impression information based on the duplicate impression information, the first impression information, and the second impression information.

20 Claims, 21 Drawing Sheets

(56) References Cited

U.S. PATENT DOCUMENTS

| | | |
|---|---|---|
| 5,796,952 A | 8/1998 | Davis et al. |
| 5,832,520 A | 11/1998 | Miller |
| 5,848,396 A | 12/1998 | Gerace |
| 5,870,740 A | 2/1999 | Rose et al. |
| 5,948,061 A | 9/1999 | Merriman et al. |
| 6,035,339 A | 3/2000 | Agraharam et al. |
| 6,052,730 A | 4/2000 | Felciano et al. |
| 6,055,573 A | 4/2000 | Gardenswartz et al. |
| 6,098,093 A | 8/2000 | Bayeh et al. |
| 6,102,406 A | 8/2000 | Miles et al. |
| 6,108,637 A | 8/2000 | Blumenau |
| 6,138,155 A | 10/2000 | Davis et al. |
| 6,141,694 A | 10/2000 | Gardner |
| 6,223,215 B1 | 4/2001 | Hunt et al. |
| 6,279,036 B1 | 8/2001 | Himmel et al. |
| 6,286,140 B1 | 9/2001 | Ivanyi |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,529,952 B1 | 3/2003 | Blumenau |
| 6,606,657 B1 | 8/2003 | Zilberstein et al. |
| 6,658,410 B1 | 12/2003 | Sakamaki et al. |
| 6,704,787 B1 | 3/2004 | Umbreit |
| 6,714,917 B1 | 3/2004 | Eldering et al. |
| 6,839,680 B1 | 1/2005 | Liu et al. |
| 6,877,007 B1 | 4/2005 | Hentzel et al. |
| 6,993,590 B1 | 1/2006 | Gauthier et al. |
| 7,039,699 B1 | 5/2006 | Narin et al. |
| 7,092,926 B2 | 8/2006 | Cerrato |
| 7,139,723 B2 | 11/2006 | Conkwright et al. |
| 7,146,329 B2 | 12/2006 | Conkwright et al. |
| 7,150,030 B1 | 12/2006 | Eldering et al. |
| 7,152,074 B2 | 12/2006 | Dettinger et al. |
| 7,159,023 B2 | 1/2007 | Tufts |
| 7,181,412 B1 | 2/2007 | Fulgoni et al. |
| 7,260,837 B2 | 8/2007 | Abraham et al. |
| 7,272,617 B1 | 9/2007 | Bayer et al. |
| 7,302,447 B2 | 11/2007 | Dettinger et al. |
| 7,343,417 B2 | 3/2008 | Baum |
| 7,363,643 B2 | 4/2008 | Drake et al. |
| 7,386,473 B2 | 6/2008 | Blumenau |
| 7,406,516 B2 | 7/2008 | Davis et al. |
| 7,546,370 B1 | 6/2009 | Acharya et al. |
| 7,590,568 B2 | 9/2009 | Blumenau |
| 7,613,635 B2 | 11/2009 | Blumenau |
| 7,634,786 B2 | 12/2009 | Knee et al. |
| 7,644,156 B2 | 1/2010 | Blumenau |
| 7,647,418 B2 | 1/2010 | Ash et al. |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,788,216 B2 | 8/2010 | Li et al. |
| 7,882,054 B2 | 2/2011 | Levitan |
| 7,882,242 B2 | 2/2011 | Chen |
| 7,890,451 B2 | 2/2011 | Cancel et al. |
| 7,925,694 B2 | 4/2011 | Harris |
| 7,941,525 B1 | 5/2011 | Yavilevich |
| 7,949,565 B1 | 5/2011 | Eldering et al. |
| 7,949,639 B2 | 5/2011 | Hunt et al. |
| 7,958,234 B2 | 6/2011 | Thomas et al. |
| 7,962,603 B1 | 6/2011 | Morimoto |
| 8,006,259 B2 | 8/2011 | Drake et al. |
| 8,046,255 B2 | 10/2011 | Bistriceanu et al. |
| 8,060,601 B1 | 11/2011 | Brown et al. |
| 8,087,041 B2 | 12/2011 | Fu et al. |
| 8,131,763 B2 | 3/2012 | Tuscano et al. |
| 8,131,861 B2 | 3/2012 | Butler et al. |
| 8,151,194 B1 | 4/2012 | Chan et al. |
| 8,180,112 B2 | 5/2012 | Kurtz et al. |
| 8,229,780 B2 | 7/2012 | Davidow et al. |
| 8,235,814 B2 | 8/2012 | Willis et al. |
| 8,266,687 B2 | 9/2012 | Baldry |
| 8,271,886 B2 | 9/2012 | Lee et al. |
| 8,280,683 B2 | 10/2012 | Finkler |
| 8,302,120 B2 | 10/2012 | Ramaswamy |
| 8,307,006 B2 | 11/2012 | Hannan et al. |
| 8,370,489 B2 | 2/2013 | Mazumdar et al. |
| 8,412,648 B2 | 4/2013 | Karypis et al. |
| 8,453,173 B1 | 5/2013 | Anderson et al. |
| 8,484,511 B2 | 7/2013 | Tidwell et al. |
| 8,495,198 B2 | 7/2013 | Sim et al. |
| 8,504,411 B1 | 8/2013 | Subasic et al. |
| 8,504,507 B1 | 8/2013 | Srinivasaiah |
| 8,543,454 B2 | 9/2013 | Fleischman et al. |
| 8,549,552 B2 | 10/2013 | Ramaswamy et al. |
| 8,600,796 B1 | 12/2013 | Sterne et al. |
| 8,631,122 B2 | 1/2014 | Kadam et al. |
| 8,688,852 B2 | 4/2014 | Guo et al. |
| 8,700,457 B2 | 4/2014 | Craft |
| 8,713,168 B2 | 4/2014 | Heffernan et al. |
| 8,751,461 B2 | 6/2014 | Abraham et al. |
| 8,775,332 B1 | 7/2014 | Morris et al. |
| 8,831,362 B1 | 9/2014 | Steffens |
| 8,843,626 B2 | 9/2014 | Mazumdar et al. |
| 8,898,689 B2 | 11/2014 | Georgakis |
| 8,909,771 B2 | 12/2014 | Heath |
| 8,910,195 B1 | 12/2014 | Barney et al. |
| 8,930,701 B2 | 1/2015 | Burbank et al. |
| 8,954,536 B2 | 2/2015 | Kalus et al. |
| 8,973,023 B1 | 3/2015 | Rao et al. |
| 8,984,547 B2 | 3/2015 | Lambert et al. |
| 9,055,122 B2 | 6/2015 | Grecco et al. |
| 9,117,217 B2 | 8/2015 | Wilson et al. |
| 2002/0099609 A1 | 7/2002 | Nascenzi et al. |
| 2003/0006911 A1 | 1/2003 | Smith et al. |
| 2003/0037131 A1 | 2/2003 | Verma |
| 2003/0046385 A1 | 3/2003 | Vincent |
| 2003/0065770 A1 | 4/2003 | Davis et al. |
| 2003/0074252 A1 | 4/2003 | Chandler-Pepelnjak et al. |
| 2003/0105604 A1 | 6/2003 | Ash et al. |
| 2003/0177488 A1 | 9/2003 | Smith et al. |
| 2003/0220901 A1 | 11/2003 | Carr et al. |
| 2004/0088212 A1 | 5/2004 | Hill |
| 2004/0107125 A1 | 6/2004 | Guheen et al. |
| 2004/0167763 A1 | 8/2004 | Liebman |
| 2004/0167928 A1 | 8/2004 | Anderson et al. |
| 2004/0186840 A1 | 9/2004 | Dettinger et al. |
| 2005/0166233 A1 | 7/2005 | Beyda et al. |
| 2005/0223093 A1 | 10/2005 | Hanson et al. |
| 2006/0074953 A1 | 4/2006 | Dettinger et al. |
| 2006/0089754 A1 | 4/2006 | Mortenson |
| 2006/0178996 A1 | 8/2006 | Matsushima et al. |
| 2006/0271641 A1 | 11/2006 | Stavrakos et al. |
| 2006/0294259 A1 | 12/2006 | Matefi et al. |
| 2007/0043769 A1 | 2/2007 | Kasahara et al. |
| 2007/0106787 A1 | 5/2007 | Blumenau |
| 2007/0106792 A1 | 5/2007 | Blumenau |
| 2007/0112714 A1 | 5/2007 | Fairweather |
| 2007/0156532 A1 | 7/2007 | Nyhan et al. |
| 2007/0198327 A1 | 8/2007 | Yazdani et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2008/0004958 A1 | 1/2008 | Ralph et al. |
| 2008/0086356 A1 | 4/2008 | Glassman et al. |
| 2008/0091639 A1 | 4/2008 | Davis et al. |
| 2008/0126420 A1 | 5/2008 | Wright et al. |
| 2008/0201427 A1 | 8/2008 | Chen |
| 2008/0201472 A1 | 8/2008 | Bistriceanu et al. |
| 2008/0222201 A1 | 9/2008 | Chen et al. |
| 2008/0235243 A1 | 9/2008 | Lee et al. |
| 2008/0248815 A1 | 10/2008 | Busch |
| 2008/0276179 A1 | 11/2008 | Borenstein et al. |
| 2008/0300965 A1 | 12/2008 | Doe |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0171762 A1 | 7/2009 | Alkove et al. |

(56) References Cited

U.S. PATENT DOCUMENTS

| | | |
|---|---|---|
| 2009/0217315 A1 | 8/2009 | Malik et al. |
| 2009/0292587 A1 | 11/2009 | Fitzgerald |
| 2009/0307084 A1 | 12/2009 | Monighetti et al. |
| 2009/0327026 A1 | 12/2009 | Bistriceanu et al. |
| 2010/0010866 A1 | 1/2010 | Bal et al. |
| 2010/0070621 A1 | 3/2010 | Urdan et al. |
| 2010/0088152 A1 | 4/2010 | Bennett |
| 2010/0088373 A1 | 4/2010 | Pinkham |
| 2010/0121676 A1 | 5/2010 | Jackson |
| 2010/0153175 A1 | 6/2010 | Pearson et al. |
| 2010/0153544 A1 | 6/2010 | Krassner et al. |
| 2010/0161385 A1 | 6/2010 | Karypis et al. |
| 2010/0191723 A1 | 7/2010 | Perez et al. |
| 2010/0205057 A1 | 8/2010 | Hook et al. |
| 2010/0241745 A1 | 9/2010 | Offen et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0281178 A1 | 11/2010 | Sullivan |
| 2010/0299604 A1 | 11/2010 | Blumenau |
| 2010/0312854 A1 | 12/2010 | Hyman |
| 2010/0313009 A1 | 12/2010 | Combet et al. |
| 2010/0325051 A1 | 12/2010 | Etchegoyen |
| 2011/0016482 A1 | 1/2011 | Tidwell et al. |
| 2011/0041062 A1 | 2/2011 | Singer et al. |
| 2011/0087519 A1 | 4/2011 | Fordyce, III et al. |
| 2011/0093327 A1 | 4/2011 | Fordyce, III et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |
| 2011/0153391 A1 | 6/2011 | Tenbrock |
| 2011/0157475 A1 | 6/2011 | Wright et al. |
| 2011/0191184 A1 | 8/2011 | Blackhurst et al. |
| 2011/0191664 A1 | 8/2011 | Sheleheda et al. |
| 2011/0191831 A1 | 8/2011 | Chan et al. |
| 2011/0196735 A1 | 8/2011 | von Sydow et al. |
| 2011/0202500 A1 | 8/2011 | Warn et al. |
| 2011/0208860 A1 | 8/2011 | Sim et al. |
| 2011/0231240 A1 | 9/2011 | Schoen et al. |
| 2011/0246297 A1 | 10/2011 | Buchalter et al. |
| 2011/0246306 A1 | 10/2011 | Blackhurst et al. |
| 2011/0246641 A1 | 10/2011 | Pugh et al. |
| 2011/0282730 A1 | 11/2011 | Tarmas |
| 2011/0288907 A1 | 11/2011 | Harvey et al. |
| 2012/0005213 A1 | 1/2012 | Hannan et al. |
| 2012/0030037 A1 | 2/2012 | Carriero |
| 2012/0042005 A1 | 2/2012 | Papakostas et al. |
| 2012/0072469 A1 | 3/2012 | Perez et al. |
| 2012/0109709 A1 | 5/2012 | Fordyce, III et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0143713 A1 | 6/2012 | Dittus et al. |
| 2012/0151079 A1 | 6/2012 | Besehanic et al. |
| 2012/0151322 A1 | 6/2012 | Lindsay et al. |
| 2012/0158490 A1 | 6/2012 | Neumeyer et al. |
| 2012/0158954 A1 | 6/2012 | Heffernan et al. |
| 2012/0166520 A1 | 6/2012 | Lindsay et al. |
| 2012/0173701 A1 | 7/2012 | Tenbrock |
| 2012/0185274 A1 | 7/2012 | Hu |
| 2012/0192214 A1 | 7/2012 | Hunn et al. |
| 2012/0206331 A1 | 8/2012 | Gandhi |
| 2012/0209920 A1 | 8/2012 | Neystadt et al. |
| 2012/0215621 A1 | 8/2012 | Heffernan et al. |
| 2012/0239407 A1 | 9/2012 | Lynch et al. |
| 2012/0239809 A1 | 9/2012 | Mazumdar et al. |
| 2012/0265606 A1 | 10/2012 | Patnode |
| 2012/0302222 A1 | 11/2012 | Williamson et al. |
| 2012/0310729 A1 | 12/2012 | Dalto et al. |
| 2012/0311017 A1 | 12/2012 | Sze et al. |
| 2013/0007794 A1 | 1/2013 | Besehanic et al. |
| 2013/0013308 A1 | 1/2013 | Cao et al. |
| 2013/0014144 A1 | 1/2013 | Bhatia et al. |
| 2013/0019262 A1 | 1/2013 | Bhatia et al. |
| 2013/0046615 A1 | 2/2013 | Liyanage |
| 2013/0060629 A1 | 3/2013 | Rangsikitpho et al. |
| 2013/0066713 A1 | 3/2013 | Umeda |
| 2013/0080263 A1 | 3/2013 | Goldman et al. |
| 2013/0097311 A1 | 4/2013 | Mazumdar et al. |
| 2013/0097312 A1 | 4/2013 | Mazumdar et al. |
| 2013/0117103 A1 | 5/2013 | Shimizu et al. |
| 2013/0124628 A1 | 5/2013 | Weerasinghe |
| 2013/0138506 A1 | 5/2013 | Zhu et al. |
| 2013/0138743 A1 | 5/2013 | Amento et al. |
| 2013/0145022 A1 | 6/2013 | Srivastava et al. |
| 2013/0159499 A1 | 6/2013 | Besehanic |
| 2013/0198125 A1* | 8/2013 | Oliver ............... G06Q 30/0246 706/46 |
| 2013/0204694 A1 | 8/2013 | Banister et al. |
| 2013/0212188 A1 | 8/2013 | Duterque et al. |
| 2013/0246389 A1 | 9/2013 | Osann, Jr. |
| 2013/0246609 A1 | 9/2013 | Topchy et al. |
| 2013/0262181 A1 | 10/2013 | Topchy et al. |
| 2013/0282898 A1 | 10/2013 | Kalus et al. |
| 2013/0290070 A1 | 10/2013 | Abraham et al. |
| 2013/0297411 A1 | 11/2013 | Van Datta et al. |
| 2013/0325588 A1 | 12/2013 | Kalyanam et al. |
| 2013/0331971 A1 | 12/2013 | Bida et al. |
| 2013/0332604 A1 | 12/2013 | Seth et al. |
| 2014/0033317 A1 | 1/2014 | Barber |
| 2014/0075004 A1 | 3/2014 | Van Dusen et al. |
| 2014/0108130 A1 | 4/2014 | Vos et al. |
| 2014/0122703 A1 | 5/2014 | Pugh et al. |
| 2014/0156761 A1 | 6/2014 | Heffernan et al. |
| 2014/0279074 A1 | 9/2014 | Chen et al. |
| 2014/0298025 A1 | 10/2014 | Burbank et al. |
| 2014/0324544 A1 | 10/2014 | Donato et al. |
| 2014/0324545 A1 | 10/2014 | Splaine et al. |
| 2014/0337104 A1 | 11/2014 | Splaine et al. |
| 2015/0019322 A1 | 1/2015 | Alla et al. |
| 2015/0019327 A1 | 1/2015 | Mazumdar et al. |
| 2015/0046579 A1 | 2/2015 | Perez et al. |
| 2015/0189500 A1 | 7/2015 | Bosworth et al. |
| 2015/0193816 A1 | 7/2015 | Toupet et al. |
| 2015/0262207 A1 | 9/2015 | Rao et al. |

FOREIGN PATENT DOCUMENTS

| | | |
|---|---|---|
| CN | 101077014 | 11/2007 |
| CN | 101222348 | 7/2008 |
| CN | 101505247 | 8/2009 |
| CN | 101536503 | 9/2009 |
| CN | 104520839 | 4/2015 |
| CN | 104541513 | 4/2015 |
| CN | 104584564 | 4/2015 |
| EP | 1379044 | 1/2004 |
| GB | 2176639 | 12/1986 |
| JP | 07262167 | 10/1995 |
| JP | 2001282982 | 10/2001 |
| JP | 2001357192 | 12/2001 |
| JP | 2002163562 | 6/2002 |
| JP | 2002373152 | 12/2002 |
| JP | 2004504674 | 2/2004 |
| JP | 2006127320 | 5/2006 |
| JP | 2006127321 | 5/2006 |
| JP | 2008234641 | 10/2008 |
| JP | 2010039845 | 2/2010 |
| JP | 2010257448 | 11/2010 |
| KR | 20020037980 | 5/2002 |
| KR | 20120091411 | 8/2002 |
| KR | 20090020558 | 2/2009 |
| KR | 20100094021 | 8/2010 |
| KR | 20110017895 | 2/2011 |
| KR | 20110023293 | 3/2011 |
| KR | 20120123148 | 11/2012 |
| WO | 9617467 | 6/1996 |
| WO | 9628904 | 9/1996 |
| WO | 9641495 | 12/1996 |
| WO | 9809447 | 3/1998 |
| WO | 0041115 | 7/2000 |
| WO | 0152168 | 7/2001 |
| WO | 0154034 | 7/2001 |
| WO | 0207054 | 1/2002 |
| WO | 03027860 | 4/2003 |

(56) References Cited

FOREIGN PATENT DOCUMENTS

| WO | 2005013072 | 2/2005 |
|---|---|---|
| WO | 2005024689 | 3/2005 |
| WO | 2008150575 | 12/2008 |
| WO | 2010088372 | 8/2010 |
| WO | 2010104285 | 9/2010 |
| WO | 2011097624 | 8/2011 |
| WO | 2012019643 | 2/2012 |
| WO | 2012040371 | 3/2012 |
| WO | 2012087954 | 6/2012 |
| WO | 2012128895 | 9/2012 |
| WO | 2012170902 | 12/2012 |
| WO | 2012177866 | 12/2012 |
| WO | 2013122907 | 8/2013 |
| WO | 2013188429 | 12/2013 |
| WO | 2014059319 | 4/2014 |
| WO | 2014176343 | 10/2014 |
| WO | 2014179218 | 11/2014 |
| WO | 2014182764 | 11/2014 |
| WO | 2015005957 | 1/2015 |
| WO | 2015023589 | 2/2015 |
| WO | 2015102796 | 7/2015 |
| WO | 2015102803 | 7/2015 |

OTHER PUBLICATIONS

Patent Cooperation Treaty, "Written Opinion," issued in connection with Application No. PCT/US2014/068621, dated Feb. 27, 2015, 7 pages.
Canadian Intellectual Property Office, "Examination Search Report," issued in connection with Application No. 2,810,541 dated Jan. 20, 2015, 3 pages.
The State Intellectual Property Office of China, "First Notification of Office Action," issued in connection with Application No. 201180045957.2, dated Nov. 15, 2014, 20 pages.
Japanese Patent Office, "Final Rejection," issued in connection with Japanese Patent Application No. P2014-005867 dated Aug. 26, 2014, 8 pages.
Japanese Patent Office, "Notice of Reasons for Rejection," issued in connection with Japanese Patent Application No. P2014-005867 dated Feb. 17, 2015, 6 pages.
Japanenese Patent Office, "Notice of Reasons for Rejection," issued in connection with Japanese Patenet Application No. P2014-005867 dated Apr. 15, 2014, 10 pages.
United States Patenet and Trademark Office, "Office Action," issued in connection with U.S. Appl. No. 14/500,297, dated Jan. 5, 2015, 7 pages.
Australian Government, IP Australia, "Patent Examination Report No. 1," issued in connection with Australian Patent Application No. 2013203898, dated Nov. 27, 2014, 4 pages.
Australian Government, IP Australia, "Patent Examination Report No. 1," issued in connection with application No. 2011305429 dated Apr. 17, 2014, 4 pages.
The State Intellectual Property Office of China, "First Notification of Office Action," issued in connection with Application No. 201180061437.0, dated Mar. 7, 2014, 11 pages.
The State Intellectual Property Office of China, "Second Notification of Office Action," issued in connection with Application No. 201180061437.0, dated Nov. 15, 2014, 6 pages.
Australian Government, IP Australia," Patent Examination Report No. 1," issued in connection with Application No. 2011374955, dated Sep. 25, 2014, 3 pages.
Canadian Intellectual Property Office, "Examination Search Report," issued in connection with Application No. 2,873,128, dated Jan. 7, 2015, 3 pages.
Patent Cooperation Treaty, "International Search Report," issued by the International Searching Authority in connection with PCT Application No. PCT/US2014/068165, dated Feb. 25, 2015, 3 pages.

Patent Cooperation Treaty, "Written Opinion of the International Searching Authority," issued by the International Searching Authority in connection with PCT Application No. PCT/US2014/06815, dated Feb. 25, 2015, 5 pages.
United States Patent and Trademark Office, "Non-Final Office Action," issued in connection with U.S. Appl. No. 13/756,493, dated Nov. 19, 2014, 13 pages.
Canadian Intellectual Property Office, Office Action, issued in connection with Canadian Patent Application No. 2,810,264, dated Nov. 27, 2014, 5 pages.
IP Australia, "Examination Report No. 2," issued in connection with application No. AU 2012231667, dated Feb. 10, 2015, 3 pages.
United States Patent and Trademark Office, "Notice of Allowance," issued in connection with U.S. Appl. No. 13/756,493, dated Mar. 17, 2015, 15 pages.
Patent Cooperation Treaty, "International Search Report," issued by the International Searching Authority in connection with PCT application No. PCT/US2014/068168, dated Mar. 2, 2015, 3 pages.
Patent Cooperation Treaty, "Written Opinion of the International Searching Authority," issued by the International Searching Authority in connection with PCT application No. PCT/US2014/068168, dated Mar. 2, 2015, 5 pages.
Patent Cooperation Treaty, "International Preliminary Report on Patentability," issued in connection with Application No. PCT/US2013/057045, dated Mar. 3, 2015, 1 page.
Patent Cooperation Treaty, "International Search Report," issued in connection with Application No. PCT/US2014/068623, dated Mar. 23, 2015, 3 pages.
Patent Cooperation Treaty, "Written Opinion," issued in connection with Application No. PCT/US2014/068623, dated Mar. 23, 2015, 8 pages.
Patent Cooperation Treaty, "International Search Report," issued in connection with Application No. PCT/US2014/068202, dated Apr. 10, 2015, 3 pages.
Patent Cooperation Treaty, "Written Opinion," issued in connection with Application No. PCT/US2014/068202, dated Apr. 10, 2015, 7 pages.
European Patent Office, "Extended European Search Report," issued in connection with application No. EP 14004028.8, dated Apr. 9, 2015, 7 pages.
United States Patent and Trademark Office, "Non-Final Office Action," issued in connection with U.S. Appl. No. 14/025,575, dated Apr. 16, 2015, 72 pages.
The State Intellectual Property Office of China, "First Notification of Office Action," issued in connection with application No. CN 201280003504.8, dated Apr. 1, 2015, with English translation, 17 pages.
IP Australia, "Patent Examination Report No. 1," issued in connection with Application No. 2014260163, dated Apr. 21, 2015, 3 pages.
United States Patent and Trademark Office, "Notice of Allowance," issued in connection with U.S. Appl. No. 14/500,297, dated May 21, 2015, (31 pages).
United States Patent and Trademark Office, "Non-Final Office Action," issued in connection with U.S. Appl. No. 14/014,050, dated May 28, 2015, 20 pages.
IP Australia, "Patent Examination Report No. 1," issued in connection with Application No. 2014262739, dated May 29, 2015, 4 pages.
United States Patent and Trademark Office, "Notice of Allowance," issued in connection with U.S. Appl. No. 13/915,381, dated Jun. 8, 2015, 44 pages.
United States Patent and Trademark Office, "Non-Final Office Action, " issued in connection with U.S. Appl. No. 13/404,984, dated May 20, 2015, (27 pages).
United States Patent and Trademark Office, "Notice of Allowance," issued in connection with U.S. Appl. No. 13/690,915, dated Jun. 5, 2015, (64 pages).
IP Australia, "Patent Examination Report No. 1," issued in connection with Application No. 2011349435, dated Nov. 4, 2014 (3 pages).

(56) References Cited

OTHER PUBLICATIONS

Japanese Patent Office, "Office Action," issued in connection with Japanese Patent Application No. 2013543286, dated Aug. 26, 2014 (5 pages).
United States Patent and Trademark Office, "Notice of Allowance," issued in connection with U.S. Appl. No. 13/995,864, dated Oct. 28, 2014 (39 pages).
Goerg et al., "How Many Millenials Visit YouTube? Estimating Unobserved Events From Incomplete Panel Data Conditioned on Demographic Covariates," Apr. 27, 2015, 27 pages, Google Inc.
Goerg et al., "How Many People Visit YouTube? Imputing Missing Events in Panels With Excess Zeros," 2015, 6 pages, Google Inc.
United States Patent and Trademark Office, "Non-Final Office Action," issued in connection with U.S. Appl. No. 14/014,044, dated Jul. 2, 2015, 69 pages.
United States Patent and Trademark Office, "Non-Final Office Action," issued in connection with U.S. Appl. No. 14/463,309, dated Aug. 5, 2015, 62 pages.
United States Patent and Trademark Office, "Non-Final Office Action," issued in connection with U.S. Appl. No. 14/025,567, dated Aug. 6, 2015, 59 pages.
Japanese Patent Office, "Notice of Reasons for Rejection," issued in connection with Japanese Patent Application No. P2015-078539 dated Jul. 14, 2015 (6 pages).
IP Australia, "Patent Examination Report No. 1," issued in connection with Australian Patent Application No. 2013204354, dated Nov. 14, 2014 3 pages.
United States Patent and Trademark Office, "Final Office Action," issued in connection with U.S. Appl. No. 14/025,575, dated Aug. 17, 2015, 78 pages.
United States Patent and Trademark Office, "Non-Final Office Action," issued in connection with U.S. Appl. No. 14/025,567, dated Dec. 11, 2015 (39 pages).
IP Australia, "Notice of Grant" issued in connection with Australian Patent Application No. 2011374955, dated Dec. 17, 2015 (1 page).
The State Intellectual Property Office of China, "First Office Action," issued in connection with Chinese Patent Application No. 201310338209.4, dated Dec. 22, 2015 (16 pages).
Canadian Intellectual Property Office, "Office Action," issued in connection with Canadian Patent Application No. 2,875,434, dated Dec. 4, 2015 (4 pages).
Canadian Intellectual Property Office, "Office Action," issued in connection with Canadian Patent Application No. 2,875,437, dated Dec. 4, 2015 (5 pages).
International Searching Authority, "International Search Report," issued in connection with International Patent Application No. PCT/US2014/036298, dated Aug. 12, 2015 (3 pages).
International Searching Authority, "Written Opinion," issued in connection with International Patent Application No. PCT/US2014/036298, dated Aug. 12, 2015 (6 pages).
Japan Patent Office, "Notice of Reasons for Rejection," issued in connection with Japanese Patent Application No. P2015-0524512, dated Jun. 30, 2015 (7 pages).
State Intellectual Property Office of China, "Second Office Action," issued in connection with Chinese Patent Application No. 201180045957.2, dated Jul. 29, 2015 (7 pages).
IP Australia, "Patent Examination Report No. 1," issued in connection with Australian Application No. 2013204953, dated Dec. 23, 2014 (5 pages).
United States Patent and Trademark Office, "Supplemental Notice of Allowance," issued in connection with U.S. Appl. No. 14/641,982, dated Sep. 23, 2015 (2 pages).
United States Patent and Trademark Office, "Final Office Action," issued in connection with U.S. Appl. No. 13/963,737, dated Sep. 21, 2015 (26 pages).
Taboga, "Linear combinations of normal random variables," from "Statlect the Digital Textbook, Lectures on probability and statistics," 2010, retrieved from <http://www.statlect.com/normal_distribution_linear_combinations.htm>, retrieved on Nov. 23, 2015 (4 pages).

Jennings, et al., "Adding adaptive models makes neural net fraud models more robust," FICO Blog, Sep. 7, 2011, retrieved from <http://www.fico.com/en/blogs/> (4 pages).
IP Australia, "Patent Examination Report No. 1," issued in connection with Australian Patent Application No. 2015200121 dated Nov. 30, 2015 (2 pages).
The State Intellectual Property Office of China, "2nd Office Action," issued in connection with Chinese Patent Application No. 201280003504.8, dated Nov. 30, 2015 (9 pages).
IP Australia, "Notice of Acceptance" issued in connection with Australian Patent Application No. 2014262739, dated Oct. 30, 2015 (2 pages).
European Patent Office, "Extended European Search Report," issued in connection with Application No. 13803850.0, dated Dec. 9, 2015 (8 pages).
International Searching Authority, "International Search Report," issued in connection with International Patent Application No. PCT/US2015/040943, dated Oct. 28, 2015 (3 pages).
International Searching Authority, "Written Opinion," issued in connection with International Patent Application No. PCT/US2015/040943, dated Oct. 28, 2015 (7 pages).
Japan Patent Office, "Notice of Reasons for Rejection," issued in connection with Japanese Patent Application No. P2015-516283, dated Jan. 19, 2016 (8 pages).
Canadian Intellectual Property Office, "Office Action," issued in connection with Canadian Patent Application No. 2,875,210, dated Jan. 15, 2016 (4 pages).
Patent Cooperation Treaty, "International Preliminary Report on Patentability," issued in connection with Application No. PCT/US2013/045211, dated Dec. 16, 2014, 8 pages.
IP Australia, "Patent Examination Report No. 1," issued in connection with Application No. 2013204865, dated Dec. 22, 2014, 3 pages.
United States Patent and Trademark Office, "Non-Final Office Action," issued in connection with U.S. Appl. No. 13/915,381, dated Jan. 30, 2015, 51 pages.
Braverman, Samantha, "Are the Online Marketing Efforts of TV Shows and Programs Worthwhile?" Mar. 30, 2011 (5 pages).
Danaher, Peter J., Journal of Marketing Research, vol. XXVIII, "A Canonical Expansion Model for Multivariate Media Exposure Distributions: A Generalization of the 'Duplication of Viewing Law,'" Aug. 1991 (7 pages).
Enoch, Glenn. and Johnson, Kelly. Journal of Advertising Research, "Cracking the Cross-Media Code: How to Use Single-Source Measures to Examine Media Cannibalization and Convergence," Jun. 2010 (13 pages).
Headen, Robert S., Klompmaker, Jay E. and Rust, Roland T., Journal and Marketing Research, vol. XVI, "The Duplication of Viewing Law and Television Media Schedule Evaluation," Aug. 1979 (9 pages).
Huang, Chun-Yao and Lin Chen-Shun, Journal of Advertising Research, vol. 35, No. 2, "Modeling the Audience's Banner Ad Exposure for Internet Advertising Planning," Summer 2006 (15 pages).
Nielsen, "How Teens Use Media: A Nielsen Report on the Myths and Realities of Teem Media Trends," Jun. 2009 (17 pages).
Arbitron Inc., Edison Research, "The Infinite Dial 2011: Navigating Digital Platforms," 2011 (83 pages).
Rust, Roland T., Klompmaker, Jay E., Journal for Advertising, vol. 10, No. 3, "A Comparative Study of Television Duplication Models," 1981 (6 pages).
Hothorn et al. "Unbiased Recursive Partitioning: A Conditional Inference Framework," Journal of Computational and Geographical Statistics, vol. 15, No. 3, 2006, pp. 651-674 (21 pages).
Edwards, Jim. "Apple Wants More Advertisers to Use Its iPhone Tracking System," Business Insider. Jun. 13, 2013. Retrieved from <http://www.businessinsider.com/apples-idfa-and-ifa-tracking-system-2013-6>on Jul. 24, 2014. 2 pages.
Facebook for Business. "Measuring Conversions on Facebook, Across Devices and in Mobile Apps," Aug. 14, 2014. Retrieved from <https://www.facebook.com/business/news/cross-device-measurement> on Aug. 14, 2014. 3 pages.

(56) References Cited

OTHER PUBLICATIONS

Patent Cooperation Treaty, "International Search Report," issued in connection with Application No. PCT/US2014/035156, dated Aug. 25, 2014, 5 pages.
Patent Cooperation Treaty, "Written Opinion," issued in connection with Application No. PCT/US2014/035156, dated Aug. 25, 2014, 5 pages.
European Patent Office, "Extended European Search Report," issued in connection with application No. EP 12760524.4, dated Aug. 18, 2014, 8 pages.
Japanese Patent Office, "Office Action" with English translation, issued in connection with application No. JP 2013-544887, dated Aug. 12, 2014, 16 pages.
Patent Cooperation Treaty, "International Search Report and Written Opinion of the International Searching Authority," issued in connection with Application No. PCT/US2014/031342, dated Jul. 28, 2014, 13 pages.
Patent Cooperation Treaty, "International Search Report and Written Opinion of the International Searching Authority," issued in connection with Application No. PCT/US2014/034389, dated Sep. 5, 2014, 15 pages.
Patent Cooperation Treaty, "International Search Report and Written Opinion," issued in connection with Application No. PCT/US2014/035683, dated Sep. 12, 2014, 13 pages.
Patent Cooperation Treaty, "International Search Report and Written Opinion," issued in connection with Application No. PCT/US2014/037064, dated Sep. 12, 2014, 9 pages.
United States Patent and Trademark Office, "Notice of Allowance," issued in connection with U.S. Appl. No. 13/396,071, dated Oct. 24, 2014, 31 pages.
Canadian Intellectual Property Office, "Office Action," issued in connection with Canadian Patent Application No. 2,819,268, dated Nov. 24, 2014 (4 pages).
United States Patent and Trademark Office, "Office Action," issued in connection with U.S. Appl. No. 14/014,050, dated Sep. 12, 2014, 32 pages.
Patent Cooperation Treaty, "International Search Report and Written Opinion," issued in connection with Application No. PCT/US2014/050551, dated Nov. 24, 2014, 11 pages.
Adam et al, "Privacy Preserving Integration of Health Care Data," AMIA 2007 Symposium Proceedings, 6 pages.
Chloe Albanesius, "Facebook Issues Fix for Several Tracking Cookies," internet article, http://www.pcmag.com/article2/0,2817,2393750,00.asp, Sep. 28, 2011, 2 pages.
Emil Protalinski, "Facebook denies cookie tracking allegations," internet article, http://www.zdnet.com/blog/facebook/facebook-denies-cookie-tracking-allegations/4044, Sep. 25, 2011, 2 pages.
Emil Protalinski, "Facebook fixes cookie behavior after logging out," internet article, http://www.zdnet.com/blog/facebook/facebook-fixes-cookie-behavior-after-logging-out/4120, Sep. 27, 2011, 2 pages.
Emil Protalinski, "US congressmen ask FTC to investigate Facebook cookies," internet article, http://www.zdnet.com/blog/facebook/us-congressmen-ask-ftc-to-investigate-facebook-cookies/4218, Sep. 28, 2011, 2 pages.
Fliptop, "Fliptop Person API Documentation," https://developer.fliptop.com/documentation, retrieved on May 7, 2013 (6 pages).
Fliptop, "Get, Keep and Grow Customers with Fliptop's Customer Intelligence Application," www.fliptop.com/features#social_matching, retrieved on May 7, 2013 (3 pages).
Fliptop, "What is Fliptop?", www.fliptop.com/about_us, retrieved on May 7, 2013 (1 page).
JavaScript and AJAX Forum, Sep. 28, 2005, [retrieved from Internet at http://www.webmasterworld.com/ forum91/4465.htm on Jun. 29, 2011] 4 pages.
Launder, "Media Journal: Nielsen to Test Online-TV Viewing Tool," The Wall Street Journal, Apr. 30, 2013, 2 pages.
"Mental Poker," Wikipedia, Jan. 12, 2010, [retrieved from Internet at en.wikipedia.org/wiki/Mental_poker on Sep. 21, 2010] 5 pages.

"Nielsen Unveils New Online Advertising Measurement," The Nielsen Company, Sep. 27, 2010, [retrieved from Internet at http://nielsen.com/us/en/insights/press-room/201O/nielsen_unveils_newonlineadvertisingmeasurement.html on May 31, 2012] 3 pages.
Nik Cubrilovic, "Logging out of Facebook is not enough," internet article, www.nikcub.appspot.com, Sep. 25, 2011, 3 pages.
Rapleaf, "Fast. Simple. Secure," www.rapleaf.com/why-rapleaf/, retrieved on May 7, 2013, 3 pages.
Rapleaf, "Frequently Asked Questions," www.rapleaf.com/about-us/faq/#where, retrieved on May 7, 2013, 3 pages.
Rapleaf, "The Consumer Data Marketplace," www.rapleaf.com/under-the-hood/, retrieved on May 7, 2013, 2 pages.
Sharma, "Nielsen Gets Digital to Track Online TV Viewers," All Things, Apr. 30, 2013, 3 pages.
Coffey, "Internet Audience Measurement: A Practitioner's View," Journal of Interactive Advertising, vol. 1, No. 2, Spring 2001, 8 pages.
Vega, Tanzina, "Nielsen Introduces New Ad Measurement Product," The New York Times, Sep. 27, 2010, 7 pages.
Vranica, "Nielsen Testing a New Web-Ad Metric," The Wall Street Journal, Sep. 23, 2010, 2 pages.
International Bureau, "International Preliminary Report on Patentability," issued in connection with PCT application Serial No. PCT/US2011/052623, dated Mar. 26, 2013, 5 pages.
International Searching Authority, "International Preliminary Report on Patentability," issued in connection with application No. PCT/US2012/026760, dated Sep. 24, 2013, 4 pages.
International Searching Authority, "International Search Report," issued in connection with application No. PCT/US2011/052623, dated Mar. 8, 2012, 3 pages.
International Searching Authority, "International Search Report," issued in connection with application No. PCT/US2012/026760, dated Jan. 2, 2013, 3 pages.
International Searching Authority, "International Search Report," issued in connection with International Application No. PCT/US2013/025687 dated Jun. 2, 2013, 5 pages.
International Searching Authority, "Written Opinion of the International Searching Authority," issued in issued in connection with International Application No. PCT/US2013/025687 dated Jun. 2, 2013, 5 pages.
International Searching Authority, "Written Opinion," issued in connection with application No. PCT/US2011/052623, dated Mar. 8, 2012, 4 pages.
International Searching Authority, "Written Opinion," issued in connection with application No. PCT/US2011/065881, dated Jul. 9, 2012, 6 pages.
International Searching Authority, "Written Opinion," issued in connection with application No. PCT/US2012/026760, dated Jan. 2, 2013, 3 pages.
Patent Cooperation Treaty, "International Search Report," issued by the International Searching Authority in connection with PCT application No. PCT/US2011/052623, dated Mar. 8, 2012, 3 pages.
Patent Cooperation Treaty, "International Search Report," issued by the International Searching Authority in connection with PCT application No. PCT/US2011/065881, dated Jul. 9, 2012, 3 pages.
Patent Cooperation Treaty, "International Search Report," issued by the International Searching Authority in connection with PCT/US2011/052623, dated Mar. 8, 2012, 3 pages.
Patent Cooperation Treaty, "Written Opinion of the International Searching Authority," issued by theInternational Searching Authority in connection with PCT/US2011/065881, dated Jul. 9, 2012, 6 pages.
Patent Cooperation Treaty, "International Search Report and Written Opinion of the International Searching Authority," issued by the International Searching Authority in connection with PCT/US2013/045211, dated Feb. 25, 2014, 13 pages.
Australian Government, IP Australia, "Examination Report," issued in connection with application No. AU 2013205736, dated Jun. 18, 2013, 2 pages.
Japan Patent Office, "Notice of Reasons for Rejection," issued in connection with Application No. 2013-529435, dated Aug. 20, 2013, 4 pages.

(56) References Cited

OTHER PUBLICATIONS

United States Patent and Trademark Office, "Final Office Action," issued in connection with U.S. Appl. No. 13/690,915, dated Dec. 20, 2013, 6 pages.
United States Patent and Trademark Office, "Non-Final Office Action," issued in connection with U.S. Appl. No. 13/239,005, dated Jun. 4, 2013, 28 pages.
United States Patent and Trademark Office, "Non-Final Office Action," issued in connection with U.S. Appl. No. 13/690,915, dated Sep. 5, 2013, 36 pages.
United States Patent and Trademark Office, "Non-Final Office Action," issued in connection with U.S. Appl. No. 13/691,175, dated Sep. 9, 2013, 35 pages.
United States Patent and Trademark Office, "Notice of Allowance," issued in connection with U.S. Appl. No. 13/239,005, dated Nov. 27, 2013, 46 pages.
United States Patent and Trademark Office, "Notice of Allowance," issued in connection with U.S. Appl. No. 13/513,148, dated Nov. 5, 2012, 27 pages.
United States Patent and Trademark Office, "Notice of Allowance," issued in connection with U.S. Appl. No. 13/691,175, dated Mar. 9, 2014, 6 pages.
United States Patent and Trademark Office, "Non-Final Office Action," issued in connection with U.S. Appl. No. 13/756,493, dated Jan. 17, 2014, 32 pages.
United States Patent and Trademark Office, "Notice of Allowance and Fee(s) Due," issued in connection with U.S. Appl. No. 13/690,915, dated Apr. 9, 2014, 28 pages.
United States Patent and Trademark Office, "Notice of Allowance," issued in connection with U.S. Appl. No. 13/691,175, dated Jan. 27, 2014, 15 pages.
International Searching Authority, "International Search Report," issued in connection with application No. PCT/US2011/052762, dated Aug. 22, 2012 (3 pages).
International Searching Authority, "Written Opinion," issued in connection with application No. PCT/US2011/052762, dated Aug. 22, 2012 (4 pages).
United States Patent and Trademark Office, "Non-Final Office Action," issued in connection with U.S. Appl. No. 13/396,071, dated May 9, 2014, 35 pages.
United States Patent and Trademark Office, "Non-Final Office Action," issued in connection with U.S. Appl. No. 13/209,292, dated Apr. 8, 2014, 15 pages.
Patent Cooperation Treaty, "International Search Report," issued by the International Searching Authority in connection with PCT/US2013/057045, dated Dec. 27, 2013 (3 pages).
International Searching Authority, "Written Opinion," issued in connection with application No. PCT/US2013/057045, dated Dec. 27, 2013 (5 pages).
United States Patent and Trademark Office, "Notice of Allowance," issued in connection with U.S. Appl. No. 13/756,493, dated May 20, 2014, 32 pages.

\* cited by examiner

| 400 | 402 | 404 | 406 |
|---|---|---|---|
| | FREQUENCY | UUIDs (COOKIES) | IMPRESSION |
| | 1 | 100,000 | 100,000 |
| | 2 | 200,000 | 400,000 |
| | 3 | 100,000 | 300,000 |
| | 4 | 50,000 | 200,000 |
| | 5 | 50,000 | 250,000 |
| | TOTAL | 500,000 | 1,250,000 |

RATINGS ENTITY IMPRESSIONS

FIG. 4

| 500 | 502 | 504 | 506 | 508 |
|---|---|---|---|---|
| | AGE/GENDER | IMPRESSIONS | FREQUENCY | IMPRESSION COMP |
| | (SOURCE) | (DB PROPRIETOR) | (DB PROPRIETOR) | (DB PROPRIETOR) |
| | M 13-18 | 1,000,000 | 4 | 33% |
| | F 13-18 | 2,000,000 | 5 | 66% |
| | ... | | | |
| | F 50+ | 0 | 0 | 0 |
| | TOTAL | 3,000,000 | 4.7 | 100% |

DATABASE (DB) PROPRIETOR CAMPAIGN-LEVEL AGE/GENDER AND IMPRESSION COMPOSITION TABLE

FIG. 5

| 600 | 602 | 604 | 606 | 608 |
|---|---|---|---|---|
| | AGE/GENDER | IMPRESSIONS | FREQUENCY | IMPRESSION COMP |
| | (SOURCE) | (ONLINE+PC&TV) | (ONLINE+PC&TV) | (ONLINE+PC&TV) |
| | <12 | 100,000 | 3 | 4% |
| | M 13-18 | 750,000 | 3 | 31% |
| | F 13-18 | 1,550,000 | 4 | 65% |
| | ... | | | |
| | F 50+ | 0 | 0 | 0 |
| | TOTAL | 2,400,000 | 3.3 | 100% |

PANELIST CAMPAIGN-LEVEL AGE/GENDER AND IMPRESSION COMPOSITION TABLE

| AGE/GENDER | IMPRESSION COMP | IMPRESSION COMP | ERROR WEIGHTED 702 |
|---|---|---|---|
| (SOURCE) | (RE PC&TV) | (DB PROPRIETOR) | ($\alpha IC_{(RE)} + (1-\alpha)IC_{(SN)}$) |
| <12 | 4% | 0 | 2% |
| M 13-18 | 31% | 33% | 32% |
| F 13-18 | 65% | 66% | 66% |
| ... | | | |
| F 50+ | 0 | 0 | 0 |
| TOTAL | 100% | 100% | 100% |

COMBINED CAMPAIGN-LEVEL AGE/GENDER AND
IMPRESSION COMPOSITION TABLE

| AGE/ GENDER 802 | IMPRESSIONS 804 | FREQUENCY 806 | REACH 808 | IMPRESSION COMP 810 |
|---|---|---|---|---|
| (SOURCE) | (RATINGS ENTITY) | (DB PROPRIETOR) | (DERIVED) | (IMP COMP TABLE) |
| <12 | 56,000 | 3 | 18,666 | 2% |
| M 13-18 | 896,000 | 4 | 224,000 | 32% |
| F 13-18 | 1,848,000 | 5 | 369,600 | 66% |
| ... | | | | |
| F 50+ | 0 | 0 | 0 | 0 |
| TOTAL | 2,800,000 | 4.6 | 612,266 | 100% |

AGE/GENDER IMPRESSIONS DISTRIBUTION TABLE

FIG. 8

| Update Frequency | annual | monthly / Oct |
|---|---|---|
| Data Source | Source 1 | Source 2 |
| Demographics | Total US UE | Online UE |
| Female 2-11 | 20,150,000 | 19,142,500 |
| Female 12-17 | 12,200,000 | 11,590,000 |
| Female 18-20 | 6,590,000 | 6,260,500 |
| Female 21-24 | 8,510,000 | 8,084,500 |
| Female 25-29 | 10,090,000 | 9,585,500 |
| Female 30-34 | 10,150,000 | 9,642,500 |
| Female 35-39 | 10,010,000 | 9,509,500 |
| Female 40-44 | 10,280,000 | 9,766,000 |
| Female 45-49 | 10,910,000 | 10,364,500 |
| Female 50-54 | 11,360,000 | 10,792,000 |
| Female 55-64 | 20,040,000 | 19,038,000 |
| Female 65+ | 23,850,000 | 22,657,500 |
| Male 2-11 | 21,060,000 | 20,007,000 |
| Male 12-17 | 12,730,000 | 12,093,500 |
| Male 18-20 | 6,710,000 | 6,374,500 |
| Male 21-24 | 8,670,000 | 8,236,500 |
| Male 25-29 | 9,990,000 | 9,490,500 |
| Male 30-34 | 9,890,000 | 9,395,500 |
| Male 35-39 | 9,650,000 | 9,167,500 |
| Male 40-44 | 9,880,000 | 9,386,000 |
| Male 45-49 | 10,440,000 | 9,918,000 |
| Male 50-54 | 10,730,000 | 10,193,500 |
| Male 55-64 | 18,480,000 | 17,556,000 |
| Male 65+ | 18,550,000 | 17,622,500 |
| Total | 300,920,000 | 285,874,000 |

| Database Proprietor 1 |||||
|---|---|---|---|---|
| Data Source | Adjusted Database Proprietor 1 data, before scaling (At the site level) || Formula ||
| Demographics | Unique Audience | Impression | Reach | Freq |
| Female 2-11 | 37,914 | 167,800 | 0.2% | 4.4 |
| Female 12-17 | 57,567 | 200,000 | 0.5% | 3.5 |
| Female 18-20 | 60,000 | 250,000 | 1.0% | 4.2 |
| Female 21-24 | 70,000 | 300,000 | 0.9% | 4.3 |
| Female 25-29 | 80,000 | 350,000 | 0.8% | 4.4 |
| Female 30-34 | 50,000 | 150,000 | 0.5% | 3.0 |
| Female 35-39 | 45,000 | 100,000 | 0.5% | 2.2 |
| Female 40-44 | 32,000 | 90,000 | 0.3% | 2.8 |
| Female 45-49 | 30,000 | 80,000 | 0.3% | 2.7 |
| Female 50-54 | 20,000 | 70,000 | 0.2% | 3.5 |
| Female 55-64 | 15,000 | 60,000 | 0.1% | 4.0 |
| Female 65+ | 20,000 | 65,000 | 0.1% | 3.3 |
| Male 2-11 | 20,000 | 66,000 | 0.1% | 3.3 |
| Male 12-17 | 40,000 | 120,000 | 0.3% | 3.0 |
| Male 18-20 | 50,000 | 160,000 | 0.8% | 3.2 |
| Male 21-24 | 50,000 | 170,000 | 0.6% | 3.4 |
| Male 25-29 | 60,000 | 200,000 | 0.6% | 3.3 |
| Male 30-34 | 70,000 | 280,000 | 0.7% | 4.0 |
| Male 35-39 | 45,000 | 110,000 | 0.5% | 2.4 |
| Male 40-44 | 40,000 | 100,000 | 0.4% | 2.5 |
| Male 45-49 | 35,000 | 100,000 | 0.4% | 2.9 |
| Male 50-54 | 20,000 | 70,000 | 0.2% | 3.5 |
| Male 55-64 | 15,000 | 50,000 | 0.1% | 3.3 |
| Male 65+ | 15,000 | 55,000 | 0.1% | 3.7 |
| Campaign Total | 977,482 | 3,363,800 | 0.3% | 3.4 |

| Database Proprietor 2 ||||
| Data Source | Adjusted Database Proprietor 2 data, before scaling (At the site level) || Formula ||
| Demographics | Unique Audience | Impression | Reach | Freq |
|---|---|---|---|---|
| Female 2-11 | 40,000 | 180,000 | 0.2% | 4.5 |
| Female 12-17 | 60,000 | 210,000 | 0.5% | 3.5 |
| Female 18-20 | 70,000 | 260,000 | 1.1% | 3.7 |
| Female 21-24 | 80,000 | 340,000 | 1.0% | 4.3 |
| Female 25-29 | 85,000 | 36,000 | 0.9% | 0.4 |
| Female 30-34 | 55,000 | 160,000 | 0.6% | 2.9 |
| Female 35-39 | 50,000 | 110,000 | 0.5% | 2.2 |
| Female 40-44 | 40,000 | 100,000 | 0.4% | 2.5 |
| Female 45-49 | 34,000 | 90,000 | 0.3% | 2.6 |
| Female 50-54 | 26,000 | 90,000 | 0.2% | 3.5 |
| Female 55-64 | 20,000 | 78,000 | 0.1% | 3.9 |
| Female 65+ | 24,000 | 75,000 | 0.1% | 3.1 |
| Male 2-11 | 22,000 | 67,000 | 0.1% | 3.0 |
| Male 12-17 | 45,000 | 125,000 | 0.4% | 2.8 |
| Male 18-20 | 55,000 | 170,000 | 0.9% | 3.1 |
| Male 21-24 | 57,000 | 180,000 | 0.7% | 3.2 |
| Male 25-29 | 68,000 | 210,000 | 0.7% | 3.1 |
| Male 30-34 | 75,000 | 300,000 | 0.8% | 4.0 |
| Male 35-39 | 50,000 | 120,000 | 0.5% | 2.4 |
| Male 40-44 | 50,000 | 130,000 | 0.5% | 2.6 |
| Male 45-49 | 35,000 | 110,000 | 0.4% | 3.1 |
| Male 50-54 | 21,000 | 80,000 | 0.2% | 3.8 |
| Male 55-64 | 16,000 | 60,000 | 0.1% | 3.8 |
| Male 65+ | 17,000 | 61,000 | 0.1% | 3.6 |
| Campaign Total | 1,095,000 | 3,342,000 | 0.4% | 3.1 |

FIG. 17

|  | Audience-Level Proportions | | | |
|---|---|---|---|---|
| Update Frequency | monthly (but not in the middle of a | | | |
| Data Source | TVPC Panel / BA Display Table | | | |
| Demographics | Rest of Panel (a) **** | DP1 Only (b) * | DP2 Only (c) ** | DP1 & DP2 (d) *** |
| Female 2-11 | 0.66 | 0.10 | 0.11 | 0.13 |
| Female 12-17 | 0.49 | 0.17 | 0.07 | 0.27 |
| Female 18-20 | 0.51 | 0.15 | 0.07 | 0.27 |
| Female 21-24 | 0.52 | 0.16 | 0.08 | 0.25 |
| Female 25-29 | 0.55 | 0.15 | 0.09 | 0.21 |
| Female 30-34 | 0.56 | 0.12 | 0.11 | 0.21 |
| Female 35-39 | 0.55 | 0.11 | 0.12 | 0.22 |
| Female 40-44 | 0.56 | 0.12 | 0.13 | 0.19 |
| Female 45-49 | 0.57 | 0.12 | 0.12 | 0.19 |
| Female 50-54 | 0.57 | 0.11 | 0.11 | 0.20 |
| Female 55-64 | 0.62 | 0.10 | 0.11 | 0.16 |
| Female 65+ | 0.65 | 0.11 | 0.11 | 0.13 |
| Male 2-11 | 0.68 | 0.10 | 0.10 | 0.11 |
| Male 12-17 | 0.55 | 0.16 | 0.07 | 0.22 |
| Male 18-20 | 0.51 | 0.18 | 0.08 | 0.23 |
| Male 21-24 | 0.52 | 0.17 | 0.09 | 0.22 |
| Male 25-29 | 0.57 | 0.15 | 0.08 | 0.20 |
| Male 30-34 | 0.58 | 0.13 | 0.10 | 0.19 |
| Male 35-39 | 0.59 | 0.10 | 0.13 | 0.18 |
| Male 40-44 | 0.59 | 0.10 | 0.13 | 0.19 |
| Male 45-49 | 0.62 | 0.11 | 0.12 | 0.15 |
| Male 50-54 | 0.64 | 0.09 | 0.13 | 0.14 |
| Male 55-64 | 0.66 | 0.08 | 0.12 | 0.13 |
| Male 65+ | 0.67 | 0.10 | 0.11 | 0.12 |

| Data Source | Database Proprietors 1 + 2 | | |
|---|---|---|---|
| Demographics | Total Audience | Total Impressions | Frequency |
| Female 2-11 | 77,914 | 347,800 | 4.5 |
| Female 12-17 | 117,567 | 410,000 | 3.5 |
| Female 18-20 | 130,000 | 510,000 | 3.9 |
| Female 21-24 | 150,000 | 640,000 | 4.3 |
| Female 25-29 | 165,000 | 386,000 | 2.3 |
| Female 30-34 | 105,000 | 310,000 | 3.0 |
| Female 35-39 | 95,000 | 210,000 | 2.2 |
| Female 40-44 | 72,000 | 190,000 | 2.6 |
| Female 45-49 | 64,000 | 170,000 | 2.7 |
| Female 50-54 | 46,000 | 160,000 | 3.5 |
| Female 55-64 | 35,000 | 138,000 | 3.9 |
| Female 65+ | 44,000 | 140,000 | 3.2 |
| Male 2-11 | 42,000 | 133,000 | 3.2 |
| Male 12-17 | 85,000 | 245,000 | 2.9 |
| Male 18-20 | 105,000 | 330,000 | 3.1 |
| Male 21-24 | 107,000 | 350,000 | 3.3 |
| Male 25-29 | 128,000 | 410,000 | 3.2 |
| Male 30-34 | 145,000 | 580,000 | 4.0 |
| Male 35-39 | 95,000 | 230,000 | 2.4 |
| Male 40-44 | 90,000 | 230,000 | 2.6 |
| Male 45-49 | 70,000 | 210,000 | 3.0 |
| Male 50-54 | 41,000 | 150,000 | 3.7 |
| Male 55-64 | 31,000 | 110,000 | 3.5 |
| Male 65+ | 32,000 | 116,000 | 3.6 |
| Campaign Total | 2,072,482 | 6,705,800 | 3.2 |

| Correlation and Duplication (Danaher Approach) | | | | | | | |
|---|---|---|---|---|---|---|---|
| Demographics | Correlation * | Panel DP1 reach | Panel DP2 reach | Adjusted Correlaton ** | Duplicate Reach *** | Online UE | Dup Audience | Dup Impressions |
| Female 2-11 | 0.41 | 0.23 | 0.23 | 0.0028 | 0.001% | 19,142,500 | 187 | 835 |
| Female 12-17 | 0.53 | 0.34 | 0.44 | 0.0042 | 0.005% | 11,590,000 | 543 | 1,895 |
| Female 18-20 | 0.54 | 0.35 | 0.42 | 0.0092 | 0.020% | 6,260,500 | 1,262 | 4,953 |
| Female 21-24 | 0.51 | 0.33 | 0.41 | 0.0082 | 0.016% | 8,084,500 | 1,299 | 5,543 |
| Female 25-29 | 0.46 | 0.31 | 0.36 | 0.0080 | 0.014% | 9,585,500 | 1,365 | 3,194 |
| Female 30-34 | 0.48 | 0.32 | 0.33 | 0.0054 | 0.006% | 9,642,500 | 569 | 1,679 |
| Female 35-39 | 0.48 | 0.34 | 0.33 | 0.0048 | 0.005% | 9,509,500 | 461 | 1,019 |
| Female 40-44 | 0.42 | 0.32 | 0.31 | 0.0033 | 0.003% | 9,766,000 | 250 | 659 |
| Female 45-49 | 0.45 | 0.31 | 0.31 | 0.0031 | 0.002% | 10,364,500 | 197 | 522 |
| Female 50-54 | 0.47 | 0.31 | 0.31 | 0.0022 | 0.001% | 10,792,000 | 98 | 340 |
| Female 55-64 | 0.46 | 0.28 | 0.26 | 0.0011 | 0.000% | 19,038,000 | 35 | 138 |
| Female 65+ | 0.40 | 0.23 | 0.24 | 0.0013 | 0.000% | 22,657,500 | 49 | 155 |
| Male 2-11 | 0.39 | 0.21 | 0.22 | 0.0015 | 0.000% | 20,007,000 | 53 | 168 |
| Male 12-17 | 0.51 | 0.29 | 0.38 | 0.0036 | 0.002% | 12,093,500 | 302 | 870 |
| Male 18-20 | 0.46 | 0.31 | 0.41 | 0.0068 | 0.012% | 6,374,500 | 783 | 2,462 |
| Male 21-24 | 0.44 | 0.31 | 0.39 | 0.0055 | 0.008% | 8,236,500 | 637 | 2,082 |
| Male 25-29 | 0.49 | 0.28 | 0.35 | 0.0072 | 0.009% | 9,490,500 | 888 | 2,845 |
| Male 30-34 | 0.44 | 0.29 | 0.32 | 0.0079 | 0.012% | 9,395,500 | 1,126 | 4,505 |
| Male 35-39 | 0.45 | 0.32 | 0.28 | 0.0055 | 0.006% | 9,167,500 | 506 | 1,226 |
| Male 40-44 | 0.46 | 0.31 | 0.29 | 0.0052 | 0.005% | 9,386,000 | 443 | 1,133 |
| Male 45-49 | 0.42 | 0.27 | 0.26 | 0.0041 | 0.003% | 9,918,000 | 267 | 802 |
| Male 50-54 | 0.41 | 0.27 | 0.24 | 0.0025 | 0.001% | 10,193,500 | 92 | 336 |
| Male 55-64 | 0.43 | 0.26 | 0.22 | 0.0012 | 0.000% | 17,556,000 | 33 | 117 |
| Male 65+ | 0.39 | 0.23 | 0.22 | 0.0012 | 0.000% | 17,622,500 | 34 | 123 |
| Campaign Total | | | | | | 285,874,000 | 11,479 | 37,143 |

/- 2100

| Correlation and Duplication (Random Approach) | | | | |
|---|---|---|---|---|
| Demographics | Dup Reach | Online UE | Dup Audience | Dup Impressions |
| Female 2-11 | 0.00000 | 19,142,500 | 79 | 354 |
| Female 12-17 | 0.00003 | 11,590,000 | 298 | 1,039 |
| Female 18-20 | 0.00011 | 6,260,500 | 671 | 2,632 |
| Female 21-24 | 0.00009 | 8,084,500 | 693 | 2,955 |
| Female 25-29 | 0.00007 | 9,585,500 | 709 | 1,660 |
| Female 30-34 | 0.00003 | 9,642,500 | 285 | 842 |
| Female 35-39 | 0.00002 | 9,509,500 | 237 | 523 |
| Female 40-44 | 0.00001 | 9,766,000 | 131 | 346 |
| Female 45-49 | 0.00001 | 10,364,500 | 98 | 261 |
| Female 50-54 | 0.00000 | 10,792,000 | 48 | 168 |
| Female 55-64 | 0.00000 | 19,038,000 | 16 | 62 |
| Female 65+ | 0.00000 | 22,657,500 | 21 | 67 |
| Male 2-11 | 0.00000 | 20,007,000 | 22 | 70 |
| Male 12-17 | 0.00001 | 12,093,500 | 149 | 429 |
| Male 18-20 | 0.00007 | 6,374,500 | 431 | 1,356 |
| Male 21-24 | 0.00004 | 8,236,500 | 346 | 1,132 |
| Male 25-29 | 0.00005 | 9,490,500 | 430 | 1,377 |
| Male 30-34 | 0.00006 | 9,395,500 | 559 | 2,235 |
| Male 35-39 | 0.00003 | 9,167,500 | 245 | 594 |
| Male 40-44 | 0.00002 | 9,386,000 | 213 | 545 |
| Male 45-49 | 0.00001 | 9,918,000 | 124 | 371 |
| Male 50-54 | 0.00000 | 10,193,500 | 41 | 151 |
| Male 55-64 | 0.00000 | 17,556,000 | 14 | 49 |
| Male 65+ | 0.00000 | 17,622,500 | 14 | 52 |
| Campaign Total | 0.00001 | 285,874,000 | 5,875 | 19,269 |

FIG. 21

| Demographics | Total US UE | Undupl. Audience | Undupl. Impressions | Reach | Freq |
|---|---|---|---|---|---|
| Female 2-11 | 20,150,000 | 77,727 | 346,965 | 0.4% | 4.5 |
| Female 12-17 | 12,200,000 | 117,024 | 408,105 | 1.0% | 3.5 |
| Female 18-20 | 6,590,000 | 128,738 | 505,047 | 2.0% | 3.9 |
| Female 21-24 | 8,510,000 | 148,701 | 634,457 | 1.7% | 4.3 |
| Female 25-29 | 10,090,000 | 163,635 | 382,806 | 1.6% | 2.3 |
| Female 30-34 | 10,150,000 | 104,431 | 308,321 | 1.0% | 3.0 |
| Female 35-39 | 10,010,000 | 94,539 | 208,981 | 0.9% | 2.2 |
| Female 40-44 | 10,280,000 | 71,750 | 189,341 | 0.7% | 2.6 |
| Female 45-49 | 10,910,000 | 63,803 | 169,478 | 0.6% | 2.7 |
| Female 50-54 | 11,360,000 | 45,902 | 159,660 | 0.4% | 3.5 |
| Female 55-64 | 20,040,000 | 34,965 | 137,862 | 0.2% | 3.9 |
| Female 65+ | 23,850,000 | 43,951 | 139,845 | 0.2% | 3.2 |
| Male 2-11 | 21,060,000 | 41,947 | 132,832 | 0.2% | 3.2 |
| Male 12-17 | 12,730,000 | 84,698 | 244,130 | 0.7% | 2.9 |
| Male 18-20 | 6,710,000 | 104,217 | 327,538 | 1.6% | 3.1 |
| Male 21-24 | 8,670,000 | 106,363 | 347,918 | 1.2% | 3.3 |
| Male 25-29 | 9,990,000 | 127,112 | 407,155 | 1.3% | 3.2 |
| Male 30-34 | 9,890,000 | 143,874 | 575,495 | 1.5% | 4.0 |
| Male 35-39 | 9,650,000 | 94,494 | 228,774 | 1.0% | 2.4 |
| Male 40-44 | 9,880,000 | 89,557 | 228,867 | 0.9% | 2.6 |
| Male 45-49 | 10,440,000 | 69,733 | 209,198 | 0.7% | 3.0 |
| Male 50-54 | 10,730,000 | 40,908 | 149,664 | 0.4% | 3.7 |
| Male 55-64 | 18,480,000 | 30,967 | 109,883 | 0.2% | 3.5 |
| Male 65+ | 18,550,000 | 31,966 | 115,877 | 0.2% | 3.6 |
| Campaign Total | 300,920,000 | 2,061,002 | 6,668,200 | 0.7% | 3.2 |

FIG. 22

METHODS AND APPARATUS TO DE-DUPLICATE IMPRESSION INFORMATION

RELATED APPLICATIONS

This patent claims priority to U.S. Provisional Patent Application Ser. No. 61/922,090, filed Dec. 30, 2013. The entirety of U.S. Provisional Patent Application Ser. No. 61/922,090 is incorporated herein by reference.

FIELD OF THE DISCLOSURE

The present disclosure relates generally to monitoring media and, more particularly, to methods and apparatus to de-duplicate impression information.

BACKGROUND

Traditionally, audience measurement entities determine audience engagement levels for media programming based on registered panel members. That is, an audience measurement entity enrolls people who consent to being monitored into a panel. The audience measurement entity then monitors those panel members to determine media programs (e.g., television programs or radio programs, movies, DVDs, etc.) exposed to those panel members. In this manner, the audience measurement entity can determine exposure measures for different media content based on the collected media measurement data.

Techniques for monitoring user access to Internet resources such as web pages, advertisements and/or other content has evolved significantly over the years. Some known systems perform such monitoring primarily through server logs. In particular, entities serving content on the Internet can use known techniques to log the number of requests received for their content at their server.

BRIEF DESCRIPTION OF THE DRAWINGS

FIG. 4 depicts an example ratings entity impressions table showing quantities of impressions to monitored users.

FIG. 5 depicts an example campaign-level age/gender and impression composition table generated by a database proprietor.

FIG. 6 depicts another example campaign-level age/gender and impression composition table generated by a ratings entity.

FIG. 7 depicts an example combined campaign-level age/gender and impression composition table based on the composition tables of FIGS. 5 and 6.

FIG. 8 depicts an example age/gender impressions distribution table showing impressions based on the composition tables of FIGS. 5-7.

FIG. 15 is a table illustrating an example universe estimate that may be used by the audience measurement system of FIG. 13 to determine advertising exposure.

FIG. 16 is a table illustrating example aggregate audience and impression data from a first database proprietor of multiple database proprietors that may be used by the audience measurement system of FIG. 13 to determine advertising exposure.

FIG. 17 is a table illustrating example aggregate audience and impression data from a second database proprietor of multiple database proprietors that may be used by the audience measurement system of FIG. 13 to determine advertising exposure.

FIG. 18 is a table illustrating example audience level proportions for multiple database proprietors that may be used by the audience measurement system of FIG. 13 to de-duplicate impression information received from multiple database proprietors.

FIG. 19 is a table illustrating example total audience and impression data from multiple database proprietors.

FIG. 20 is a table illustrating example correlation and duplicate impression information determined by the audience measurement system of FIG. 13 using the Danaher method.

FIG. 21 is a table illustrating example duplicate reach, duplicate audience, and duplicate impression information determined by the audience measurement system of FIG. 13 using a random duplication approach.

FIG. 22 is a table illustrating example unduplicated impression information determined by the audience measurement system of FIG. 13.

DETAILED DESCRIPTION

Figure 1:
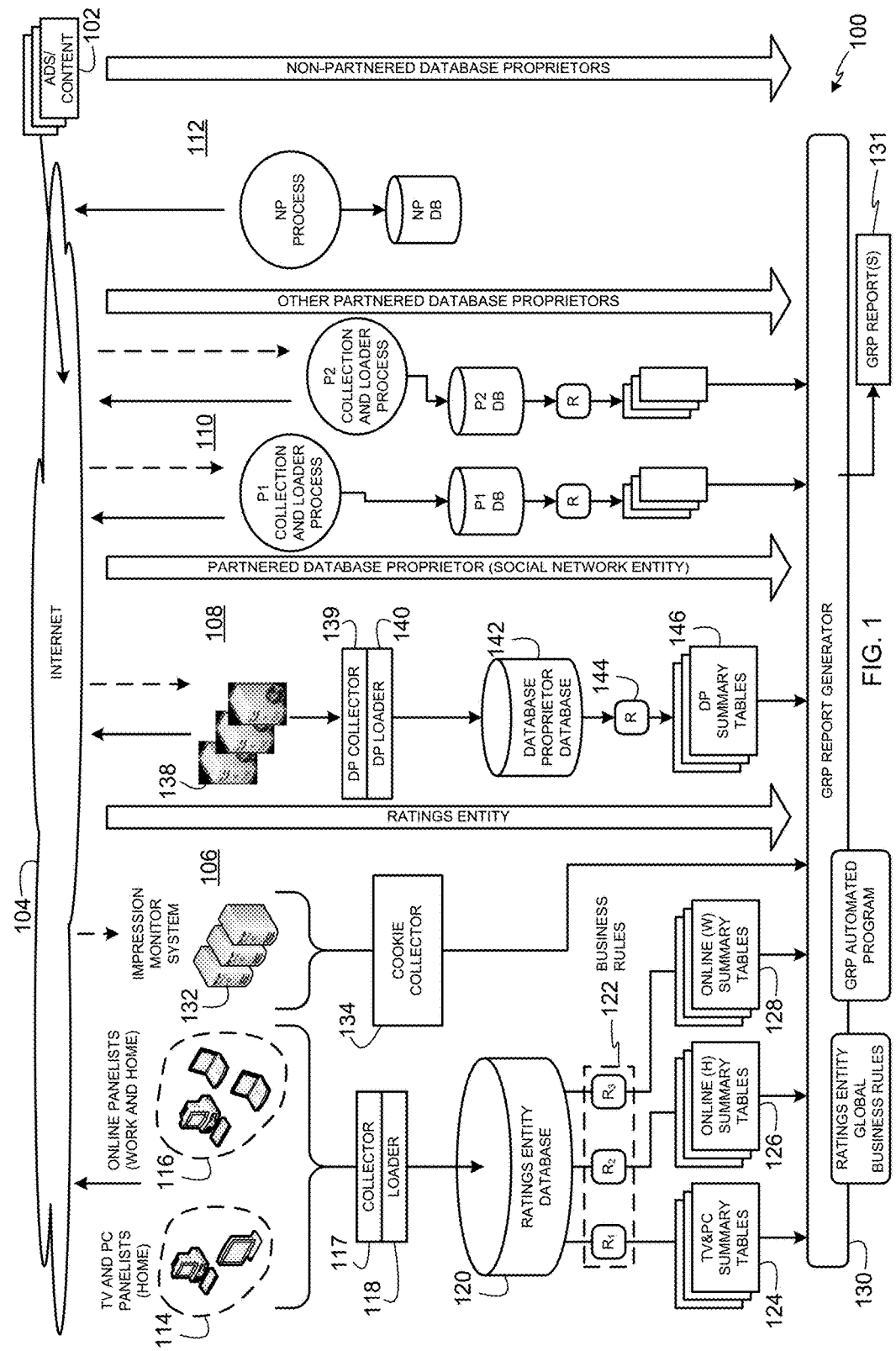
FIG. 1 depicts an example system that may be used to determine advertisement viewership using distributed demographic information.

Although the following discloses example methods, apparatus, systems, and articles of manufacture including, among other components, firmware and/or software executed on hardware, it should be noted that such methods, apparatus, systems, and articles of manufacture are merely illustrative and should not be considered as limiting. For example, it is contemplated that any or all of these hardware, firmware, and/or software components could be embodied exclusively in hardware, exclusively in firmware, exclusively in software, or in any combination of hardware, firmware, and/or software. Accordingly, while the following describes example methods, apparatus, systems, and articles of manufacture, the examples provided are not the only ways to implement such methods, apparatus, systems, and articles of manufacture.

Techniques for monitoring user access to Internet resources such as web pages, advertisements and/or other content has evolved significantly over the years. At one point in the past, such monitoring was done primarily through server logs. In particular, entities serving content on the Internet would log the number of requests received for their content at their server. Basing Internet usage research on server logs is problematic for several reasons. For example, server logs can be tampered with either directly or via zombie programs which repeatedly request content from the server to increase the server log counts. Secondly, content is sometimes retrieved once, cached locally and then repeatedly viewed from the local cache without involving the server in the repeat viewings. Server logs cannot track these views of cached content. Thus, server logs are susceptible to both over-counting and under-counting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein Internet content to be tracked is tagged with beacon instructions. In particular, monitoring instructions are associated with the HTML of the content to be tracked. When a client requests the content, both the content and the beacon instructions are downloaded to the client. The beacon instructions are, thus, executed whenever the content is accessed, be it from a server or from a cache.

The beacon instructions cause monitoring data reflecting information about the access to the content to be sent from the client that downloaded the content to a monitoring entity. Typically, the monitoring entity is an audience measurement entity that did not provide the content to the client and who is a trusted third party for providing accurate usage statistics (e.g., The Nielsen Company, LLC). Advantageously, because the beaconing instructions are associated with the content and executed by the client browser whenever the content is accessed, the monitoring information is provided to the audience measurement company irrespective of whether the client is a panelist of the audience measurement company.

It is important, however, to link demographics to the monitoring information. To address this issue, the audience measurement company establishes a panel of users who have agreed to provide their demographic information and to have their Internet browsing activities monitored. When an individual joins the panel, they provide detailed information concerning their identity and demographics (e.g., gender, race, income, home location, occupation, etc.) to the audience measurement company. The audience measurement entity sets a cookie on the panelist computer that enables the audience measurement entity to identify the panelist whenever the panelist accesses tagged content and, thus, sends monitoring information to the audience measurement entity.

Since most of the clients providing monitoring information from the tagged pages are not panelists and, thus, are unknown to the audience measurement entity, it is necessary to use statistical methods to impute demographic information based on the data collected for panelists to the larger population of users providing data for the tagged content. However, panel sizes of audience measurement entities remain small compared to the general population of users. Thus, a problem is presented as to how to increase panel sizes while ensuring the demographics data of the panel is accurate.

There are many database proprietors operating on the Internet. These database proprietors provide services to large numbers of subscribers. In exchange for the provision of the service, the subscribers register with the proprietor. As part of this registration, the subscribers provide detailed demographic information. Examples of such database proprietors include social network providers such as Facebook, Myspace, etc. These database proprietors set cookies on the computers of their subscribers to enable the database proprietor to recognize the user when they visit their website.

The protocols of the Internet make cookies inaccessible outside of the domain (e.g., Internet domain, domain name, etc.) on which they were set. Thus, a cookie set in the amazon.com domain is accessible to servers in the amazon.com domain, but not to servers outside that domain. Therefore, although an audience measurement entity might find it advantageous to access the cookies set by the database proprietors, they are unable to do so.

In view of the foregoing, an audience measurement company would like to leverage the existing databases of database proprietors to collect more extensive Internet usage and demographic data. However, the audience measurement entity is faced with several problems in accomplishing this end. For example, a problem is presented as to how to access the data of the database proprietors without compromising the privacy of the subscribers, the panelists, or the proprietors of the tracked content. Another problem is how to access this data given the technical restrictions imposed by the Internet protocols that prevent the audience measurement entity from accessing cookies set by the database proprietor. Examples disclosed herein solve these problems by extending the beaconing process to encompass partnered database proprietors and by using such partners as interim data collectors.

Examples disclosed herein accomplish this task by responding to beacon requests from clients (who may not be a member of an audience member panel and, thus, may be unknown to the audience member entity) accessing tagged content by redirecting the client from the audience measurement entity to a database proprietor such as a social network site partnered with the audience member entity. The redirection initiates a communication session between the client accessing the tagged content and the database proprietor. The database proprietor (e.g., Facebook) can access any cookie it has set on the client to thereby identify the client based on the internal records of the database proprietor. In the event the client is a subscriber of the database proprietor, the database proprietor logs the impression in association with the demographics data of the client and subsequently forwards the log to the audience measurement company. In the event the client is not a subscriber of the database proprietor, the database proprietor redirects the client to the audience measurement company. The audience measurement company may then redirect the client to a second, different database proprietor that is partnered with the audience measurement entity. That second proprietor may then attempt to identify the client as explained above. This process of redirecting the client from database proprietor to database proprietor can be performed any number of times until the client is identified and the content exposure logged, or until all partners have been contacted without a successful identification of the client. The redirections all occur automatically so the user of the client is not involved in the various communication sessions and may not even know they are occurring.

The partnered database proprietors provide their logs and demographic information to the audience measurement entity which then compiles the collected data into statistical reports accurately identifying the demographics of persons accessing the tagged content. Because the identification of clients is done with reference to enormous databases of users far beyond the quantity of persons present in a conventional audience measurement panel, the data developed from this process is extremely accurate, reliable and detailed.

Significantly, because the audience measurement entity remains the first leg of the data collection process (e.g., receives the request generated by the beacon instructions from the client), the audience measurement entity is able to obscure the source of the content access being logged as well as the identity of the content itself from the database proprietors (thereby protecting the privacy of the content sources), without compromising the ability of the database proprietors to log impressions for their subscribers. Further, the Internet security cookie protocols are complied with because the only servers that access a given cookie are associated with the Internet domain (e.g., Facebook.com) that set that cookie.

Examples disclosed herein can be used to determine content impressions, advertisement impressions, content exposure, and/or advertisement exposure using demographic information, which is distributed across different databases (e.g., different website owners, service providers, etc.) on the Internet. Not only do examples disclosed herein enable more accurate correlation of Internet advertisement exposure to demographics, but they also effectively extend panel sizes and compositions beyond persons participating in the panel of an audience measurement entity and/or a ratings entity to persons registered in other Internet databases such as the databases of social medium sites such as Facebook, Twitter, Google, etc. This extension effectively leverages the content tagging capabilities of the ratings entity and the use of databases of non-ratings entities such as social media and other websites to create an enormous, demographically accurate panel that results in accurate, reliable measurements of exposures to Internet content such as advertising and/or programming.

In illustrated examples disclosed herein, advertisement exposure is measured in terms of online Gross Rating Points. A Gross Rating Point (GRP) is a unit of measurement of audience size that has traditionally been used in the television ratings context. It is used to measure exposure to one or more programs, advertisements, or commercials, without regard to multiple exposures of the same advertising to individuals. In terms of television (TV) advertisements, one GRP is equal to 1% of TV households. While GRPs have traditionally been used as a measure of television viewership, examples disclosed herein develop online GRPs for online advertising to provide a standardized metric that can be used across the Internet to accurately reflect online advertisement exposure. Such standardized online GRP measurements can provide greater certainty to advertisers that their online advertisement money is well spent. It can also facilitate cross-medium comparisons such as viewership of TV advertisements and online advertisements. Because the examples disclosed herein associate viewership measurements with corresponding demographics of users, the information collected by examples disclosed herein may also be used by advertisers to identify segments reached by their advertisements and/or to target particular markets with future advertisements.

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets. Unlike traditional techniques in which audience measurement entities rely solely on their own panel member data to collect demographics-based audience measurement, examples disclosed herein enable an audience measurement entity to share demographic information with other entities that operate based on user registration models. As used herein, a user registration model is a model in which users subscribe to services of those entities by creating an account and providing demographic-related information about themselves. Sharing of demographic information associated with registered users of database proprietors enables an audience measurement entity to extend or supplement their panel data with substantially reliable demographics information from external sources (e.g., database proprietors), thus extending the coverage, accuracy, and/or completeness of their demographics-based audience measurements. Such access also enables the audience measurement entity to monitor persons who would not otherwise have joined an audience measurement panel. Any entity having a database identifying demographics of a set of individuals may cooperate with the audience measurement entity. Such entities may be referred to as "database proprietors" and include entities such as Facebook, Google, Yahoo!, MSN, Twitter, Apple iTunes, Experian, etc.

Examples disclosed herein may be implemented by an audience measurement entity (e.g., any entity interested in measuring or tracking audience exposures to advertisements, content, and/or any other media) in cooperation with any number of database proprietors such as online web services providers to develop online GRPs. Such database proprietors/online web services providers may be social network sites (e.g., Facebook, Twitter, MySpace, etc.), multi-service sites (e.g., Yahoo!, Google, Experian, etc.), online retailer sites (e.g., Amazon.com, Buy.com, etc.), and/or any other web service(s) site that maintains user registration records.

To increase the likelihood that measured viewership is accurately attributed to the correct demographics, examples disclosed herein use demographic information located in the audience measurement entity's records as well as demographic information located at one or more database proprietors (e.g., web service providers) that maintain records or profiles of users having accounts therewith. In this manner, examples disclosed herein may be used to supplement demographic information maintained by a ratings entity (e.g., an audience measurement company such as The Nielsen Company of Schaumburg, Ill., United States of America, that collects media exposure measurements and/or demographics) with demographic information from one or more different database proprietors (e.g., web service providers).

The use of demographic information from disparate data sources (e.g., high-quality demographic information from the panels of an audience measurement company and/or registered user data of web service providers) results in improved reporting effectiveness of metrics for both online and offline advertising campaigns. Example techniques disclosed herein use online registration data to identify demographics of users and use server impression counts, tagging (also referred to as beaconing), and/or other techniques to track quantities of impressions attributable to those users. Online web service providers such as social networking sites (e.g., Facebook) and multi-service providers (e.g., Yahoo!, Google, Experian, etc.) (collectively and individually referred to herein as online database proprietors) maintain detailed demographic information (e.g., age, gender, geographic location, race, income level, education level, religion, etc.) collected via user registration processes. An impression corresponds to a home or individual having been exposed to the corresponding media content and/or advertisement. Thus, an impression represents a home or an individual having been exposed to an advertisement or content or group of advertisements or content. In Internet advertising, a quantity of impressions or impression count is the total number of times an advertisement or advertisement campaign has been accessed by a web population (e.g., including number of times accessed as decreased by, for example, pop-up blockers and/or increased by, for example, retrieval from local cache memory).

In examples disclosed herein, multiple database proprietors collect impression information associated with a same impression. The multiple database proprietors provide the impression information to an audience measurement system. When using multiple database proprietors to collect impression information, a number of reported unique audience members and/or impressions may be duplicated (e.g., reported by both database proprietors). Duplication of impression information results in a single impression being logged in the data as multiple impressions. Due to the duplication of audience members and/or impressions between different data providers, a total audience and/or total number of impressions cannot be accurately determined simply by adding the data from the two database proprietors. Additionally, duplication is not necessarily uniform across demographic groups and, therefore, can result in an inaccurate distribution of demographic groups being reported for the media. Examples disclosed herein de-duplicate the impression information by subtracting the unique audience and/or impressions that have been duplicated from the total unique audience and/or total impressions determined from the multiple database proprietors. Examples disclosed herein perform de-duplication of the unique audience and/or impressions by employing an approach similar to the Danaher de-duplication approach.

As used herein, the "audience" of a designated item of media refers to the number of persons who have viewed the designated item of media. An "audience member" of an audience refers to an individual person within the audience. Whereas the calculation of the audience of a media item may, in some circumstances discussed herein, count a single audience member multiple times, the "unique audience" of an item of media is an audience of the item of media each audience members is represented only once.

Danaher, P. J., 1991 ("A Canonical Expansion Model for Multivariate. Media Exposure Distributions: A Generalization of the 'Duplication of Viewing Law.'" Journal of Marketing Research 28(361-367)) proposed a two-vehicle model for estimating duplication probability ($p_{12}$) as shown in Equation 1 below.

$$p_{12} = p_1 p_2 \left(1 + \rho \frac{(1-p_1)(1-p_2)}{\sqrt{p_1(1-p_1)p_2(1-p_2)}}\right) \quad \text{Equation 1}$$

In Equation 1 above, $p_1$ is the marginal probability of exposure to a first media vehicle, $p_2$ is the marginal probability of exposure to a second media vehicle, and $\rho$ (rho) is the correlation (e.g., proportion of overlap) between the first and second media vehicles. As applied to media and impression measurement, the probabilities $p_1$ and $p_2$ are synonymous with the reach of the first and second media vehicles.

Methods and apparatus disclosed herein modify the Danaher method to de-duplicate impression information without comparing the impression information at the impression level, which would require large amounts of computing resources. In some such examples, the first and second media vehicles of Danaher are replaced with the first and second database proprietors. Some such examples determine the reach of the first and second database proprietors by identifying cookies associated with the first and/or second database proprietors and determining a proportion of computers (e.g., panelist computers) that have stored cookies for both the first and second database proprietors (as opposed to cookies for only the first database proprietor, only the second database proprietor, or neither of the database proprietors).

Examples disclosed herein calculate duplicate reach ($p_{12}$) as a function of random duplication (i.e., $p_1 p_2$) multiplied by a factor (1+k), where k is determined according to Equation 2 below.

$$k = \rho \frac{(1-p_1)(1-p_2)}{\sqrt{p_1(1-p_1)p_2(1-p_2)}} \quad \text{Equation 2}$$

While disclosed examples are described herein with reference to two database proprietors, the examples may be expanded or otherwise modified to accommodate more than two database proprietors.

Examples disclosed herein can be efficiently applied using known values of $p_1$ and $p_2$ (e.g., the online reach from the database proprietors). By estimating the correlation or proportion of overlap (e.g., $\rho$) between the chosen database proprietors, examples disclosed herein may be efficiently and rapidly applied to de-duplicate the reported audiences. Example methods and apparatus disclosed herein can be applied in real-time to incoming data, and may be used to determine audience or impression information for any desirable time period (e.g., hourly, daily, weekly, monthly, etc.) and/or cumulatively. Examples disclosed herein may use aggregated audience information as input. As a result, the impression and/or audience information does not need to be processed at an individual impression level or respondent level. Furthermore, examples disclosed herein can be scaled to accommodate any number of database proprietors.

FIG. 1 depicts an example system 100 that may be used to determine media exposure (e.g., exposure to content and/or advertisements) based on demographic information collected by one or more database proprietors. "Distributed demographics information" is used herein to refer to demographics information obtained from at least two sources, at least one of which is a database proprietor such as an online web services provider. In the illustrated example, content providers and/or advertisers distribute advertisements 102 via the Internet 104 to users that access websites and/or online television services (e.g., web-based TV, Internet protocol TV (IPTV), etc.). The advertisements 102 may additionally or alternatively be distributed through broadcast television services to traditional non-Internet based (e.g., RF, terrestrial or satellite based) television sets and monitored for viewership using the techniques described herein and/or other techniques. Websites, movies, television and/or other programming is generally referred to herein as content. Advertisements are typically distributed with content. Traditionally, content is provided at little or no cost to the audience because it is subsidized by advertisers who pay to have their advertisements distributed with the content.

In the illustrated example, the advertisements 102 may form one or more ad campaigns and are encoded with identification codes (e.g., metadata) that identify the associated ad campaign (e.g., campaign ID), a creative type ID (e.g., identifying a Flash-based ad, a banner ad, a rich type ad, etc.), a source ID (e.g., identifying the ad publisher), and a placement ID (e.g., identifying the physical placement of the ad on a screen). The advertisements 102 are also tagged or encoded to include computer executable beacon instructions (e.g., Java, javascript, or any other computer language or script) that are executed by web browsers that access the advertisements 102 on, for example, the Internet. Computer executable beacon instructions may additionally or alternatively be associated with content to be monitored. Thus, although this disclosure frequently speaks in the area of tracking advertisements, it is not restricted to tracking any particular type of media. On the contrary, it can be used to track content or advertisements of any type or form in a network. Irrespective of the type of content being tracked, execution of the beacon instructions causes the web browser to send an impression request (e.g., referred to herein as beacon requests) to a specified server (e.g., the audience measurement entity). The beacon request may be implemented as an HTTP request. However, whereas a transmitted HTML request identifies a webpage or other resource to be downloaded, the beacon request includes the audience measurement information (e.g., ad campaign identification, content identifier, and/or user identification information) as its payload. The server to which the beacon request is directed is programmed to log the audience measurement data of the beacon request as an impression (e.g., an ad and/or content impressions depending on the nature of the media tagged with the beaconing instruction).

In some example implementations, advertisements tagged with such beacon instructions may be distributed with Internet-based media content including, for example, web pages, streaming video, streaming audio, IPTV content, etc. and used to collect demographics-based impression data. As noted above, methods, apparatus, and/or articles of manufacture disclosed herein are not limited to advertisement monitoring but can be adapted to any type of content monitoring (e.g., web pages, movies, television programs, etc.). Example techniques that may be used to implement such beacon instructions are disclosed in Blumenau, U.S. Pat. No. 6,108,637, which is hereby incorporated herein by reference in its entirety.

Although exampled are disclosed herein as using beacon instructions executed by web browsers to send beacon requests to specified impression collection servers, the examples disclosed herein may additionally collect data with on-device meter systems that locally collect web browsing information without relying on content or advertisements encoded or tagged with beacon instructions. In such examples, locally collected web browsing behavior may subsequently be correlated with user demographic data based on user IDs as disclosed herein.

The example system 100 of FIG. 1 includes a ratings entity subsystem 106, a partner database proprietor subsystem 108 (implemented in this example by a social network service provider), other partnered database proprietor (e.g., web service provider) subsystems 110, and non-partnered database proprietor (e.g., web service provider) subsystems 112. In the illustrated example, the ratings entity subsystem 106 and the partnered database proprietor subsystems 108, 110 correspond to partnered business entities that have agreed to share demographic information and to capture impressions in response to redirected beacon requests as explained below. The partnered business entities may participate to advantageously have the accuracy and/or completeness of their respective demographic information confirmed and/or increased. The partnered business entities also participate in reporting impressions that occurred on their websites. In the illustrated example, the other partnered database proprietor subsystems 110 include components, software, hardware, and/or processes similar or identical to the partnered database proprietor subsystem 108 to collect and log impressions (e.g., advertisement and/or content impressions) and associate demographic information with such logged impressions.

The non-partnered database proprietor subsystems 112 correspond to business entities that do not participate in sharing of demographic information. However, the techniques disclosed herein do track impressions (e.g., advertising impressions and/or content impressions) attributable to the non-partnered database proprietor subsystems 112, and in some instances, one or more of the non-partnered database proprietor subsystems 112 also report characteristics of demographic uniqueness attributable to different impressions. Unique user IDs can be used to identify demographics using demographics information maintained by the partnered business entities (e.g., the ratings entity subsystem 106 and/or the database proprietor subsystems 108, 110).

The database proprietor subsystem 108 of the example of FIG. 1 is implemented by a social network proprietor such as Facebook. However, the database proprietor subsystem 108 may instead be operated by any other type of entity such as a web services entity that serves desktop/stationary computer users and/or mobile device users. In the illustrated example, the database proprietor subsystem 108 is in a first internet domain, and the partnered database proprietor subsystems 110 and/or the non-partnered database proprietor subsystems 112 are in second, third, fourth, etc. internet domains.

In the illustrated example of FIG. 1, the tracked content and/or advertisements 102 are presented to TV and/or PC (computer) panelists 114 and online only panelists 116. The panelists 114 and 116 are users registered on panels maintained by a ratings entity (e.g., an audience measurement company) that owns and/or operates the ratings entity subsystem 106. In the example of FIG. 1, the TV and PC panelists 114 include users and/or homes that are monitored for exposures to the content and/or advertisements 102 on TVs and/or computers. The online only panelists 116 include users that are monitored for exposure (e.g., content exposure and/or advertisement exposure) via online sources when at work or home. In some example implementations, TV and/or PC panelists 114 may be home-centric users (e.g., home-makers, students, adolescents, children, etc.), while online only panelists 116 may be business-centric users that are commonly connected to work-provided Internet services via office computers or mobile devices (e.g., mobile phones, smartphones, laptops, tablet computers, etc.).

To collect exposure measurements (e.g., content impressions and/or advertisement impressions) generated by meters at client devices (e.g., computers, mobile phones, smartphones, laptops, tablet computers, TVs, etc.), the ratings entity subsystem 106 includes a ratings entity collector 117 and loader 118 to perform collection and loading processes. The ratings entity collector 117 and loader 118 collect and store the collected exposure measurements obtained via the panelists 114 and 116 in a ratings entity database 120. The ratings entity subsystem 106 then processes and filters the exposure measurements based on business rules 122 and organizes the processed exposure measurements into TV&PC summary tables 124, online home (H) summary tables 126, and online work (W) summary tables 128. In the illustrated example, the summary tables 124, 126, and 128 are sent to a GRP report generator 130, which generates one or more GRP report(s) 131 to sell or otherwise provide to advertisers, publishers, manufacturers, content providers, and/or any other entity interested in such market research.

In the illustrated example of FIG. 1, the ratings entity subsystem 106 is provided with an impression monitor system 132 that is configured to track exposure quantities (e.g., content impressions and/or advertisement impressions) corresponding to content and/or advertisements presented by client devices (e.g., computers, mobile phones, smartphones, laptops, tablet computers, etc.) whether received from remote web servers or retrieved from local caches of the client devices. In some example implementations, the impression monitor system 132 may be implemented using the SiteCensus system owned and operated by The Nielsen Company. In the illustrated example, identities of users associated with the exposure quantities are collected using cookies (e.g., Universally Unique Identifiers (UUIDs)) tracked by the impression monitor system 132 when client devices present content and/or advertisements. Due to Internet security protocols, the impression monitor system 132 can only collect cookies set in its domain. Thus, if, for example, the impression monitor system 132 operates in the "Nielsen.com" domain, it can only collect cookies set by a Nielsen.com server. Thus, when the impression monitor system 132 receives a beacon request from a given client, the impression monitor system 132 only has access to cookies set on that client by a server in, for example, the Nielsen.com domain. To overcome this limitation, the impression monitor system 132 of the illustrated example is structured to forward beacon requests to one or more database proprietors partnered with the audience measurement entity. Those one or more partners can recognize cookies set in their domain (e.g., Facebook.com) and therefore log impressions in association with the subscribers associated with the recognized cookies. This process is explained further below.

In the illustrated example, the ratings entity subsystem 106 includes a ratings entity cookie collector 134 to collect cookie information (e.g., user ID information) together with content IDs and/or ad IDs associated with the cookies from the impression monitor system 132 and send the collected information to the GRP report generator 130. Again, the cookies collected by the impression monitor system 132 are those set by server(s) operating in a domain of the audience measurement entity. In some examples, the ratings entity cookie collector 134 is configured to collect logged impressions (e.g., based on cookie information and ad or content IDs) from the impression monitor system 132 and provide the logged impressions to the GRP report generator 130.

Figure 2:
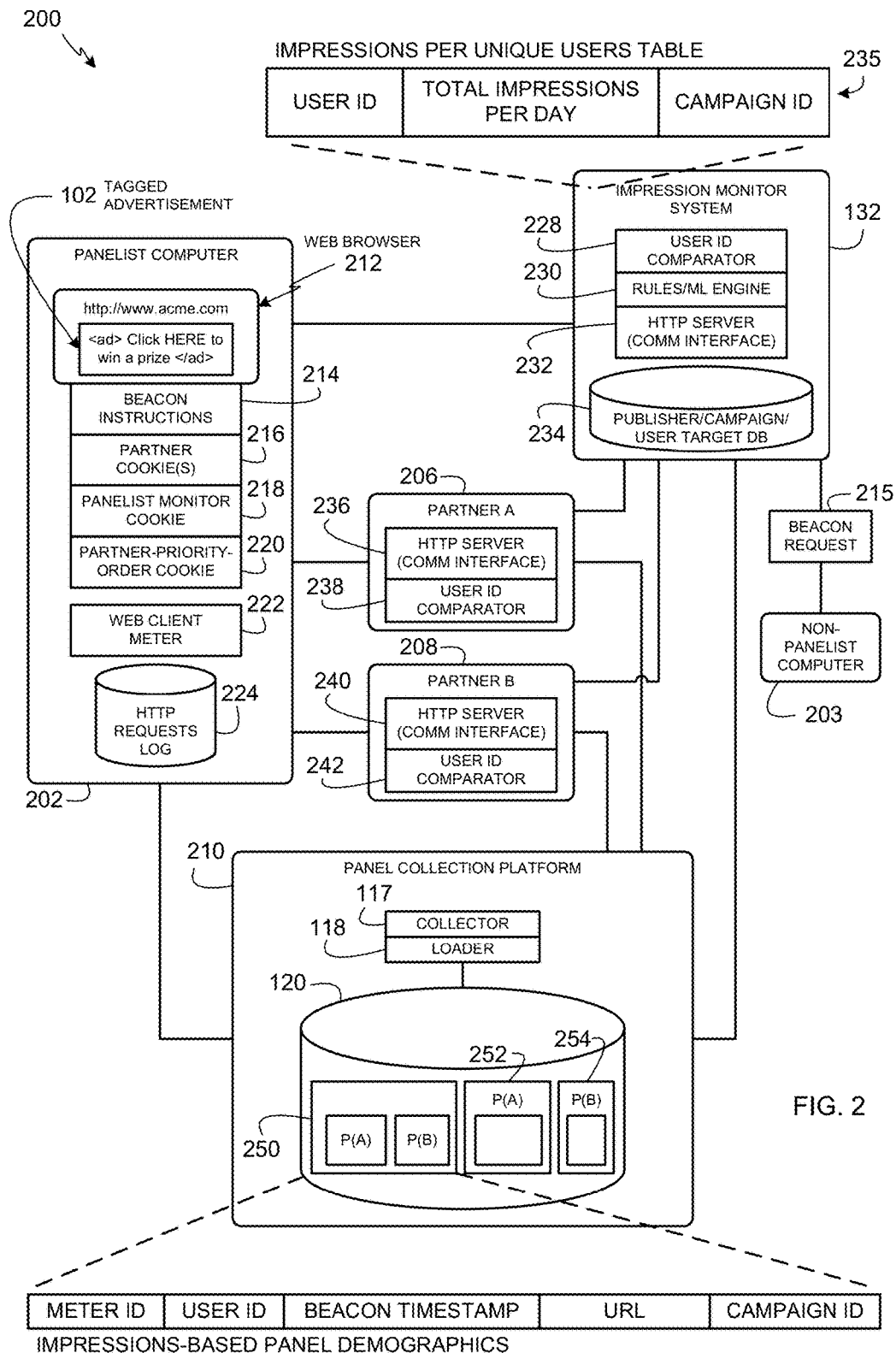
FIG. 2 depicts an example system that may be used to associate advertisement exposure measurements with user demographic information based on demographics information distributed across user account records of different web service providers.
Figure 3:
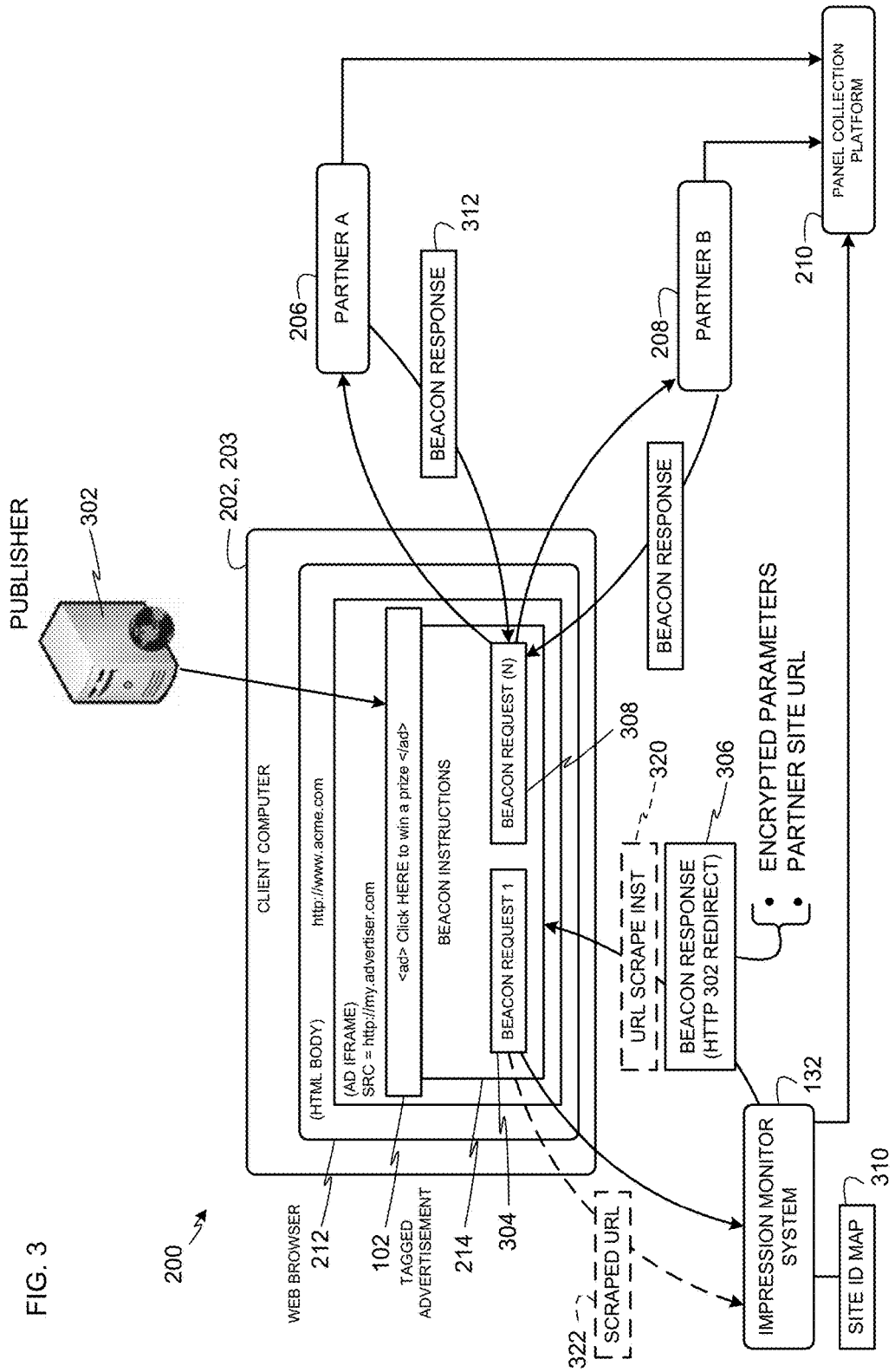
FIG. 3 is a communication flow diagram of an example manner in which a web browser can report impressions to servers having access to demographic information for a user of that web browser.

The operation of the impression monitor system 132 in connection with client devices and partner sites is described below in connection with FIGS. 2 and 3. In particular, FIGS. 2 and 3 depict how the impression monitor system 132 enables collecting user identities and tracking exposure quantities for content and/or advertisements exposed to those users. The collected data can be used to determine information about, for example, the effectiveness of advertisement campaigns.

For purposes of example, the following example involves a social network provider, such as Facebook, as the database proprietor. In the illustrated example, the database proprietor subsystem 108 includes servers 138 to store user registration information, perform web server processes to serve web pages (possibly, but not necessarily including one or more advertisements) to subscribers of the social network, to track user activity, and to track account characteristics. During account creation, the database proprietor subsystem 108 asks users to provide demographic information such as age, gender, geographic location, graduation year, quantity of group associations, and/or any other personal or demographic information. To automatically identify users on return visits to the webpage(s) of the social network entity, the servers 138 set cookies on client devices (e.g., computers and/or mobile devices of registered users, some of which may be panelists 114 and 116 of the audience measurement entity and/or may not be panelists of the audience measurement entity). The cookies may be used to identify users to track user visits to the webpages of the social network entity, to display those web pages according to the preferences of the users, etc. The cookies set by the database proprietor subsystem 108 may also be used to collect "domain specific" user activity. As used herein, "domain specific" user activity is user Internet activity occurring within the domain(s) of a single entity. Domain specific user activity may also be referred to as "intra-domain activity." The social network entity may collect intra-domain activity such as the number of web pages (e.g., web pages of the social network domain such as other social network member pages or other intra-domain pages) visited by each registered user and/or the types of devices such as mobile (e.g., smartphones) or stationary (e.g., desktop computers) devices used for such access. The servers 138 are also configured to track account characteristics such as the quantity of social connections (e.g., friends) maintained by each registered user, the quantity of pictures posted by each registered user, the quantity of messages sent or received by each registered user, and/or any other characteristic of user accounts.

The database proprietor subsystem 108 includes a database proprietor (DP) collector 139 and a DP loader 140 to collect user registration data (e.g., demographic data), intra-domain user activity data, inter-domain user activity data (as explained later) and account characteristics data. The collected information is stored in a database proprietor database 142. The database proprietor subsystem 108 processes the collected data using business rules 144 to create DP summary tables 146.

In the illustrated example, the other partnered database proprietor subsystems 110 may share with the audience measurement entity similar types of information as that shared by the database proprietor subsystem 108. In this manner, demographic information of people that are not registered users of the social network services provider may be obtained from one or more of the other partnered database proprietor subsystems 110 if they are registered users of those web service providers (e.g., Yahoo!, Google, Experian, etc.). Examples disclosed herein advantageously use this cooperation or sharing of demographic information across website domains to increase the accuracy and/or completeness of demographic information available to the audience measurement entity. By using the shared demographic data in such a combined manner with information identifying the content and/or ads 102 to which users are exposed, examples disclosed herein produce more accurate exposure-per-demographic results to enable a determination of meaningful and consistent GRPs for online advertisements.

As the system 100 expands, more partnered participants (e.g., like the partnered database proprietor subsystems 110) may join to share further distributed demographic information and advertisement viewership information for generating GRPs.

To preserve user privacy, the examples disclosed herein use double encryption techniques by each participating partner or entity (e.g., the subsystems 106, 108, 110) so that user identities are not revealed when sharing demographic and/or viewership information between the participating partners or entities. In this manner, user privacy is not compromised by the sharing of the demographic information as the entity receiving the demographic information is unable to identify the individual associated with the received demographic information unless those individuals have already consented to allow access to their information by, for example, previously joining a panel or services of the receiving entity (e.g., the audience measurement entity). If the individual is already in the receiving party's database, the receiving party will be able to identify the individual despite the encryption. However, the individual has already agreed to be in the receiving party's database, so consent to allow access to their demographic and behavioral information has previously already been received.

FIG. 2 depicts an example system 200 that may be used to associate exposure measurements with user demographic information based on demographics information distributed across user account records of different database proprietors (e.g., web service providers). The example system 200 enables the ratings entity subsystem 106 of FIG. 1 to locate a best-fit partner (e.g., the database proprietor subsystem 108 of FIG. 1 and/or one of the other partnered database proprietor subsystems 110 of FIG. 1) for each beacon request (e.g., a request from a client executing a tag associated with tagged media such as an advertisement or content that contains data identifying the media to enable an entity to log an exposure or impression). In some examples, the example system 200 uses rules and machine learning classifiers (e.g., based on an evolving set of empirical data) to determine a relatively best-suited partner that is likely to have demographics information for a user that triggered a beacon request. The rules may be applied based on a publisher level, a campaign/publisher level, or a user level. In some examples, machine learning is not employed and instead, the partners are contacted in some ordered fashion (e.g., Facebook, Myspace, then Yahoo!, etc.) until the user associated with a beacon request is identified or all partners are exhausted without an identification.

The ratings entity subsystem 106 receives and compiles the impression data from all available partners. The ratings entity subsystem 106 may weight the impression data based on the overall reach and demographic quality of the partner sourcing the data. For example, the ratings entity subsystem 106 may refer to historical data on the accuracy of a partner's demographic data to assign a weight to the logged data provided by that partner.

For rules applied at a publisher level, a set of rules and classifiers are defined that allow the ratings entity subsystem 106 to target the most appropriate partner for a particular publisher (e.g., a publisher of one or more of the advertisements or content 102 of FIG. 1). For example, the ratings entity subsystem 106 could use the demographic composition of the publisher and partner web service providers to select the partner most likely to have an appropriate user base (e.g., registered users that are likely to access content for the corresponding publisher).

For rules applied at a campaign level, for instances in which a publisher has the ability to target an ad campaign based on user demographics, the target partner site could be defined at the publisher/campaign level. For example, if an ad campaign is targeted at males aged between the ages of 18 and 25, the ratings entity subsystem 106 could use this information to direct a request to the partner most likely to have the largest reach within that gender/age group (e.g., a database proprietor that maintains a sports website, etc.).

For rules applied at the user level (or cookie level), the ratings entity subsystem 106 can dynamically select a preferred partner to identify the client and log the impression based on, for example, (1) feedback received from partners (e.g., feedback indicating that panelist user IDs did not match registered users of the partner site or indicating that the partner site does not have a sufficient number of registered users), and/or (2) user behavior (e.g., user browsing behavior may indicate that certain users are unlikely to have registered accounts with particular partner sites). In the illustrated example of FIG. 2, rules may be used to specify when to override a user level preferred partner with a publisher (or publisher campaign) level partner target.

Turning in detail to FIG. 2, a panelist computer 202 represents a computer used by one or more of the panelists 114 and 116 of FIG. 1. As shown in the example of FIG. 2, the panelist computer 202 may exchange communications with the impression monitor system 132 of FIG. 1. In the illustrated example, a partner A 206 may be the database proprietor subsystem 108 of FIG. 1 and a partner B 208 may be one of the other partnered database proprietor subsystems 110 of FIG. 1. A panel collection platform 210 contains the ratings entity database 120 of FIG. 1 to collect ad and/or content exposure data (e.g., impression data or content impression data). Interim collection platforms are likely located at the partner A 206 and partner B 208 sites to store logged impressions, at least until the data is transferred to the audience measurement entity.

The panelist computer 202 of the illustrated example executes a web browser 212 that is directed to a host website (e.g., www.acme.com) that displays one of the advertisements and/or content 102. The advertisement and/or content 102 is tagged with identifier information (e.g., a campaign ID, a creative type ID, a placement ID, a publisher source URL, etc.) and beacon instructions 214. When the beacon instructions 214 are executed by the panelist computer 202, the beacon instructions cause the panelist computer to send a beacon request to a remote server specified in the beacon instructions 214. In the illustrated example, the specified server is a server of the audience measurement entity, namely, at the impression monitor system 132. The beacon instructions 214 may be implemented using javascript or any other types of instructions or script executable via a web browser including, for example, Java, HTML, etc. It should be noted that tagged webpages and/or advertisements are processed the same way by panelist and non-panelist computers. In both systems, the beacon instructions are received in connection with the download of the tagged content and cause a beacon request to be sent from the client that downloaded the tagged content for the audience measurement entity. A non-panelist computer is shown at reference number 203. Although the client 203 is not a panelist 114, 116, the impression monitor system 132 may interact with the client 203 in the same manner as the impression monitor system 132 interacts with the client computer 202, associated with one of the panelists 114, 116. As shown in FIG. 2, the non-panelist client 203 also sends a beacon request 215 based on tagged content downloaded and presented on the non-panelist client 203. As a result, in the following description panelist computer 202 and non-panelist computer 203 are referred to generically as a "client" computer.

In the illustrated example, the web browser 212 stores one or more partner cookie(s) 216 and a panelist monitor cookie 218. Each partner cookie 216 corresponds to a respective partner (e.g., the partners A 206 and B 208) and can be used only by the respective partner to identify a user of the panelist computer 202. The panelist monitor cookie 218 is a cookie set by the impression monitor system 132 and identifies the user of the panelist computer 202 to the impression monitor system 132. Each of the partner cookies 216 is created, set, or otherwise initialized in the panelist computer 202 when a user of the computer first visits a website of a corresponding partner (e.g., one of the partners A 206 and B 208) and/or when a user of the computer registers with the partner (e.g., sets up a Facebook account). If the user has a registered account with the corresponding partner, the user ID (e.g., an email address or other value) of the user is mapped to the corresponding partner cookie 216 in the records of the corresponding partner. The panelist monitor cookie 218 is created when the client (e.g., a panelist computer or a non-panelist computer) registers for the panel and/or when the client processes a tagged advertisement. The panelist monitor cookie 218 of the panelist computer 202 may be set when the user registers as a panelist and is mapped to a user ID (e.g., an email address or other value) of the user in the records of the ratings entity. Although the non-panelist client computer 203 is not part of a panel, a panelist monitor cookie similar to the panelist monitor cookie 218 is created in the non-panelist client computer 203 when the non-panelist client computer 203 processes a tagged advertisement. In this manner, the impression monitor system 132 may collect impressions (e.g., ad impressions) associated with the non-panelist client computer 203 even though a user of the non-panelist client computer 203 is not registered in a panel and the ratings entity operating the impression monitor system 132 will not have demographics for the user of the non-panelist client computer 203.

In some examples, the web browser 212 may also include a partner-priority-order cookie 220 that is set, adjusted, and/or controlled by the impression monitor system 132 and includes a priority listing of the partners 206 and 208 (and/or other database proprietors) indicative of an order in which beacon requests should be sent to the partners 206, 208 and/or other database proprietors. For example, the impression monitor system 132 may specify that the client computer 202, 203 should first send a beacon request based on execution of the beacon instructions 214 to partner A 206 and then to partner B 208 if partner A 206 indicates that the user of the client computer 202, 203 is not a registered user of partner A 206. In this manner, the client computer 202, 203 can use the beacon instructions 214 in combination with the priority listing of the partner-priority-order cookie 220 to send an initial beacon request to an initial partner and/or other initial database proprietor and one or more redirected beacon requests to one or more secondary partners and/or other database proprietors until one of the partners 206 and 208 and/or other database proprietors confirms that the user of the panelist computer 202 is a registered user of the partner's or other database proprietor's services and is able to log an impression (e.g., an ad impression, a content impression, etc.) and provide demographic information for that user (e.g., demographic information stored in the database proprietor database 142 of FIG. 1), or until all partners have been tried without a successful match. In other examples, the partner-priority-order cookie 220 may be omitted and the beacon instructions 214 may be configured to cause the client computer 202, 203 to unconditionally send beacon requests to all available partners and/or other database proprietors so that all of the partners and/or other database proprietors have an opportunity to log an impression. In yet other examples, the beacon instructions 214 may be configured to cause the client computer 202, 203 to receive instructions from the impression monitor system 132 on an order in which to send redirected beacon requests to one or more partners and/or other database proprietors.

To monitor browsing behavior and track activity of the partner cookie(s) 216, the panelist computer 202 is provided with a web client meter 222. In addition, the panelist computer 202 is provided with an HTTP request log 224 in which the web client meter 222 may store or log HTTP requests in association with a meter ID of the web client meter 222, user IDs originating from the panelist computer 202, beacon request timestamps (e.g., timestamps indicating when the panelist computer 202 sent beacon requests such as the beacon requests 304 and 308 of FIG. 3), uniform resource locators (URLs) of websites that displayed advertisements, and ad campaign IDs. In the illustrated example, the web client meter 222 stores user IDs of the partner cookie(s) 216 and the panelist monitor cookie 218 in association with each logged HTTP request in the HTTP requests log 224. In some examples, the HTTP requests log 224 can additionally or alternatively store other types of requests such as file transfer protocol (FTP) requests and/or any other internet protocol requests. The web client meter 222 of the illustrated example can communicate such web browsing behavior or activity data in association with respective user IDs from the HTTP requests log 224 to the panel collection platform 210. In some examples, the web client meter 222 may also be advantageously used to log impressions for untagged content or advertisements. Unlike tagged advertisements and/or tagged content that include the beacon instructions 214 causing a beacon request to be sent to the impression monitor system 132 (and/or one or more of the partners 206, 208 and/or other database proprietors) identifying the exposure or impression to the tagged content to be sent to the audience measurement entity for logging, untagged advertisements and/or advertisements do not have such beacon instructions 214 to create an opportunity for the impression monitor system 132 to log an impression. In such instances, HTTP requests logged by the web client meter 222 can be used to identify any untagged content or advertisements that were rendered by the web browser 212 on the panelist computer 202.

In the illustrated example, the impression monitor system 132 is provided with a user ID comparator 228, a rules/machine learning (ML) engine 230, an HTTP server 232, and a publisher/campaign/user target database 234. The user ID comparator 228 of the illustrated example is provided to identify beacon requests from users that are panelists 114, 116. In the illustrated example, the HTTP server 232 is a communication interface via which the impression monitor system 132 exchanges information (e.g., beacon requests, beacon responses, acknowledgements, failure status messages, etc.) with the client computer 202, 203. The rules/ML engine 230 and the publisher/campaign/user target database 234 of the illustrated example enable the impression monitor system 132 to target the 'best fit' partner (e.g., one of the partners 206 or 208) for each impression request (or beacon request) received from the client computer 202, 203. The 'best fit' partner is the partner most likely to have demographic data for the user(s) of the client computer 202, 203 sending the impression request. The rules/ML engine 230 is a set of rules and machine learning classifiers generated based on evolving empirical data stored in the publisher/campaign/user target database 234. In the illustrated example, rules can be applied at the publisher level, publisher/campaign level, or user level. In addition, partners may be weighted based on their overall reach and demographic quality.

To target partners (e.g., the partners 206 and 208) at the publisher level of ad campaigns, the rules/ML engine 230 contains rules and classifiers that allow the impression monitor system 132 to target the 'best fit' partner for a particular publisher of ad campaign(s). For example, the impression monitoring system 132 could use an indication of target demographic composition(s) of publisher(s) and partner(s) (e.g., as stored in the publisher/campaign/user target database 234) to select a partner (e.g., one of the partners 206, 208) that is most likely to have demographic information for a user of the client computer 202, 203 requesting the impression.

To target partners (e.g., the partners 206 and 208) at the campaign level (e.g., a publisher has the ability to target ad campaigns based on user demographics), the rules/ML engine 230 of the illustrated example are used to specify target partners at the publisher/campaign level. For example, if the publisher/campaign/user target database 234 stores information indicating that a particular ad campaign is targeted at males aged 18 to 25, the rules/ML engine 230 uses this information to indicate a beacon request redirect to a partner most likely to have the largest reach within this gender/age group.

To target partners (e.g., the partners 206 and 208) at the cookie level, the impression monitor system 132 updates target partner sites based on feedback received from the partners. Such feedback could indicate user IDs that did not correspond or that did correspond to registered users of the partner(s). In some examples, the impression monitor system 132 could also update target partner sites based on user behavior. For example, such user behavior could be derived from analyzing cookie clickstream data corresponding to browsing activities associated with panelist monitor cookies (e.g., the panelist monitor cookie 218). In the illustrated example, the impression monitor system 132 uses such cookie clickstream data to determine age/gender bias for particular partners by determining ages and genders of which the browsing behavior is more indicative. In this manner, the impression monitor system 132 of the illustrated example can update a target or preferred partner for a particular user or client computer 202, 203. In some examples, the rules/ML engine 230 specify when to override user-level preferred target partners with publisher or publisher/campaign level preferred target partners. For example such a rule may specify an override of user-level preferred target partners when the user-level preferred target partner sends a number of indications that it does not have a registered user corresponding to the client computer 202, 203 (e.g., a different user on the client computer 202, 203 begins using a different browser having a different user ID in its partner cookie 216).

In the illustrated example, the impression monitor system 132 logs impressions (e.g., ad impressions, content impressions, etc.) in an impressions per unique users table 235 based on beacon requests (e.g., the beacon request 304 of FIG. 3) received from client computers (e.g., the client computer 202, 203). In the illustrated example, the impressions per unique users table 235 stores unique user IDs obtained from cookies (e.g., the panelist monitor cookie 218) in association with total impressions per day and campaign IDs. In this manner, for each campaign ID, the impression monitor system 132 logs the total impressions per day that are attributable to a particular user or client computer 202, 203.

Each of the partners 206 and 208 of the illustrated example employs an HTTP server 236 and 240 and a user ID comparator 238 and 242. In the illustrated example, the HTTP servers 236 and 240 are communication interfaces via which their respective partners 206 and 208 exchange information (e.g., beacon requests, beacon responses, acknowledgements, failure status messages, etc.) with the client computer 202, 203. The user ID comparators 238 and 242 are configured to compare user cookies received from a client 202, 203 against the cookie in their records to identify the client 202, 203, if possible. In this manner, the user ID comparators 238 and 242 can be used to determine whether users of the panelist computer 202 have registered accounts with the partners 206 and 208. If so, the partners 206 and 208 can log impressions attributed to those users and associate those impressions with the demographics of the identified user (e.g., demographics stored in the database proprietor database 142 of FIG. 1).

In the illustrated example, the panel collection platform 210 is used to identify registered users of the partners 206, 208 that are also panelists 114, 116. The panel collection platform 210 can then use this information to cross-reference demographic information stored by the ratings entity subsystem 106 for the panelists 114, 116 with demographic information stored by the partners 206 and 208 for their registered users. The ratings entity subsystem 106 can use such cross-referencing to determine the accuracy of the demographic information collected by the partners 206 and 208 based on the demographic information of the panelists 114 and 116 collected by the ratings entity subsystem 106.

In some examples, the example collector 117 of the panel collection platform 210 collects web-browsing activity information from the panelist computer 202. In such examples, the example collector 117 requests logged data from the HTTP requests log 224 of the panelist computer 202 and logged data collected by other panelist computers (not shown). In addition, the collector 117 collects panelist user IDs from the impression monitor system 132 that the impression monitor system 132 tracks as having set in panelist computers. Also, the collector 117 collects partner user IDs from one or more partners (e.g., the partners 206 and 208) that the partners track as having been set in panelist and non-panelist computers. In some examples, to abide by privacy agreements of the partners 206, 208, the collector 117 and/or the database proprietors 206, 208 can use a hashing technique (e.g., a double-hashing technique) to hash the database proprietor cookie IDs.

In some examples, the loader 118 of the panel collection platform 210 analyzes and sorts the received panelist user IDs and the partner user IDs. In the illustrated example, the loader 118 analyzes received logged data from panelist computers (e.g., from the HTTP requests log 224 of the panelist computer 202) to identify panelist user IDs (e.g., the panelist monitor cookie 218) associated with partner user IDs (e.g., the partner cookie(s) 216). In this manner, the loader 118 can identify which panelists (e.g., ones of the panelists 114 and 116) are also registered users of one or more of the partners 206 and 208 (e.g., the database proprietor subsystem 108 of FIG. 1 having demographic information of registered users stored in the database proprietor database 142). In some examples, the panel collection platform 210 operates to verify the accuracy of impressions collected by the impression monitor system 132. In such some examples, the loader 118 filters the logged HTTP beacon requests from the HTTP requests log 224 that correlate with impressions of panelists logged by the impression monitor system 132 and identifies HTTP beacon requests logged at the HTTP requests log 224 that do not have corresponding impressions logged by the impression monitor system 132. In this manner, the panel collection platform 210 can provide indications of inaccurate impression logging by the impression monitor system 132 and/or provide impressions logged by the web client meter 222 to fill-in impression data for panelists 114, 116 missed by the impression monitor system 132.

In the illustrated example, the loader 118 stores overlapping users in an impressions-based panel demographics table 250. In the illustrated example, overlapping users are users that are panelist members 114, 116 and registered users of partner A 206 (noted as users P(A)) and/or registered users of partner B 208 (noted as users P(B)). (Although only two partners (A and B) are shown, this is for simplicity of illustration, any number of partners may be represented in the table 250. The impressions-based panel demographics table 250 of the illustrated example is shown storing meter IDs (e.g., of the web client meter 222 and web client meters of other computers), user IDs (e.g., an alphanumeric identifier such as a user name, email address, etc. corresponding to the panelist monitor cookie 218 and panelist monitor cookies of other panelist computers), beacon request timestamps (e.g., timestamps indicating when the panelist computer 202 and/or other panelist computers sent beacon requests such as the beacon requests 304 and 308 of FIG. 3), uniform resource locators (URLs) of websites visited (e.g., websites that displayed advertisements), and ad campaign IDs. In addition, the loader 118 of the illustrated example stores partner user IDs that do not overlap with panelist user IDs in a partner A (P(A)) cookie table 252 and a partner B (P(B)) cookie table 254.

Example processes performed by the example system 200 are described below in connection with the communications flow diagram of FIG. 3 and the flow diagrams of FIGS. 10, 11, and 12.

While an example manner of implementing the ratings entity subsystem 106 is illustrated in FIGS. 1 and 2, one or more of the elements, processes and/or devices illustrated in FIGS. 1 and 2 may be combined, divided, re-arranged, omitted, eliminated and/or implemented in any other way.

Further, the example impression monitor system 132, the example rules/ML engine 230, the example HTTP server communication interface 232, the example publisher/campaign/user target database 232, the example GRP report generator 130, the example panel collection platform 210, the example collector 117, the example loader 118, the example ratings entity database 120 and/or, more generally, the example ratings entity subsystem 106 of FIGS. 1 and 2 may be implemented by hardware, software, firmware and/or any combination of hardware, software and/or firmware. Thus, for example, any of the example impression monitor system 132, the example rules/ML engine 230, the example HTTP server communication interface 232, the example publisher/campaign/user target database 232, the example GRP report generator 130, the example panel collection platform 210, the example collector 117, the example loader 118, the example ratings entity database 120 and/or, more generally, the example ratings entity subsystem 106 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example impression monitor system 132, the example rules/ML engine 230, the example HTTP server communication interface 232, the example publisher/campaign/user target database 232, the example GRP report generator 130, the example panel collection platform 210, the example collector 117, the example loader 118, and/or the example ratings entity database 120 is/are hereby expressly defined to include a tangible computer readable storage device or storage disk such as a memory, a digital versatile disk (DVD), a compact disk (CD), a Blu-ray disk, etc. storing the software and/or firmware. Further still, the example ratings entity subsystem 106 of FIGS. 1 and 2 may include one or more elements, processes and/or devices in addition to, or instead of, those illustrated in FIGS. 1 and 2, and/or may include more than one of any or all of the illustrated elements, processes and devices.

Turning to FIG. 3, an example communication flow diagram shows an example manner in which the example system 200 of FIG. 2 logs impressions by clients (e.g., clients 202, 203). The example chain of events shown in FIG. 3 occurs when a client 202, 203 accesses a tagged advertisement or tagged content. Thus, the events of FIG. 3 begin when a client sends an HTTP request to a server for content and/or an advertisement, which, in this example, is tagged to forward an exposure request to the ratings entity. In the illustrated example of FIG. 3, the web browser of the client 202, 203 receives the requested content or advertisement (e.g., the content or advertisement 102) from a publisher (e.g., ad publisher 302). It is to be understood that the client 202, 203 often requests a webpage containing content of interest (e.g., www.weather.com) and the requested webpage contains links to ads that are downloaded and rendered within the webpage. The ads may come from different servers than the originally requested content. Thus, the requested content may contain instructions that cause the client 202, 203 to request the ads (e.g., from the ad publisher 302) as part of the process of rendering the webpage originally requested by the client. The webpage, the ad or both may be tagged. In the illustrated example, the uniform resource locator (URL) of the ad publisher is illustratively named http://my.advertiser.com.

For purposes of the following illustration, it is assumed that the advertisement 102 is tagged with the beacon instructions 214 (FIG. 2). Initially, the beacon instructions 214 cause the web browser of the client 202 or 203 to send a beacon request 304 to the impression monitor system 132 when the tagged ad is accessed. In the illustrated example, the web browser sends the beacon request 304 using an HTTP request addressed to the URL of the impression monitor system 132 at, for example, a first internet domain. The beacon request 304 includes one or more of a campaign ID, a creative type ID, and/or a placement ID associated with the advertisement 102. In addition, the beacon request 304 includes a document referrer (e.g., www.acme.com), a timestamp of the impression, and a publisher site ID (e.g., the URL http://my.advertiser.com of the ad publisher 302). In addition, if the web browser of the client 202 or 203 contains the panelist monitor cookie 218, the beacon request 304 will include the panelist monitor cookie 218. In other example implementations, the cookie 218 may not be passed until the client 202 or 203 receives a request sent by a server of the impression monitor system 132 in response to, for example, the impression monitor system 132 receiving the beacon request 304.

In response to receiving the beacon request 304, the impression monitor system 132 logs an impression by recording the ad identification information (and any other relevant identification information) contained in the beacon request 304. In the illustrated example, the impression monitor system 132 logs the impression regardless of whether the beacon request 304 indicated a user ID (e.g., based on the panelist monitor cookie 218) that matched a user ID of a panelist member (e.g., one of the panelists 114 and 116 of FIG. 1). However, if the user ID (e.g., the panelist monitor cookie 218) matches a user ID of a panelist member (e.g., one of the panelists 114 and 116 of FIG. 1) set by and, thus, stored in the record of the ratings entity subsystem 106, the logged impression will correspond to a panelist of the impression monitor system 132. If the user ID does not correspond to a panelist of the impression monitor system 132, the impression monitor system 132 will still benefit from logging an impression even though it will not have a user ID record (and, thus, corresponding demographics) for the impression reflected in the beacon request 304.

In the illustrated example of FIG. 3, to compare or supplement panelist demographics (e.g., for accuracy or completeness) of the impression monitor system 132 with demographics at partner sites and/or to enable a partner site to attempt to identify the client and/or log the impression, the impression monitor system 132 returns a beacon response message 306 (e.g., a first beacon response) to the web browser of the client 202, 203 including an HTTP 302 redirect message and a URL of a participating partner at, for example, a second internet domain. In the illustrated example, the HTTP 302 redirect message instructs the web browser of the client 202, 203 to send a second beacon request 308 to the particular partner (e.g., one of the partners A 206 or B 208). In other examples, instead of using an HTTP 302 redirect message, redirects may instead be implemented using, for example, an iframe source instructions (e.g., <iframe src=" ">) or any other instruction that can instruct a web browser to send a subsequent beacon request (e.g., the second beacon request 308) to a partner. In the illustrated example, the impression monitor system 132 determines the partner specified in the beacon response 306 using its rules/ML engine 230 (FIG. 2) based on, for example, empirical data indicative of which partner should be preferred as being most likely to have demographic data for the user ID. In other examples, the same partner is always identified in the first redirect message and that partner always redirects the client 202, 203 to the same second partner when the first partner does not log the impression. In other words, a set hierarchy of partners is defined and followed such that the partners are "daisy chained" together in the same predetermined order rather than them trying to guess a most likely database proprietor to identify an unknown client 203.

Prior to sending the beacon response 306 to the web browser of the client 202, 203, the impression monitor system 132 of the illustrated example replaces a site ID (e.g., a URL) of the ad publisher 302 with a modified site ID (e.g., a substitute site ID) which is discernable only by the impression monitor system 132 as corresponding to the ad publisher 302. In some example implementations, the impression monitor system 132 may also replace the host website ID (e.g., www.acme.com) with another modified site ID (e.g., a substitute site ID) which is discernable only by the impression monitor system 132 as corresponding to the host website. In this way, the source(s) of the ad and/or the host content are masked from the partners. In the illustrated example, the impression monitor system 132 maintains a publisher ID mapping table 310 that maps original site IDs of ad publishers with modified (or substitute) site IDs created by the impression monitor system 132 to obfuscate or hide ad publisher identifiers from partner sites. In some examples, the impression monitor system 132 also stores the host website ID in association with a modified host website ID in a mapping table. In addition, the impression monitor system 132 encrypts all of the information received in the beacon request 304 and the modified site ID to prevent any intercepting parties from decoding the information. The impression monitor system 132 of the illustrated example sends the encrypted information in the beacon response 306 to the web browser 212. In the illustrated example, the impression monitor system 132 uses an encryption that can be decrypted by the selected partner site specified in the HTTP 302 redirect.

In some examples, the impression monitor system 132 also sends a URL scrape instruction 320 to the client computer 202, 302. In such examples, the URL scrape instruction 320 causes the client computer 202, 203 to "scrape" the URL of the webpage or website associated with the tagged advertisement 102. For example, the client computer 202, 203 may perform scraping of web page URLs by reading text rendered or displayed at a URL address bar of the web browser 212. The client computer 202, 203 then sends a scraped URL 322 to the impression monitor system 132. In the illustrated example, the scraped URL 322 indicates the host website (e.g., http://www.acme.com) that was visited by a user of the client computer 202, 203 and in which the tagged advertisement 102 was displayed. In the illustrated example, the tagged advertisement 102 is displayed via an ad iFrame having a URL 'my.advertiser.com,' which corresponds to an ad network (e.g., the publisher 302) that serves the tagged advertisement 102 on one or more host websites. However, in the illustrated example, the host website indicated in the scraped URL 322 is 'www.acme.com,' which corresponds to a website visited by a user of the client computer 202, 203.

URL scraping is particularly useful under circumstances in which the publisher is an ad network from which an advertiser bought advertisement space/time. In such instances, the ad network dynamically selects from subsets of host websites (e.g., www.caranddriver.com, www.espn.com, www.allrecipes.com, etc.) visited by users on which to display ads via ad iFrames. However, the ad network cannot foretell definitively the host websites on which the ad will be displayed at any particular time. In addition, the URL of an ad iFrame in which the tagged advertisement 102 is being rendered may not be useful to identify the topic of a host website (e.g., www.acme.com in the example of FIG. 3) rendered by the web browser 212. As such, the impression monitor system 132 may not know the host website in which the ad iFrame is displaying the tagged advertisement 102.

The URLs of host websites (e.g., www.caranddriver.com, www.espn.com, www.allrecipes.com, etc.) can be useful to determine topical interests (e.g., automobiles, sports, cooking, etc.) of user(s) of the client computer 202, 203. In some examples, audience measurement entities can use host website URLs to correlate with user/panelist demographics and interpolate logged impressions to larger populations based on demographics and topical interests of the larger populations and based on the demographics and topical interests of users/panelists for which impressions were logged. Thus, in the illustrated example, when the impression monitor system 132 does not receive a host website URL or cannot otherwise identify a host website URL based on the beacon request 304, the impression monitor system 132 sends the URL scrape instruction 320 to the client computer 202, 203 to receive the scraped URL 322. In the illustrated example, if the impression monitor system 132 can identify a host website URL based on the beacon request 304, the impression monitor system 132 does not send the URL scrape instruction 320 to the client computer 202, 203, thereby, conserving network and computer bandwidth and resources.

In response to receiving the beacon response 306, the web browser of the client 202, 203 sends the beacon request 308 to the specified partner site, which is the partner A 206 (e.g., a second internet domain) in the illustrated example. The beacon request 308 includes the encrypted parameters from the beacon response 306. The partner A 206 (e.g., Facebook) decrypts the encrypted parameters and determines whether the client matches a registered user of services offered by the partner A 206. This determination involves requesting the client 202, 203 to pass any cookie (e.g., one of the partner cookies 216 of FIG. 2) it stores that had been set by partner A 206 and attempting to match the received cookie against the cookies stored in the records of partner A 206. If a match is found, partner A 206 has positively identified a client 202, 203. Accordingly, the partner A 206 site logs an impression in association with the demographics information of the identified client. This log (which includes the undetectable source identifier) is subsequently provided to the ratings entity for processing into GRPs as discussed below. In the event partner A 206 is unable to identify the client 202, 203 in its records (e.g., no matching cookie), the partner A 206 does not log an impression.

In some example implementations, if the user ID does not match a registered user of the partner A 206, the partner A 206 may return a beacon response 312 (e.g., a second beacon response) including a failure or non-match status or may not respond at all, thereby terminating the process of FIG. 3. However, in the illustrated example, if partner A 206 cannot identify the client 202, 203, partner A 206 returns a second HTTP 302 redirect message in the beacon response 312 (e.g., the second beacon response) to the client 202, 203. For example, if the partner A site 206 has logic (e.g., similar to the rules/ml engine 230 of FIG. 2) to specify another partner (e.g., partner B 208 or any other partner) which may likely have demographics for the user ID, then the beacon response 312 may include an HTTP 302 redirect (or any other suitable instruction to cause a redirected communication) along with the URL of the other partner (e.g., at a third internet domain). Alternatively, in the daisy chain approach discussed above, the partner A site 206 may always redirect to the same next partner or database proprietor (e.g., partner B 208 at, for example, a third internet domain or a non-partnered database proprietor subsystem 110 of FIG. 1 at a third internet domain) whenever it cannot identify the client 202, 203. When redirecting, the partner A site 206 of the illustrated example encrypts the ID, timestamp, referrer, etc. parameters using an encryption that can be decoded by the next specified partner.

As a further alternative, if the partner A site 206 does not have logic to select a next best suited partner likely to have demographics for the user ID and is not effectively daisy chained to a next partner by storing instructions that redirect to a partner entity, the beacon response 312 can redirect the client 202, 203 to the impression monitor system 132 with a failure or non-match status. In this manner, the impression monitor system 132 can use its rules/ML engine 230 to select a next-best suited partner to which the web browser of the client 202, 203 should send a beacon request (or, if no such logic is provided, simply select the next partner in a hierarchical (e.g., fixed) list). In the illustrated example, the impression monitor system 132 selects the partner B site 208, and the web browser of the client 202, 203 sends a beacon request to the partner B site 208 with parameters encrypted in a manner that can be decrypted by the partner B site 208. The partner B site 208 then attempts to identify the client 202, 203 based on its own internal database. If a cookie obtained from the client 202, 203 matches a cookie in the records of partner B 208, partner B 208 has positively identified the client 202, 203 and logs the impression in association with the demographics of the client 202, 203 for later provision to the impression monitor system 132. In the event that partner B 208 cannot identify the client 202, 203, the same process of failure notification or further HTTP 302 redirects may be used by the partner B 208 to provide a next other partner site an opportunity to identify the client and so on in a similar manner until a partner site identifies the client 202, 203 and logs the impression, until all partner sites have been exhausted without the client being identified, or until a predetermined number of partner sites failed to identify the client 202, 203.

Using the process illustrated in FIG. 3, impressions (e.g., ad impressions, content impressions, etc.) can be mapped to corresponding demographics even when the impressions are not triggered by panel members associated with the audience measurement entity (e.g., ratings entity subsystem 106 of FIG. 1). That is, during an impression collection or merging process, the panel collection platform 210 of the ratings entity can collect distributed impressions logged by (1) the impression monitor system 132 and (2) any participating partners (e.g., partners 206, 208). As a result, the collected data covers a larger population with richer demographics information than has heretofore been possible. Consequently, generating accurate, consistent, and meaningful online GRPs is possible by pooling the resources of the distributed databases as described above. The example structures of FIGS. 2 and 3 generate online GRPs based on a large number of combined demographic databases distributed among unrelated parties (e.g., Nielsen and Facebook). The end result appears as if users attributable to the logged impressions were part of a large virtual panel formed of registered users of the audience measurement entity because the selection of the participating partner sites can be tracked as if they were members of the audience measurement entities panels 114, 116. This is accomplished without violating the cookie privacy protocols of the Internet.

Periodically or aperiodically, the impression data collected by the partners (e.g., partners 206, 208) is provided to the ratings entity via a panel collection platform 210. As discussed above, some user IDs may not match panel members of the impression monitor system 132, but may match registered users of one or more partner sites. During a data collecting and merging process to combine demographic and impression data from the ratings entity subsystem 106 and the partner subsystem(s) 108 and 110 of FIG. 1, user IDs of some impressions logged by one or more partners may match user IDs of impressions logged by the impression monitor system 132, while others (most likely many others) will not match. In some example implementations, the ratings entity subsystem 106 may use the demographics-based impressions from matching user ID logs provided by partner sites to assess and/or improve the accuracy of its own demographic data, if necessary. For the demographics-based impressions associated with non-matching user ID logs, the ratings entity subsystem 106 may use the impressions (e.g., advertisement impressions, content impressions, etc.) to derive demographics-based online GRPs even though such impressions are not associated with panelists of the ratings entity subsystem 106.

As briefly mentioned above, examples disclosed herein may be configured to preserve user privacy when sharing demographic information (e.g., account records or registration information) between different entities (e.g., between the ratings entity subsystem 106 and the database proprietor subsystem 108). In some example implementations, a double encryption technique may be used based on respective secret keys for each participating partner or entity (e.g., the subsystems 106, 108, 110). For example, the ratings entity subsystem 106 can encrypt its user IDs (e.g., email addresses) using its secret key and the database proprietor subsystem 108 can encrypt its user IDs using its secret key. For each user ID, the respective demographics information is then associated with the encrypted version of the user ID. Each entity then exchanges their demographics lists with encrypted user IDs. Because neither entity knows the other's secret key, they cannot decode the user IDs, and thus, the user IDs remain private. Each entity then proceeds to perform a second encryption of each encrypted user ID using their respective keys. Each twice-encrypted (or double encrypted) user ID (UID) will be in the form of E1(E2(UID)) and E2(E1(UID)), where E1 represents the encryption using the secret key of the ratings entity subsystem 106 and E2 represents the encryption using the secret key of the database proprietor subsystem 108. Under the rule of commutative encryption, the encrypted user IDs can be compared on the basis that E1(E2(UID))=E2(E1(UID)). Thus, the encryption of user IDs present in both databases will match after the double encryption is completed. In this manner, matches between user records of the panelists and user records of the database proprietor (e.g., identifiers of registered social network users) can be compared without the partner entities needing to reveal user IDs to one another.

The ratings entity subsystem 106 performs a daily impressions and UUID (cookies) totalization based on impressions and cookie data collected by the impression monitor system 132 of FIG. 1 and the impressions logged by the partner sites. In the illustrated example, the ratings entity subsystem 106 may perform the daily impressions and UUID (cookies) totalization based on cookie information collected by the ratings entity cookie collector 134 of FIG. 1 and the logs provided to the panel collection platform 210 by the partner sites. FIG. 4 depicts an example ratings entity impressions table 400 showing quantities of impressions to monitored users. Similar tables could be compiled for one or more of advertisement impressions, content impressions, or other impressions. In the illustrated example, the ratings entity impressions table 400 is generated by the ratings entity subsystem 106 for an advertisement campaign (e.g., one or more of the advertisements 102 of FIG. 1) to determine frequencies of impressions per day for each user.

To track frequencies of impressions per unique user per day, the ratings entity impressions table 400 is provided with a frequency column 402. A frequency of 1 indicates one exposure per day of an ad in an ad campaign to a unique user, while a frequency of 4 indicates four exposures per day of one or more ads in the same ad campaign to a unique user. To track the quantity of unique users to which impressions are attributable, the ratings impressions table 400 is provided with a UUIDs column 404. A value of 100,000 in the UUIDs column 404 is indicative of 100,000 unique users. Thus, the first entry of the ratings entity impressions table 400 indicates that 100,000 unique users (i.e., UUIDs=100,000) were exposed once (i.e., frequency=1) in a single day to a particular one of the advertisements 102.

To track impressions based on exposure frequency and UUIDs, the ratings entity impressions table 400 is provided with an impressions column 406. Each impression count stored in the impressions column 406 is determined by multiplying a corresponding frequency value stored in the frequency column 402 with a corresponding UUID value stored in the UUID column 404. For example, in the second entry of the ratings entity impressions table 400, the frequency value of two is multiplied by 200,000 unique users to determine that 400,000 impressions are attributable to a particular one of the advertisements 102.

Turning to FIG. 5, in the illustrated example, each of the partnered database proprietor subsystems 108, 110 of the partners 206, 208 generates and reports a database proprietor ad campaign-level age/gender and impression composition table 500 to the GRP report generator 130 of the ratings entity subsystem 106 on a daily basis. Similar tables can be generated for content and/or other media. Additionally or alternatively, media in addition to advertisements may be added to the table 500. In the illustrated example, the partners 206, 208 tabulate the impression distribution by age and gender composition as shown in FIG. 5. For example, referring to FIG. 1, the database proprietor database 142 of the partnered database proprietor subsystem 108 stores logged impressions and corresponding demographic information of registered users of the partner A 206, and the database proprietor subsystem 108 of the illustrated example processes the impressions and corresponding demographic information using the rules 144 to generate the DP summary tables 146 including the database proprietor ad campaign-level age/gender and impression composition table 500.

The age/gender and impression composition table 500 is provided with an age/gender column 502, an impressions column 504, a frequency column 506, and an impression composition column 508. The age/gender column 502 of the illustrated example indicates the different age/gender demographic groups. The impressions column 504 of the illustrated example stores values indicative of the total impressions for a particular one of the advertisements 102 (FIG. 1) for corresponding age/gender demographic groups. The frequency column 506 of the illustrated example stores values indicative of the frequency of exposure per user for the one of the advertisements 102 that contributed to the impressions in the impressions column 504. The impressions composition column 508 of the illustrated example stores the percentage of impressions for each of the age/gender demographic groups.

In some examples, the database proprietor subsystems 108, 110 may perform demographic accuracy analyses and adjustment processes on its demographic information before tabulating final results of impression-based demographic information in the database proprietor campaign-level age/gender and impression composition table. This can be done to address a problem facing online audience measurement processes in that the manner in which registered users represent themselves to online data proprietors (e.g., the partners 206 and 208) is not necessarily veridical (e.g., truthful and/or accurate). In some instances, example approaches to online measurement that leverage account registrations at such online database proprietors to determine demographic attributes of an audience may lead to inaccurate demographic-exposure results if they rely on self-reporting of personal/demographic information by the registered users during account registration at the database proprietor site. There may be numerous reasons for why users report erroneous or inaccurate demographic information when registering for database proprietor services. The self-reporting registration processes used to collect the demographic information at the database proprietor sites (e.g., social media sites) does not facilitate determining the veracity of the self-reported demographic information. To analyze and adjust inaccurate demographic information, the ratings entity subsystem 106 and the database proprietor subsystems 108, 110 may use examples disclosed in U.S. patent application Ser. No. 13/209,292, filed on Aug. 12, 2011, and titled "Methods and Apparatus to Analyze and Adjust Demographic Information," which is hereby incorporated herein by reference in its entirety.

Turning to FIG. 6, in the illustrated example, the ratings entity subsystem 106 generates a panelist ad campaign-level age/gender and impression composition table 600 on a daily basis. Similar tables can be generated for content and/or other media. Additionally or alternatively, media in addition to advertisements may be added to the table 600. The example ratings entity subsystem 106 tabulates the impression distribution by age and gender composition as shown in FIG. 6 in the same manner as described above in connection with FIG. 5. As shown in FIG. 6, the panelist ad campaign-level age/gender and impression composition table 600 also includes an age/gender column 602, an impressions column 604, a frequency column 606, and an impression composition column 608. In the illustrated example of FIG. 6, the impressions are calculated based on the PC and TV panelists 114 and online panelists 116.

After creating the campaign-level age/gender and impression composition tables 500 and 600 of FIGS. 5 and 6, the ratings entity subsystem 106 creates a combined campaign-level age/gender and impression composition table 700 shown in FIG. 7. In particular, the ratings entity subsystem 106 combines the impression composition percentages from the impression composition columns 508 and 608 of FIGS. 5 and 6 to compare the age/gender impression distribution differences between the ratings entity panelists and the social network users.

As shown in FIG. 7, the combined campaign-level age/gender and impression composition table 700 includes an error weighted column 702, which stores mean squared errors (MSEs) indicative of differences between the impression compositions of the ratings entity panelists and the users of the database proprietor (e.g., social network users). Weighted MSEs can be determined using Equation 3 below.

$$\text{Weighted MSE} = (\alpha * IC_{(RE)} + (1-\alpha)IC_{(DP)}) \quad \text{Equation 3}$$

In Equation 3 above, a weighting variable ($\alpha$) represents the ratio of MSE(SN)/MSE(RE) or some other function that weights the compositions inversely proportional to their MSE. As shown in Equation 3, the weighting variable ($\alpha$) is multiplied by the impression composition of the ratings entity (IC(RE)) to generate a ratings entity weighted impression composition ($\alpha*IC(RE)$). The impression composition of the database proprietor (e.g., a social network) (IC(DP)) is then multiplied by a difference between one and the weighting variable ($\alpha$) to determine a database proprietor weighted impression composition ($(1-\alpha) IC(DP)$).

In the illustrated example, the ratings entity subsystem 106 can smooth or correct the differences between the impression compositions by weighting the distribution of MSE. The MSE values account for sample size variations or bounces in data caused by small sample sizes.

Turning to FIG. 8, the ratings entity subsystem 106 determines reach and error-corrected impression compositions in an age/gender impressions distribution table 800. The age/gender impressions distribution table 800 includes an age/gender column 802, an impressions column 804, a frequency column 806, a reach column 808, and an impressions composition column 810. The impressions column 804 stores error-weighted impressions values corresponding to impressions tracked by the ratings entity subsystem 106 (e.g., the impression monitor system 132 and/or the panel collection platform 210 based on impressions logged by the web client meter 222). In particular, the values in the impressions column 804 are derived by multiplying weighted MSE values from the error weighted column 702 of FIG. 7 with corresponding impressions values from the impressions column 604 of FIG. 6.

The frequency column 806 stores frequencies of impressions as tracked by the database proprietor subsystem 108. The frequencies of impressions are imported into the frequency column 806 from the frequency column 506 of the database proprietor campaign-level age/gender and impression composition table 500 of FIG. 5. For age/gender groups missing from the table 500, frequency values are taken from the ratings entity campaign-level age/gender and impression composition table 600 of FIG. 6. For example, the database proprietor campaign-level age/gender and impression composition table 500 does not have a less than 12 (<12) age/gender group. Thus, a frequency value of 3 is taken from the ratings entity campaign-level age/gender and impression composition table 600.

The reach column 808 stores reach values representing reach of one or more of the content and/or advertisements 102 (FIG. 1) for each age/gender group. The reach values are determined by dividing respective impressions values from the impressions column 804 by corresponding frequency values from the frequency column 806. The impressions composition column 810 stores values indicative of the percentage of impressions per age/gender group. In the illustrated example, the final total frequency in the frequency column 806 is equal to the total impressions divided by the total reach.

FIGS. 9, 10, 11, 12, and 14A-14B are flow diagrams representative of machine readable instructions that can be executed to implement the methods and apparatus described herein. The example processes of FIGS. 9, 10, 11, 12, and 14A-14B may be implemented using machine readable instructions that, when executed, cause a device (e.g., a programmable controller, processor, other programmable machine, integrated circuit, or logic circuit) to perform the operations shown in FIGS. 9, 10, 11, 12, and 14A-14B. For instance, the example processes of FIGS. 9, 10, 11, 12, and 14A-14B may be performed using a processor, a controller, and/or any other suitable processing device. For example, the example process of FIGS. 9, 10, 11, 12, and 14A-14B may be implemented using coded instructions stored on a tangible machine readable medium such as a flash memory, a read-only memory (ROM), and/or a random-access memory (RAM).

As used herein, the term tangible computer readable medium is expressly defined to include any type of computer readable storage and to exclude propagating signals. Additionally or alternatively, the example processes of FIGS. 9, 10, 11, 12, and 14A-14B may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, the example processes of FIGS. 9, 10, 11, 12, and 14A-14B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example processes of FIGS. 9, 10, 11, 12, and 14A-14B may be implemented as any combination(s) of any of the foregoing techniques, for example, any combination of firmware, software, discrete logic and/or hardware.

Although the example processes of FIGS. 9, 10, 11, 12, and 14A-14B are described with reference to the flow diagrams of FIGS. 9, 10, 11, 12, and 14A-14B, other methods of implementing the processes of FIGS. 9, 10, 11, 12, and 14A-14B may be employed. For example, the order of execution of the blocks may be changed, and/or some of the blocks described may be changed, eliminated, sub-divided, or combined. Additionally, one or both of the example processes of FIGS. 9, 10, 11, 12, and 14A-14B may be performed sequentially and/or in parallel by, for example, separate processing threads, processors, devices, discrete logic, circuits, etc.

Figure 9:
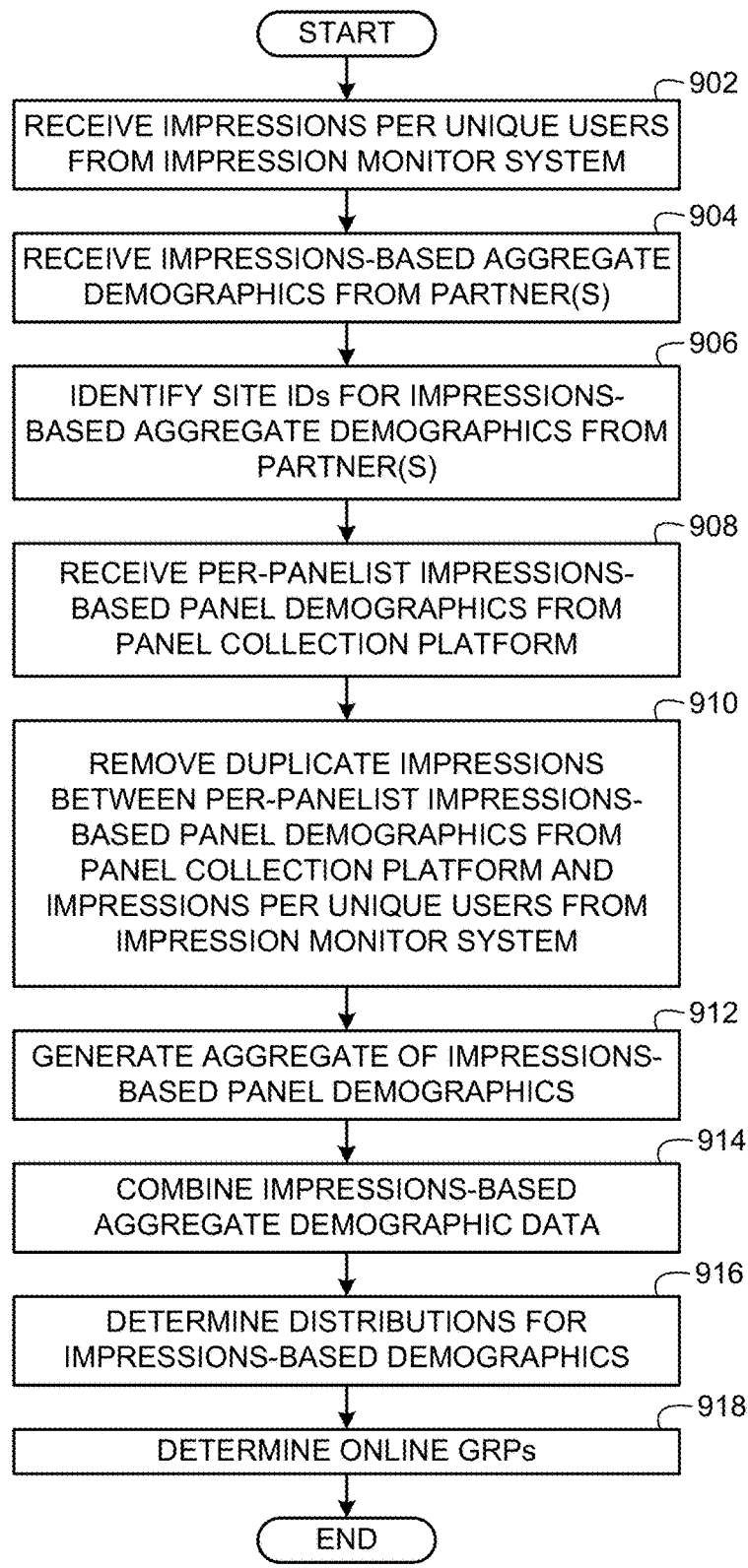
FIG. 9 is a flow diagram representative of example machine readable instructions that may be executed to identify demographics attributable to impressions.

Turning in detail to FIG. 9, the ratings entity subsystem 106 of FIG. 1 may perform the depicted process to collect demographics and impression data from partners and to assess the accuracy and/or adjust its own demographics data of its panelists 114, 116. The example process of FIG. 9 collects demographics and impression data for registered users of one or more partners (e.g., the partners 206 and 208 of FIGS. 2 and 3) that overlap with panelist members (e.g., the panelists 114 and 116 of FIG. 1) of the ratings entity subsystem 106 as well as demographics and impression data from partner sites that correspond to users that are not registered panel members of the ratings entity subsystem 106. The collected data is combined with other data collected at the ratings entity to determine online GRPs. The example process of FIG. 9 is described in connection with the example system 100 of FIG. 1 and the example system 200 of FIG. 2.

Initially, the GRP report generator 130 (FIG. 1) receives impressions per unique users 235 (FIG. 2) from the impression monitor system 132 (block 902). The GRP report generator 130 receives impressions-based aggregate demographics (e.g., the partner campaign-level age/gender and impression composition table 500 of FIG. 5) from one or more partner(s) (block 904). In the illustrated example, user IDs of registered users of the partners 206, 208 are not received by the GRP report generator 130. Instead, the partners 206, 208 remove user IDs and aggregate impressions-based demographics in the partner campaign-level age/gender and impression composition table 500 at demographic bucket levels (e.g., males aged 13-18, females aged 13-18, etc.). However, for instances in which the partners 206, 208 also send user IDs to the GRP report generator 130, such user IDs are exchanged in an encrypted format based on, for example, the double encryption technique described above.

For examples in which the impression monitor system 132 modifies site IDs and sends the modified site IDs in the beacon response 306, the partner(s) log impressions based on those modified site IDs. In such examples, the impressions collected from the partner(s) at block 904 are impressions logged by the partner(s) against the modified site IDs. When the ratings entity subsystem 106 receives the impressions with modified site IDs, GRP report generator 130 identifies site IDs for the impressions received from the partner(s) (block 906). For example, the GRP report generator 130 uses the site ID map 310 (FIG. 3) generated by the impression monitor system 132 during the beacon receive and response process (e.g., discussed above in connection with FIG. 3) to identify the actual site IDs corresponding to the modified site IDs in the impressions received from the partner(s).

The GRP report generator 130 receives per-panelist impressions-based demographics (e.g., the impressions-based panel demographics table 250 of FIG. 2) from the panel collection platform 210 (block 908). In the illustrated example, per-panelist impressions-based demographics are impressions logged in association with respective user IDs of panelist 114, 116 (FIG. 1) as shown in the impressions-based panel demographics table 250 of FIG. 2.

The GRP report generator 130 removes duplicate impressions between the per-panelist impressions-based panel demographics 250 received at block 908 from the panel collection platform 210 and the impressions per unique users 235 received at block 902 from the impression monitor system 132 (block 910). In this manner, duplicate impressions logged by both the impression monitor system 132 and the web client meter 222 (FIG. 2) will not skew GRPs generated by the GRP generator 130. In addition, by using the per-panelist impressions-based panel demographics 250 from the panel collection platform 210 and the impressions per unique users 235 from the impression monitor system 132, the GRP generator 130 has the benefit of impressions from redundant systems (e.g., the impression monitor system 132 and the web client meter 222). In this manner, if one of the systems (e.g., one of the impression monitor system 132 or the web client meter 222) misses one or more impressions, the record(s) of such impression(s) can be obtained from the logged impressions of the other system (e.g., the other one of the impression monitor system 132 or the web client meter 222).

The GRP report generator 130 generates an aggregate of the impressions-based panel demographics 250 (block 912). For example, the GRP report generator 130 aggregates the impressions-based panel demographics 250 into demographic bucket levels (e.g., males aged 13-18, females aged 13-18, etc.) to generate the panelist ad campaign-level age/gender and impression composition table 600 of FIG. 6.

In some examples, the GRP report generator 130 does not use the per-panelist impressions-based panel demographics from the panel collection platform 210. In such instances, the ratings entity subsystem 106 does not rely on web client meters such as the web client meter 222 of FIG. 2 to determine GRP using the example process of FIG. 9. Instead in such instances, the GRP report generator 130 determines impressions of panelists based on the impressions per unique users 235 received at block 902 from the impression monitor system 132 and uses the results to aggregate the impressions-based panel demographics at block 912. For example, as discussed above in connection with FIG. 2, the impressions per unique users table 235 stores panelist user IDs in association with total impressions and campaign IDs. As such, the GRP report generator 130 may determine impressions of panelists based on the impressions per unique users 235 without using the impression-based panel demographics 250 collected by the web client meter 222.

The GRP report generator 130 combines the impressions-based aggregate demographic data from the partner(s) 206, 208 (received at block 904) and the panelists 114, 116 (generated at block 912) its demographic data with received demographic data (block 914). For example, the GRP report generator 130 of the illustrated example combines the impressions-based aggregate demographic data to form the combined campaign-level age/gender and impression composition table 700 of FIG. 7.

The GRP report generator 130 determines distributions for the impressions-based demographics of block 914 (block 916). In the illustrated example, the GRP report generator 130 stores the distributions of the impressions-based demographics in the age/gender impressions distribution table 800 of FIG. 8. In addition, the GRP report generator 130 generates online GRPs based on the impressions-based demographics (block 918). In the illustrated example, the GRP report generator 130 uses the GRPs to create one or more of the GRP report(s) 131. In some examples, the ratings entity subsystem 106 sells or otherwise provides the GRP report(s) 131 to advertisers, publishers, content providers, manufacturers, and/or any other entity interested in such market research. The example process of FIG. 9 then ends.

Figure 10:
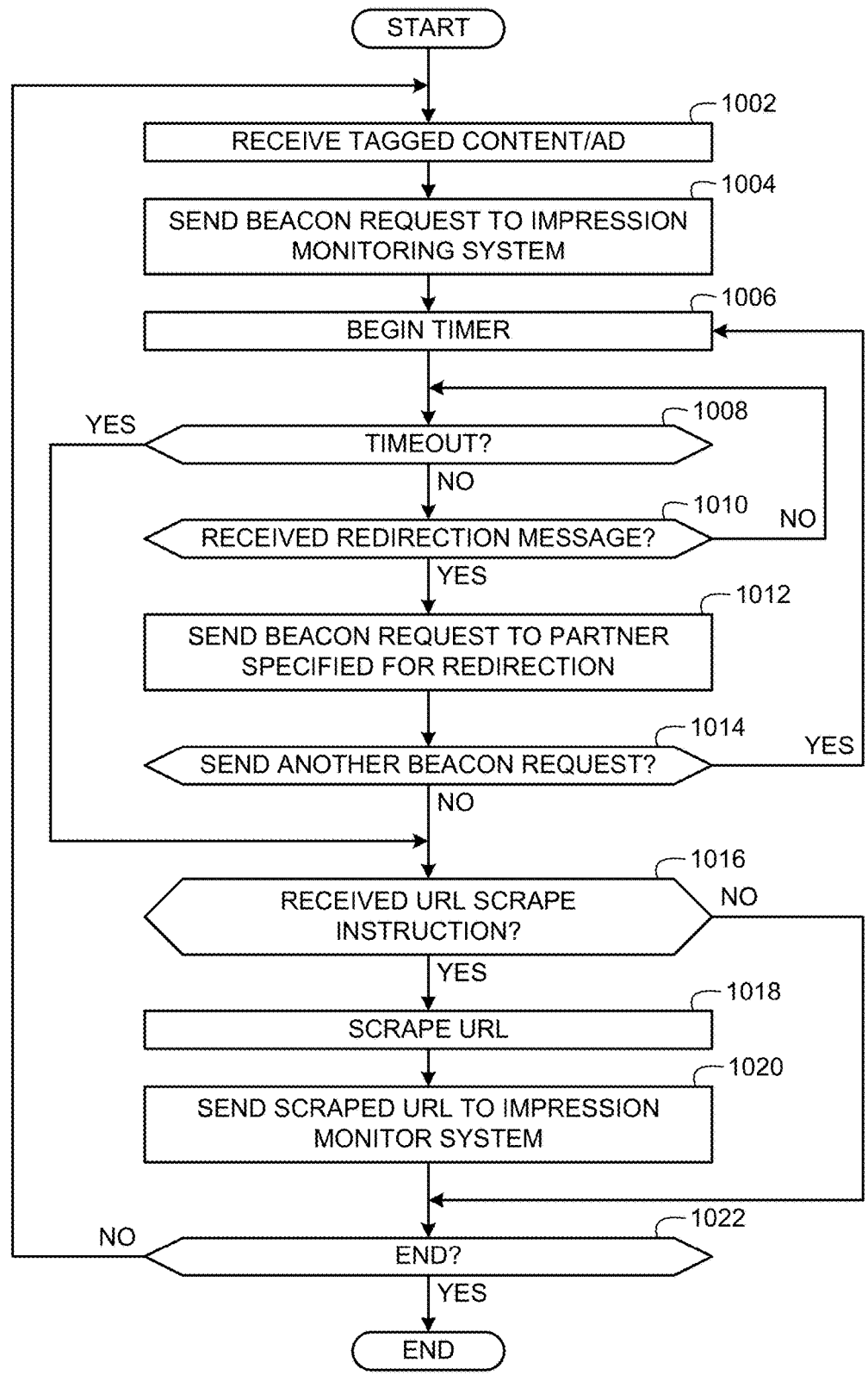
FIG. 10 is a flow diagram representative of example machine readable instructions that may be executed by a client computer to route beacon requests to web service providers to log impressions.

Turning now to FIG. 10, the depicted example flow diagram may be performed by a client computer 202, 203 (FIGS. 2 and 3) to route beacon requests (e.g., the beacon requests 304, 308 of FIG. 3) to web service providers to log demographics-based impressions. Initially, the client computer 202, 203 receives tagged content and/or a tagged advertisement 102 (block 1002) and sends the beacon request 304 to the impression monitor system 132 (block 1004) to give the impression monitor system 132 (e.g., at a first internet domain) an opportunity to log an impression for the client computer 202, 203. The client computer 202, 203 begins a timer (block 1006) based on a time for which to wait for a response from the impression monitor system 132.

If a timeout has not expired (block 1008), the client computer 202, 203 determines whether it has received a redirection message (block 1010) from the impression monitor system 132 (e.g., via the beacon response 306 of FIG. 3). If the client computer 202, 203 has not received a redirection message (block 1010), control returns to block 1008. Control remains at blocks 1008 and 1010 until either (1) a timeout has expired, in which case control advances to block 1016 or (2) the client computer 202, 203 receives a redirection message.

If the client computer 202, 203 receives a redirection message at block 1010, the client computer 202, 203 sends the beacon request 308 to a partner specified in the redirection message (block 1012) to give the partner an opportunity to log an impression for the client computer 202, 203. During a first instance of block 1012 for a particular tagged advertisement (e.g., the tagged advertisement 102), the partner (or in some examples, non-partnered database proprietor 110) specified in the redirection message corresponds to a second internet domain. During subsequent instances of block 1012 for the same tagged advertisement, as beacon requests are redirected to other partner or non-partnered database proprietors, such other partner or non-partnered database proprietors correspond to third, fourth, fifth, etc. internet domains. In some examples, the redirection message(s) may specify an intermediary(ies) (e.g., an intermediary(ies) server(s) or sub-domain server(s)) associated with a partner(s) and/or the client computer 202, 203 sends the beacon request 308 to the intermediary(ies) based on the redirection message(s) as described below in conjunction with FIG. 13.

The client computer 202, 203 determines whether to attempt to send another beacon request to another partner (block 1014). For example, the client computer 202, 203 may be configured to send a certain number of beacon requests in parallel (e.g., to send beacon requests to two or more partners at roughly the same time rather than sending one beacon request to a first partner at a second internet domain, waiting for a reply, then sending another beacon request to a second partner at a third internet domain, waiting for a reply, etc.) and/or to wait for a redirection message back from a current partner to which the client computer 202, 203 sent the beacon request at block 1012. If the client computer 202, 203 determines that it should attempt to send another beacon request to another partner (block 1014), control returns to block 1006.

If the client computer 202, 203 determines that it should not attempt to send another beacon request to another partner (block 1014) or after the timeout expires (block 1008), the client computer 202, 203 determines whether it has received the URL scrape instruction 320 (FIG. 3) (block 1016). If the client computer 202, 203 did not receive the URL scrape instruction 320 (block 1016), control advances to block 1022. Otherwise, the client computer 202, 203 scrapes the URL of the host website rendered by the web browser 212 (block 1018) in which the tagged content and/or advertisement 102 is displayed or which spawned the tagged content and/or advertisement 102 (e.g., in a pop-up window). The client computer 202, 203 sends the scraped URL 322 to the impression monitor system 132 (block 1020). Control then advances to block 1022, at which the client computer 202, 203 determines whether to end the example process of FIG. 10. For example, if the client computer 202, 203 is shut down or placed in a standby mode or if its web browser 212 (FIGS. 2 and 3) is shut down, the client computer 202, 203 ends the example process of FIG. 10. If the example process is not to be ended, control returns to block 1002 to receive another content and/or tagged ad. Otherwise, the example process of FIG. 10 ends.

In some examples, real-time redirection messages from the impression monitor system 132 may be omitted from the example process of FIG. 10, in which cases the impression monitor system 132 does not send redirect instructions to the client computer 202, 203. Instead, the client computer 202, 203 refers to its partner-priority-order cookie 220 to determine partners (e.g., the partners 206 and 208) to which it should send redirects and the ordering of such redirects. In some examples, the client computer 202, 203 sends redirects substantially simultaneously to all partners listed in the partner-priority-order cookie 220 (e.g., in seriatim, but in rapid succession, without waiting for replies). In such some examples, block 1010 is omitted and at block 1012, the client computer 202, 203 sends a next partner redirect based on the partner-priority-order cookie 220. In some such examples, blocks 1006 and 1008 may also be omitted, or blocks 1006 and 1008 may be kept to provide time for the impression monitor system 132 to provide the URL scrape instruction 320 at block 1016.

Figure 11:
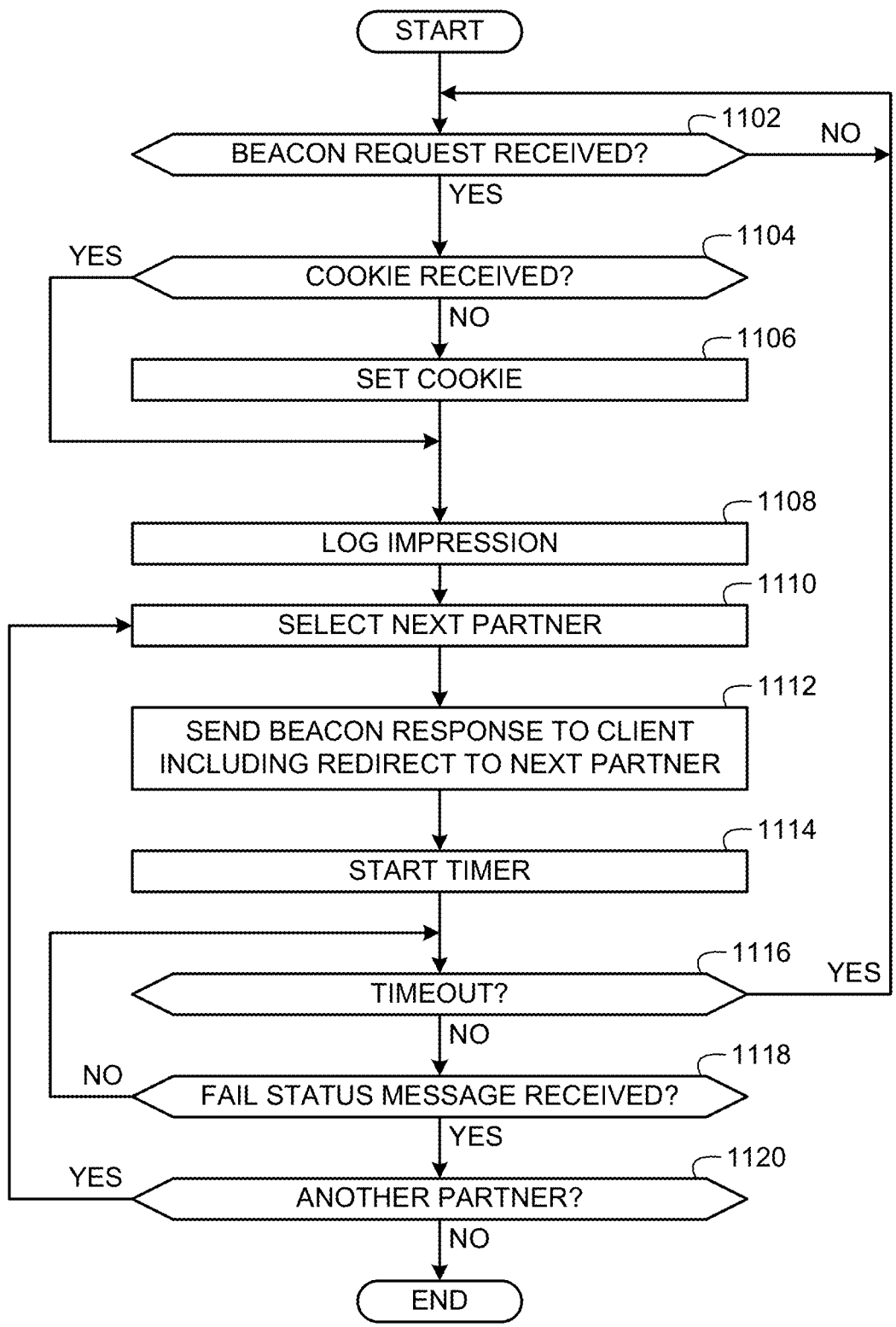
FIG. 11 is a flow diagram representative of example machine readable instructions that may be executed by a panelist monitoring system to log impressions and/or redirect beacon requests to web service providers to log impressions.

Turning to FIG. 11, the example flow diagram may be performed by the impression monitor system 132 (FIGS. 2 and 3) to log impressions and/or redirect beacon requests to web service providers (e.g., database proprietors) to log impressions. Initially, the impression monitor system 132 waits until it has received a beacon request (e.g., the beacon request 304 of FIG. 3) (block 1102). The impression monitor system 132 of the illustrated example receives beacon requests via the HTTP server 232 of FIG. 2. When the impression monitor system 132 receives a beacon request (block 1102), it determines whether a cookie (e.g., the panelist monitor cookie 218 of FIG. 2) was received from the client computer 202, 203 (block 1104). For example, if a panelist monitor cookie 218 was previously set in the client computer 202, 203, the beacon request sent by the client computer 202, 203 to the panelist monitoring system will include the cookie.

If the impression monitor system 132 determines at block 1104 that it did not receive the cookie in the beacon request (e.g., the cookie was not previously set in the client computer 202, 203, the impression monitor system 132 sets a cookie (e.g., the panelist monitor cookie 218) in the client computer 202, 203 (block 1106). For example, the impression monitor system 132 may use the HTTP server 232 to send back a response to the client computer 202, 203 to 'set' a new cookie (e.g., the panelist monitor cookie 218).

After setting the cookie (block 1106) or if the impression monitor system 132 did receive the cookie in the beacon request (block 1104), the impression monitor system 132 logs an impression (block 1108). The impression monitor system 132 of the illustrated example logs an impression in the impressions per unique users table 235 of FIG. 2. As discussed above, the impression monitor system 132 logs the impression regardless of whether the beacon request corresponds to a user ID that matches a user ID of a panelist member (e.g., one of the panelists 114 and 116 of FIG. 1). However, if the user ID comparator 228 (FIG. 2) determines that the user ID (e.g., the panelist monitor cookie 218) matches a user ID of a panelist member (e.g., one of the panelists 114 and 116 of FIG. 1) set by and, thus, stored in the record of the ratings entity subsystem 106, the logged impression will correspond to a panelist of the impression monitor system 132. For such examples in which the user ID matches a user ID of a panelist, the impression monitor system 132 of the illustrated example logs a panelist identifier with the impression in the impressions per unique users table 235 and subsequently an audience measurement entity associates the known demographics of the corresponding panelist (e.g., a corresponding one of the panelists 114, 116) with the logged impression based on the panelist identifier. Such associations between panelist demographics (e.g., the age/gender column 602 of FIG. 6) and logged impression data are shown in the panelist ad campaign-level age/gender and impression composition table 600 of FIG. 6. If the user ID comparator 228 (FIG. 2) determines that the user ID does not correspond to a panelist 114, 116, the impression monitor system 132 will still benefit from logging an impression (e.g., an ad impression or content impression) even though it will not have a user ID record (and, thus, corresponding demographics) for the impression reflected in the beacon request 304.

The impression monitor system 132 selects a next partner (block 1110). For example, the impression monitor system 132 may use the rules/ML engine 230 (FIG. 2) to select one of the partners 206 or 208 of FIGS. 2 and 3 at random or based on an ordered listing or ranking of the partners 206 and 208 for an initial redirect in accordance with the rules/ML engine 230 (FIG. 2) and to select the other one of the partners 206 or 208 for a subsequent redirect during a subsequent execution of block 1110.

The impression monitor system 132 sends a beacon response (e.g., the beacon response 306) to the client computer 202, 203 including an HTTP 302 redirect (or any other suitable instruction to cause a redirected communication) to forward a beacon request (e.g., the beacon request 308 of FIG. 3) to a next partner (e.g., the partner A 206 of FIG. 2) (block 1112) and starts a timer (block 1114). The impression monitor system 132 of the illustrated example sends the beacon response 306 using the HTTP server 232. In the illustrated example, the impression monitor system 132 sends an HTTP 302 redirect (or any other suitable instruction to cause a redirected communication) at least once to allow at least a partner site (e.g., one of the partners 206 or 208 of FIGS. 2 and 3) to also log an impression for the same advertisement (or content). However, in other example implementations, the impression monitor system 132 may include rules (e.g., as part of the rules/ML engine 230 of FIG. 2) to exclude some beacon requests from being redirected. The timer set at block 1114 is used to wait for real-time feedback from the next partner in the form of a fail status message indicating that the next partner did not find a match for the client computer 202, 203 in its records.

If the timeout has not expired (block 1116), the impression monitor system 132 determines whether it has received a fail status message (block 1118). Control remains at blocks 1116 and 1118 until either (1) a timeout has expired, in which case control returns to block 1102 to receive another beacon request or (2) the impression monitor system 132 receives a fail status message.

If the impression monitor system 132 receives a fail status message (block 1118), the impression monitor system 132 determines whether there is another partner to which a beacon request should be sent (block 1120) to provide another opportunity to log an impression. The impression monitor system 132 may select a next partner based on a smart selection process using the rules/ML engine 230 of FIG. 2 or based on a fixed hierarchy of partners. If the impression monitor system 132 determines that there is another partner to which a beacon request should be sent, control returns to block 1110. Otherwise, the example process of FIG. 11 ends.

In some examples, real-time feedback from partners may be omitted from the example process of FIG. 11 and the impression monitor system 132 does not send redirect instructions to the client computer 202, 203. Instead, the client computer 202, 203 refers to its partner-priority-order cookie 220 to determine partners (e.g., the partners 206 and 208) to which it should send redirects and the ordering of such redirects. In some examples, the client computer 202, 203 sends redirects simultaneously to all partners listed in the partner-priority-order cookie 220. In such some examples, blocks 1110, 1114, 1116, 1118, and 1120 are omitted and at block 1112, the impression monitor system 132 sends the client computer 202, 203 an acknowledgement response without sending a next partner redirect.

Figure 12:
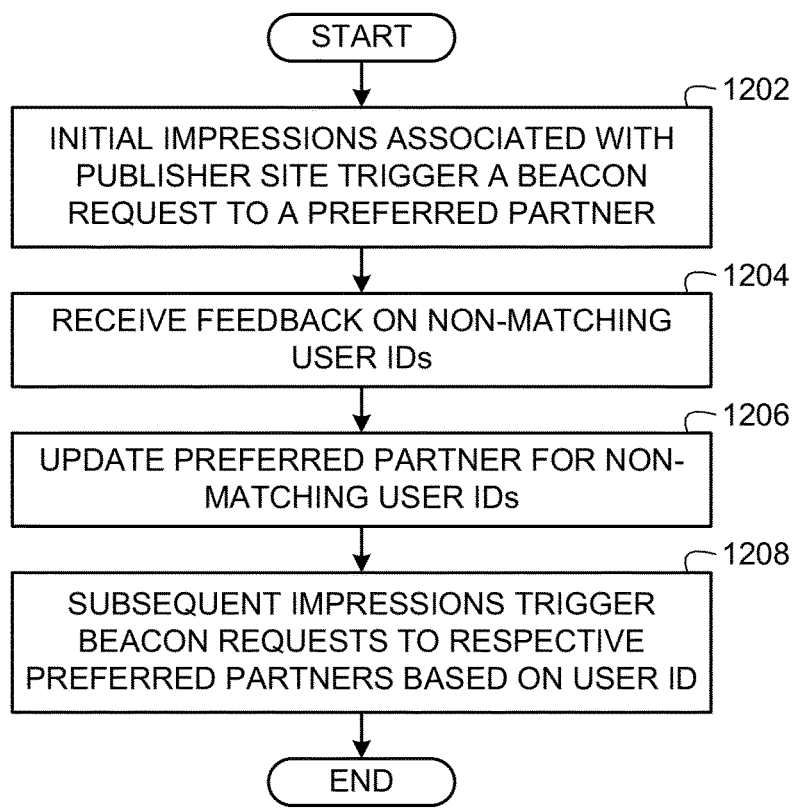
FIG. 12 is a flow diagram representative of example machine readable instructions that may be executed to dynamically designate preferred web service providers from which to request demographics attributable to impressions.

Turning now to FIG. 12, the example flow diagram may be executed to dynamically designate preferred web service providers (or preferred partners) from which to request logging of impressions using the example redirection beacon request processes of FIGS. 10 and 11. The example process of FIG. 12 is described in connection with the example system 200 of FIG. 2. Initial impressions associated with content and/or ads delivered by a particular publisher site (e.g., the publisher 302 of FIG. 3) trigger the beacon instructions 214 (FIG. 2) (and/or beacon instructions at other computers) to request logging of impressions at a preferred partner (block 1202). In this illustrated example, the preferred partner is initially the partner A site 206 (FIGS. 2 and 3). The impression monitor system 132 (FIGS. 1, 2, and 3) receives feedback on non-matching user IDs from the preferred partner 206 (block 1204). The rules/ML engine 230 (FIG. 2) updates the preferred partner for the non-matching user IDs (block 1206) based on the feedback received at block 1204. In some examples, during the operation of block 1206, the impression monitor system 132 also updates a partner-priority-order of preferred partners in the partner-priority-order cookie 220 of FIG. 2. Subsequent impressions trigger the beacon instructions 214 (and/or beacon instructions at other computers 202, 203) to send requests for logging of impressions to different respective preferred partners specifically based on each user ID (block 1208). That is, some user IDs in the panelist monitor cookie 218 and/or the partner cookie(s) 216 may be associated with one preferred partner, while others of the user IDs are now associated with a different preferred partner as a result of the operation at block 1206. The example process of FIG. 12 then ends.

Figure 13:
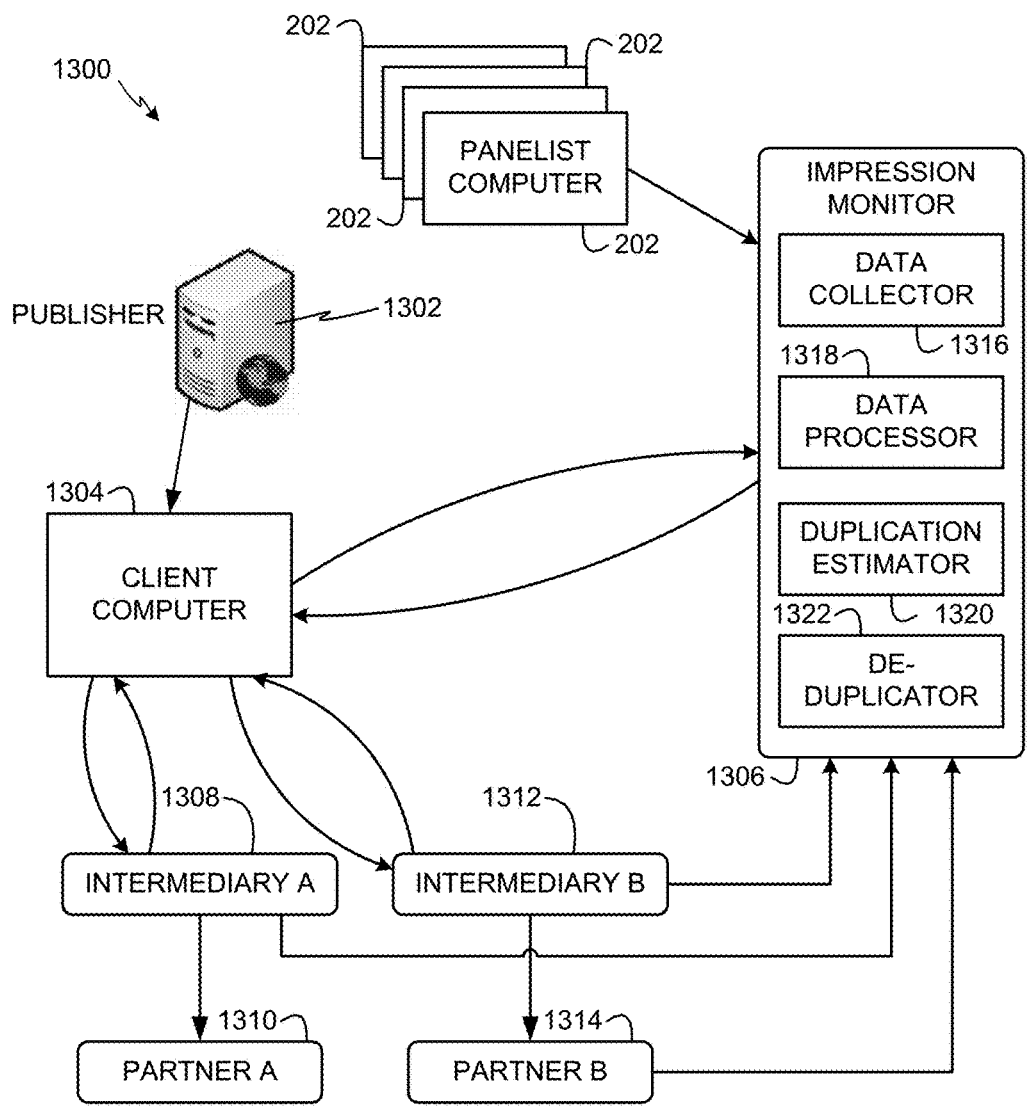
FIG. 13 depicts an example system that may be used to determine advertising exposure based on demographic information collected by one or more database proprietors.

FIG. 13 depicts an example system 1300 that may be used to determine media (e.g., content and/or advertising) exposure based on information collected by one or more database proprietors. The example system 1300 is another example of the systems 200 and 300 illustrated in FIGS. 2 and 3 in which an intermediary 1308, 1312 is provided between a client computer 1304 and a partner 1310, 1314. Persons of ordinary skill in the art will understand that the description of FIGS. 2 and 3 and the corresponding flow diagrams of FIGS. 8-12 are applicable to the system 1300 with the inclusion of the intermediary 1308, 1312.

According to the illustrated example, a publisher 1302 transmits media (e.g., an advertisement and/or content) to the client computer 1304 in response to a request from a client computer (e.g., an HTTP request). The publisher 1302 may be the publisher 302 described in conjunction with FIG. 3. The client computer 1304 may be the panelist client computer 202 or the non-panelist computer 203 described in conjunction with FIGS. 2 and 3 or any other client computer. The example client computer 1304 also provides a cookie supplied by the publisher 1302 to the publisher 1302 with the request (if the client computer 1304 has such a cookie). If the client computer does not have a cookie, the example publisher 1302 places a cookie on the client computer 1304. The example cookie provides a unique identifier that enables the publisher 1302 to know when the client computer 1304 sends requests and enables the example publisher 1302 to provide media (e.g., advertising and/or content) more likely to be of interest to the example client computer 1304. The media includes a beacon that instructs the client computer to send a request to an impression monitor 1306 as explained above.

The impression monitor 1306 may be the impression monitor system 132 described in conjunction with FIGS. 1-3. The impression monitor 1306 of the illustrated example receives beacon requests from the client computer 1304 and transmits redirection messages to the client computer 1304 to instruct the client to send a request to one or more of the intermediary A 1308, the intermediary B 1312, or any other system such as another intermediary, a partner, etc. The impression monitor 1306 also receives information about partner cookies from one or more of the intermediary A 1308 and the intermediary B 1312.

In some examples, the impression monitor 1306 may insert into a redirection message an identifier of a client that is established by the impression monitor 1306 and identifies the client computer 1304 and/or a user thereof. For example, the identifier of the client may be an identifier stored in a cookie that has been set at the client by the impression monitor 1306 or any other entity, an identifier assigned by the impression monitor 1306 or any other entity, etc. The identifier of the client may be a unique identifier, a semi-unique identifier, etc. In some examples, the identifier of the client may be encrypted, obfuscated, or varied to prevent tracking of the identifier by the intermediary 1308, 1312 or the partner 1310, 1314. According to the illustrated example, the identifier of the client is included in the redirection message to the client computer 1304 to cause the client computer 1304 to transmit the identifier of the client to the intermediary 1308, 1312 when the client computer 1304 follows the redirection message. For example, the identifier of the client may be included in a URL included in the redirection message to cause the client computer 1304 to transmit the identifier of the client to the intermediary 1308, 1312 as a parameter of the request that is sent in response to the redirection message.

The intermediaries 1308, 1312 of the illustrated example receive redirected beacon requests from the client computer 1304 and transmit information about the requests to the partners 1310, 1314. The example intermediaries 1308, 1312 are made available on a content delivery network (e.g., one or more servers of a content delivery network) to ensure that clients can quickly send the requests without causing substantial interruption in the access of content from the publisher 1302.

In examples disclosed herein, a cookie set in a domain (e.g., "partnerA.com") is accessible by a server of a sub-domain (e.g., "intermediary.partnerA.com") corresponding to the domain (e.g., the root domain "partnerA.com") in which the cookie was set. In some examples, the reverse is also true such that a cookie set in a sub-domain (e.g., "intermediary.partnerA.com") is accessible by a server of a root domain (e.g., the root domain "partnerA.com") corresponding to the sub-domain (e.g., "intermediary.partnerA.com") in which the cookie was set. As used herein, the term domain (e.g., Internet domain, domain name, etc.) is generic to (i.e., includes) the root domain (e.g., "domain.com") and sub-domains (e.g., "a.domain.com," "b.domain.com," "c.d.domain.com," etc.).

To enable the example intermediaries 1308, 1312 to receive cookie information associated with the partners 1310, 1314 respectively, sub-domains of the partners 1310, 1314 are assigned to the intermediaries 1308, 1312. For example, the partner A 1310 may register an internet address associated with the intermediary A 1308 with the sub-domain in a domain name system associated with a domain for the partner A 1310. Alternatively, the sub-domain may be associated with the intermediary in any other manner. In such examples, cookies set for the domain name of partner A 1310 are transmitted from the client computer 1304 to the intermediary A 1308 that has been assigned a sub-domain name associated with the domain of partner A 1310 when the client 1304 transmits a request to the intermediary A 1308.

The example intermediaries 1308, 1312 transmit the beacon request information including a campaign ID and received cookie information to the partners 1310, 1314 respectively. This information may be stored at the intermediaries 1308, 1312 so that it can be sent to the partners 1310, 1314 in a batch. For example, the received information could be transmitted near the end of the day, near the end of the week, after a threshold amount of information is received, etc. Alternatively, the information may be transmitted immediately upon receipt. The campaign ID may be encrypted, obfuscated, varied, etc. to prevent the partners 1310, 1314 from recognizing the content to which the campaign ID corresponds or to otherwise protect the identity of the media. A lookup table of campaign ID information may be stored at the impression monitor 1306 so that impression information received from the partners 1310, 1314 can be correlated with the media.

The intermediaries 1308, 1312 of the illustrated example also transmit an indication of the availability of a partner cookie to the impression monitor 1306. For example, when a redirected beacon request is received at the intermediary A 1308, the intermediary A 1308 determines if the redirected beacon request includes a cookie for partner A 1310. The intermediary A 1308 sends the notification to the impression monitor 1306 when the cookie for partner A 1310 was received. Alternatively, intermediaries 1308, 1312 may transmit information about the availability of the partner cookie regardless of whether a cookie is received. Where the impression monitor 1306 has included an identifier of the client in the redirection message and the identifier of the client is received at the intermediaries 1308, 1312, the intermediaries 1308, 1312 may include the identifier of the client with the information about the partner cookie transmitted to the impression monitor 1306. The impression monitor 1306 may use the information about the existence of a partner cookie to determine how to redirect future beacon requests. For example, the impression monitor 1306 may elect not to redirect a client to an intermediary 1308, 1312 that is associated with a partner 1310, 1314 with which it has been determined that a client does not have a cookie. In some examples, the information about whether a particular client has a cookie associated with a partner may be refreshed periodically or aperiodically to account for cookies expiring and new cookies being set (e.g., a recent login or registration at one of the partners).

The intermediaries 1308, 1312 may be implemented by a server associated with a metering entity (e.g., an audience measurement entity that provides the impression monitor 1306). Alternatively, intermediaries 1308, 1312 may be implemented by servers associated with the partners 1310, 1314 respectively. In other examples, the intermediaries may be provided by a third-party such as a content delivery network.

In some examples, the intermediaries 1308, 1312 are provided to prevent a direct connection between the partners 1310, 1314 and the client computer 1304, to prevent some information from the redirected beacon request from being transmitted to the partners 1310, 1314 (e.g., to prevent a REFERRER_URL from being transmitted to the partners 1310, 1314), to reduce the amount of network traffic at the partners 1310, 1314 associated with redirected beacon requests, and/or to transmit to the impression monitor 1306 real-time or near real-time indications of whether a partner cookie is provided by the client computer 1304.

In some examples, the intermediaries 1308, 1312 are trusted by the partners 1310, 1314 to prevent confidential data from being transmitted to the impression monitor 1306. For example, the intermediary 1308, 1312 may remove identifiers stored in partner cookies before transmitting information to the impression monitor 1306.

The partners 1310, 1314 receive beacon request information including the campaign ID and cookie information from the intermediaries 1308, 1312. The partners 1310, 1314 determine identity and demographics for a user of the client computer 1304 based on the cookie information. The example partners 1310, 1314 track impressions for the campaign ID based on the determined demographics associated with the impression. Based on the tracked impressions, the example partners 1310, 1314 generate reports such as those previously described above. The reports may be sent to the impression monitor 1306, the publisher 1302, an advertiser that supplied an ad provided by the publisher 1302, a media hub, and/or other persons or entities interested in the reports.

While the intermediaries 1308, 1312 are shown in FIG. 13, either or both of the intermediaries 1308, 1312 may be omitted in some examples.

In the example of FIG. 13, the partner A 1310 and partner B 1314 provide reports including aggregate audience and impression information to the impression monitor 1306. The use of multiple partners 1310, 1314 in FIG. 13 increases the chances that accurate demographics can be obtained for persons exposed to media. However, the audience and impression information provided by the partners 1310, 1314 may include duplicate audience members and/or duplicate impressions. Undetected duplication of audience members and/or impressions can cause overcounting of audience members and/or impressions. Such errors can result in attributing incorrect demographic characteristics to the impressions.

The example impression monitor 1306 of FIG. 13 de-duplicates the impression information to increase the accuracy of the combined data. To perform de-duplication, the impression monitor 1306 of the illustrated example determines a correlation (e.g., proportion of overlap) between users of the partners 1310, 1314 (e.g., a portion of the users of first partner (e.g., partner A 1310) that are also users of the second partner (e.g., partner B 1314) using panel-based data. For example, the impression monitor 1306 of the illustrated example determines the correlation as a proportion of the panelist computers 202 that have stored a cookie associated with the first partner 1310 and also stored a cookie associated with second partner 1314. The example impression monitor 1306 of FIG. 13 uses the correlation to determine the duplicate impression information and/or to de-duplicate the impression information. The example impression monitor 1306 of FIG. 13 includes a data collector 1316, a panel data processor 1318, a duplication estimator 1320, and a de-duplicator 1322.

The example data collector 1316 of FIG. 13 collects universe estimates (e.g., from an audience research service or other census provider). The universe refers to the total population of one or more selected audience categories (e.g., demographic groups). Universe estimates may be generated using surveys (e.g., questionnaires) of a set of individuals. In some examples, the results of the surveys are weighted based on the characteristics of the respondents to the survey to estimate a total number of persons in the universe. In some examples, universe estimates are performed manually and the results are imported by the data collector 1316 (e.g., in a table or other data format). In some other examples, the tasks performed for generating the universe estimates are partially or completely automated.

The example data collector 1316 of FIG. 13 also collects audience and/or impression information (e.g., aggregate unique audience members and impressions) from the partners 1310, 1314. For example, the data collector 1316 of the illustrated example receives a number of unique audience members that were identified by the partner A 1310 during a time period, as described above, and a number of impressions associated with those audience members. Similarly, the example data collector 1316 receives a number of unique audience members that were identified by the partner B 1314 during the time period, as described above, and a number of impressions associated with those audience members. Because the partners 1310, 1314 can differentiate between their respective users, the partners 1310, 1314 determine unique audience members (e.g., by de-duplicating the audience and/or impression data collected by the respective partner) prior to sending the number of unique audience members to the data collector 1316. However, the example partners 1310, 1314 do not know whether any audience members in their respective unique audiences overlap with unique members in the unique audience of the other partner(s).

The example data collector 1316 of FIG. 13 also collects panel data. In the illustrated example, panel data includes numbers or proportions of panelists who have visited web pages and/or web sites associated with each of the partners 1310, 1314, as well as information about the individual panelists associated with those visits to the web pages or web sites. For example, the data collector 1316 receives a number or proportion of panelists who have visited web page(s) and/or web site(s) at which partner A 1310 can identify the user, a number or proportion of panelists who have visited web page(s) and/or web site(s) at which partner B 1314 can identify the user, and a total number of panelists reporting. The data collector 1316 may receive the panel data directly and/or may derive the panel data from reports obtained from the panelists that describe the panelists' online usage.

In the example of FIG. 13, the universe estimates, impression information, and panel data are split into designated demographic groupings such as age and gender groups (e.g., females 12-17, females 18-20, males 12-17, males 18-20, etc.). However, the data may be considered in aggregate or may be split according to any other desired division. Although demographic groups in the illustrated examples disclosed herein are based on age and gender, additional or alternative types of demographic characteristics (e.g., income, geographic location, ethnicity, occupation, etc.) may be used to form the demographic groups.

As described below, the example impression monitor 1306 of FIG. 13 processes the received universe estimate, unique audience, impressions, and panel data to determine unduplicated audience, unduplicated impressions, unduplicated reach, and/or unduplicated frequency information.

FIG. 15 is a table 1500 illustrating example universe estimates that may be used by the impression monitor 1306 of FIG. 13 to de-duplicate audience and/or impressions received from multiple database proprietors. The example table 1500 may be obtained by the data collector 1316 from a census provider. While the example table 1500 of FIG. 15 includes universe estimates from two example sources (e.g., Source 1 and Source 2) having different frequencies of estimate updates, the data collector 1316 may receive one universe estimate or select between the universe estimates using one or more criteria.

FIG. 16 is a table 1600 illustrating example aggregate unique audience and impression data from a first database proprietor (e.g., Partner A 1310 of FIG. 13) that may be used by the impression monitor 1306 of FIG. 13 to de-duplicate audience and/or impressions received from multiple database proprietors 1310, 1314. The example partner 1310 of FIG. 13 provides the unique audience and number of impressions for each of the illustrated example demographic groups. This data is populated in the table 1600. Similarly, FIG. 17 is a table 1700 illustrating example aggregate unique audience and impression data from a second database proprietor (e.g., Partner B 1314 of FIG. 13).

From the unique audiences, the impressions, and the universe estimates, the example panel data processor 1318 of the illustrated example calculates the reach and the frequency (e.g., frequency of impressions) of each of the demographic groups. In the example of FIG. 13, the frequency calculated by the panel data processor 1318 is a measured frequency because it is determined from the panel data. For example, the data processor 1318 of the illustrated example calculates reach as the percentage of the universe represented by the unique audience for the demographic group (e.g., 50,000/6,374,500=0.8% for the male 18-20 demographic group). The example panel data processor 1318 of FIG. 13 calculates the frequency as the impressions per unique audience member (e.g., 160,000/50,000=3.2 for the male 18-20 demographic group).

FIG. 18 is a table 1800 illustrating example audience level proportions determined from a panel for multiple database proprietors (e.g., the partners 1310, 1314 of FIG. 13) that may be used by the impression monitor 1306 of FIG. 13 to de-duplicate audience and/or impressions received from multiple database proprietors. The example proportion information in FIG. 18 is determined from cookie information obtained from the panelist computers 202 of FIG. 13.

The example proportions in the table 1800 of FIG. 18 include the proportions of panelists and/or households associated with the panelist computers 202 that fall into one of four classifications: (a) panelists and/or households that do not have cookies associated with any partner 1310, 1314 on the panelist computer 202, (b) panelists and/or households that have a cookie associated with a first one of the partners 1310 but not a second one of the partners 1314 on the panelist computer 202, (c) panelists and/or households that have a cookie associated with the second one of the partners 1314 but not the first one of the partners 1310 on the panelist computer 202, or (d) panelists and/or households that have cookies associated with both partners 1310, 1314 on the panelist computer 202. Classifications (a), (b), and (c) of FIG. 18 are portions of the panelists and/or households that do not overlap for the database proprietors. Classification (d) is the portion of the panelists and/or households that overlap, in that the panelists and/or households in classification (d) have cookies for both database proprietors. The example data processor 1318 of FIG. 13 determines the proportions for each of the classifications (e.g., each of the columns of the table 1800) in a given demographic group (e.g., a row of the table 1800) by determining the demographic group(s) associated with the panelist computer 202 and determining a percentage of the panelist computers 202 that fall into each classification for the corresponding demographic group(s) (e.g., based on the cookies located on the respective panelist computers 202). Accordingly, the totals of the proportions from each column of the table 1800 are 1.00 for each demographic group in the example table 1800.

FIG. 19 is a table 1900 illustrating example total unduplicated audience and impression data from 2 or more database proprietors (e.g., partners 1310, 1314 of FIG. 13). The example impression monitor 1306 of FIG. 13 uses the unduplicated audience and impression data of the table 1900 to de-duplicate the impression information. The example data processor 1318 of FIG. 13 determines the unduplicated audience for each demographic group of FIG. 19 by summing the unique audiences reported by the partners 1310, 1314 for that demographic group (e.g., the unique audiences illustrated in FIGS. 16 and 17). Similarly, the example data processor 1318 determines the unduplicated impressions for each demographic group by summing the unduplicated impressions reported by the partners 1310, 1314 for that demographic group (e.g., the unique impressions illustrated in FIGS. 16 and 17). The data processor 1318 of the illustrated example determines the unduplicated frequency by dividing the unduplicated impressions by the unduplicated audience for the corresponding demographic group.

The example duplication estimator 1320 of FIG. 13 estimates a duplication of unique audience members and/or impressions between the partners 1310, 1314 for each of the demographic groups. The estimated duplication may be different for different demographic groups. Based on the estimated duplication, the example de-duplicator 1322 of FIG. 13 de-duplicates the total unique audience, the total impressions, the reach, and/or the frequency for a campaign.

To estimate duplication (e.g., for a demographic group), the example duplication estimator 1320 of FIG. 13 selects a method of de-duplication. In the example of FIG. 13, if the data received from the panel (e.g., the panelist computers 202) for a demographic group includes cookies associated with both partners 1310, 1314 (e.g., for columns (b)-(d) of FIG. 18, column (b)+column (d)>0 for the selected demographic group and column (c)+column (d)>0 for the selected demographic group), the example duplication estimator 1320 selects a modified Danaher method. For example, the female, 18-20, demographic group of FIG. 18 has panel data representing partner A 1310 (e.g., column (b)=0.15 and column (d)=0.27, and 0.15+0.27=0.42, which is greater than 0) and has panel data representing partner B (e.g., column (c)=0.07 and column (d)=0.27, and 0.07+0.27=0.34, which is greater than 0), so the example duplication estimator 1320 of FIG. 13 selects a modified Danaher method. If any of the database proprietors are not represented in the panel data, (e.g., for columns (b)-(d) of FIG. 18, column (b)+column (d)=0 for the selected demographic group or column (c)+column (d)=0 for the selected demographic group), the example duplication estimator 1320 selects another approach such as a random approach. The example random approach is described with reference to block 1424 of FIG. 14B.

FIG. 20 is a table 2000 illustrating example correlation (e.g., proportion of overlap), example reach, example adjusted correlation (e.g., adjusted proportion of overlap), example duplicate reach, example duplicate audience, and example duplicate impression information determined by the audience measurement system of FIG. 13 using the Danaher method. In the example of FIG. 13, the correlation referred to in Danaher is replaced by (e.g., implemented using) the overlap, or proportion of overlap, between the panelists, households, and/or panelist computers that have a cookie (or other identifier) associated with a first database proprietor and the panelists, households, and/or panelist computers that have a cookie (or other identifier) associated with one or more other database proprietors. In some examples, an overlap is determined between two database proprietors, such that performing de-duplication for audience and/or impressions for data from more than two database proprietors uses multiple correlation factors. The overlap or proportion of overlap is referred to in the examples as the correlation, because the overlap may be considered to reflect a correlation, with respect to a total number of users or panelists, between the use of a first partner web site and the user of a second partner web site.

As used herein, reach is the percentage of the universe represented by the unique audience. Reach may be determined for one or more demographic groups. As used herein, duplicate reach refers to a portion of the reach that is determined to already be represented in the reach. For example, for a reach of 0.50 having a duplicate reach of 0.10, the unduplicated reach is 0.40 and 0.10 of the unduplicated reach represents the same persons (e.g., the same portion or percentage of the universe) as the duplicate reach. As used herein, a duplicate impression refers to an impression (e.g., a specific media item being presented to a specific person) that is determined to already be represented in the impressions. For example, for 1,000 impressions for which there are 100 duplicate impressions, there are 900 unduplicated impressions. 100 of the unduplicated impressions represent the same impressions as the 100 duplicate impressions. As used herein, duplicate audience and duplicate unique audience refer to persons in the audience (e.g., a unique audience member, a specific person) who are determined to already be represented in the audience. As used herein, "unduplicated" refers to being substantially free (e.g., estimated to be free or determined to be free) of duplicates. For example, unduplicated reach refers to reach that is substantially free (estimated or determined to be free) of duplicate audience.

To estimate the duplication for the demographic group using the Danaher method, the example duplication estimator 1320 of FIG. 13 determines a correlation between the reaches of the respective partners 1310, 1314. For example, the duplication estimator 1320 may use Equation 4 below, in which the variables a, b, c, and d refer to the values in columns (a), (b), (c), and (d), respectively, of a single row (e.g., demographic group) in the table 1800 of FIG. 18.

$$\text{Correlation} = \frac{ad - bc}{\sqrt{(a+b)(a+c)(b+d)(c+d)}} \quad \text{Equation 4}$$

For example, using the data illustrated in FIG. 18, the duplication estimator 1320 calculates the correlation for the male 18-20 demographic group to be (0.51*0.23−0.18*0.08)/SQRT((0.51+0.18)*(0.51+0.08)(0.18+0.23)*(D89+0.23))=0.46.

The example duplication estimator 1320 of FIG. 13 calculates an adjusted correlation for the demographic group. In the example of FIG. 13, the duplication estimator 1320 determines a reach for partner 1310 based on the panel data (PanelReach1 (PR1) or Panel DP1 reach of FIG. 20) and determines a reach for partner 1314 based on the panel data (PanelReach2 (PR2) or Panel DP2 reach of FIG. 20). The example duplication estimator 1320 determines PR1 to be the sum of the columns (b) and (d) of FIG. 18 for the associated demographic group. Similarly, the duplication estimator 1320 determines PR2 to be the sum of the columns (c) and (d) of FIG. 18 for the associated demographic group.

The example duplication estimator 1320 further determines the campaign-based reach for the partner A 1310 as CampaignReach1 (CR1) (from the reach column of FIG. 16 for the demographic group) and determines the campaign-based reach for the partner B 1314 as CampaignReach2 (CR2) (from the reach column of FIG. 17 for the demographic group).

The example duplication estimator 1320 of FIG. 13 determines the adjusted correlation for each demographic group based on an adjustment factor (e.g., using PR1, PR2, CR1, and CR2) and the calculated correlation for the demographic group. In the example of FIG. 13, the adjusted correlation is calculated differently (e.g., using a designated one of Equations 5-8 below) based on the relationship between PR1 and CR1 and the relationship between PR2 and CR2.

Adjusted Correlation = {if $PR1 \leq CR1$ and $PR2 \leq CR2$, Equation 5
$$AdjustedCorrelation = Correlation * \sqrt{\frac{PR1 * PR2(1-CR1)(1-CR2)}{(1-PR1)(1-PR2)CR1*CR2}}$$

if $PR1 \leq CR1$ and $PR2 > CR2$, Equation 6
$$AdjustedCorrelation = Correlation * \sqrt{\frac{PR1(1-PR2)*(1-CR1)CR2}{(1-PR1)PR2*CR1(1-CR2)}}$$

if $PR1 > CR1$ and $PR2 \leq CR2$, Equation 7
$$AdjustedCorrelation = Correlation * \sqrt{\frac{(1-PR1)PR2*CR1(1-CR2)}{PR1(1-PR2)(1-CR1)CR2}}$$

if $PR1 > CR1$ and $PR2 > CR2$, Equation 8
$$AdjustedCorrelation = Correlation * \sqrt{\frac{(1-PR1)(1-PR2)CR1*CR2}{PR1*PR2(1-CR1)(1-CR2)}} \}$$

Using the adjusted correlation for the demographic group, the example duplication estimator 1320 of FIG. 13 determines a duplicate reach for the demographic group. The example duplicate reach is shown in FIG. 20 and may be determined using Equation 9 below.

$$\text{Duplicate Reach} = PR1 * PR2 \frac{1 + AdjCorr(1-PR1)(1-PR2)}{\sqrt{PR1(1-PR1)PR2(1-PR2)}} \quad \text{Equation 9}$$

The duplication estimator 1320 of the illustrated example determines a duplicate audience and/or duplicate impressions based on the duplicate reach. For example, the duplication estimator 1320 of FIG. 13 multiplies the duplicate reach by the universe estimate to determine (e.g., estimate) a number of unique audience members that are duplicated. The example duplication estimator 1320 multiplies the duplicate audience by the unduplicated frequency (e.g., the frequency of FIG. 19) to determine the duplicate impressions. The example correlation, adjusted correlation, duplicate reach, duplicate audience, and duplicate impressions calculated using the values from FIGS. 15-19 as explained above are illustrated in the table 2000 of FIG. 20.

After determining the duplicate impression information, the example de-duplicator 1322 of FIG. 13 de-duplicates the impression information (e.g., the audience and/or the impressions) to generate unduplicated (or de-duplicated) impression information (e.g., de-duplicated unique audience, de-duplicated impressions, demographic information, etc.). For example, the de-duplicator 1322 subtracts the duplicate audience from the sum of the audiences of the database proprietors to determine the unduplicated audience. Similarly, the example de-duplicator 1322 of FIG. 13 subtracts the duplicate impressions from the sum of the impressions of the database proprietors to determine the unduplicated impressions.

FIG. 21 is a table 2100 illustrating example duplicate reach, duplicate audience, and duplicate impression information determined by the impression monitor 1306 of FIG. 13 using a random duplication approach. The example impression monitor 1306 of FIG. 13 uses the random duplication approach when, for example, all or a portion of the panel does not have cookies associated with one or both of the partners 1310, 1314.

The example duplication estimator 1320 of FIG. 13 estimates a duplicate reach for a demographic group using the random duplication approach by multiplying the reach of the first partner 1310 (from FIG. 16) and the reach of the second partner 1314 (from FIG. 17). The duplication estimator 1320 multiplies the duplicate reach by the universe estimate to estimate a duplicate unique audience. The duplication estimator 1320 of the illustrated example determines the duplicate impressions by multiplying the duplicate unique audience by the frequency of FIG. 19. The example de-duplicator 1322 of FIG. 13 de-duplicates the impression information as described above based on the duplicate unique audience and the duplicate impressions.

The example duplication estimator 1320 of FIG. 13 calculates the duplicate audience and the duplicate impressions of FIGS. 20 and 21 based on the monthly universe estimate associated with the panel data from FIG. 15. By using the monthly universe estimate, the example duplication estimator 1320 uses a same scale as for calculating the example correlation, the example reach of the database proprietors in the panel, the example adjusted correlation, and the example duplicated reach of FIGS. 20 and 21. In contrast, the example de-duplicator 1322 of FIG. 13 refers to an annual universe estimate to determine the unduplicated reach in the example table 2200 of FIG. 22. By using the universe estimate that is determined independently from the panel data, the example de-duplicator 1322 may achieve a more accurate calculation of an audience for a media campaign (e.g., a calculation that is scaled independently from the panel estimates).

FIG. 22 is a table 2200 illustrating example unduplicated audience, example impression, example reach, and example frequency information determined by the impression monitor 1306 of FIG. 13. The example impression monitor 1306 determines an unduplicated audience by subtracting the duplicate unique audience of FIG. 21 from the total audience of FIG. 19 (e.g., the sum of the unique audiences from the partners 1310, 1314). Similarly, the example impression monitor 1306 determines unduplicated impressions by subtracting the duplicate impressions of FIG. 21 from the total impressions of FIG. 19 (e.g., the sum of the impressions from the partners 1310, 1314).

Using the unduplicated audience and unduplicated impressions, the example impression monitor 1306 of FIG. 13 determines the reach and frequency of the unduplicated impression information. The example impression monitor 1306 of the illustrated example determines the reach by dividing the unduplicated audience by the universe estimate.

The example impression monitor 1306 of FIG. 13 determines the frequency by dividing the unduplicated impressions by the unduplicated audience.

The resulting table 2200 of FIG. 22 provides the audience and impression information for a media campaign based on data received from multiple database proprietors. By de-duplicating the impression information as described herein, the example impression monitor 1306 of FIG. 13 provides a more accurate report regarding the relative representations of the demographic groups (e.g., by utilizing the demographic knowledge of multiple database proprietors and by reducing overcounting of some demographic groups more than others). The example impression monitor 1306 of FIG. 13 also reduces overall overcounting of audience and/or impressions for the media campaign, thereby more accurately representing the level of success of the media campaign.

While an example manner of implementing the impression monitor 1306 is illustrated in FIG. 13, one or more of the elements, processes and/or devices illustrated in FIG. 13 may be combined, divided, re-arranged, omitted, eliminated and/or implemented in any other way. Further, the example data collector 1316, the example panel data processor 1318, the example duplication estimator 1320, the example de-duplicator 1322 and/or, more generally, the example impression monitor 1306 of FIG. 13 may be implemented by hardware, software, firmware and/or any combination of hardware, software and/or firmware. Thus, for example, any of the example data collector 1316, the example panel data processor 1318, the example duplication estimator 1320, the example de-duplicator 1322 and/or, more generally, the example impression monitor 1306 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data collector 1316, the example panel data processor 1318, the example duplication estimator 1320, and/or the example de-duplicator 1322 is/are hereby expressly defined to include a tangible computer readable storage device or storage disk such as a memory, a digital versatile disk (DVD), a compact disk (CD), a Blu-ray disk, etc. storing the software and/or firmware. Further still, the example ratings entity subsystem 106 of FIGS. 1 and 2 may include one or more elements, processes and/or devices in addition to, or instead of, those illustrated in FIGS. 1 and 2, and/or may include more than one of any or all of the illustrated elements, processes and devices.

Figure 14A:
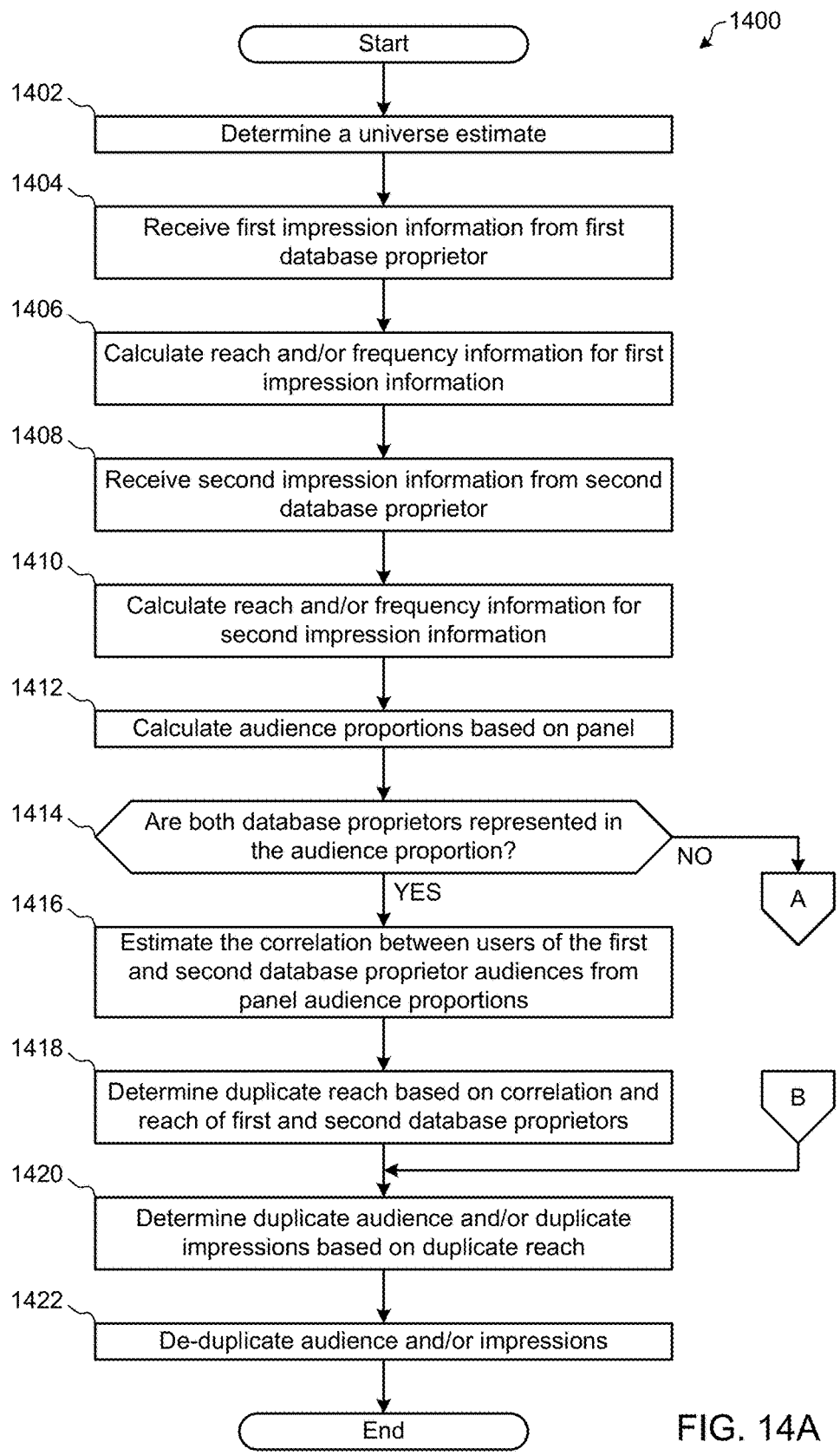
FIGS. 14A and 14B collectively show a flowchart representative of example machine readable instructions that may be executed to implement the example audience measurement system of FIG. 13 to de-duplicate audience and/or impressions received from multiple database proprietors.
Figure 14B:
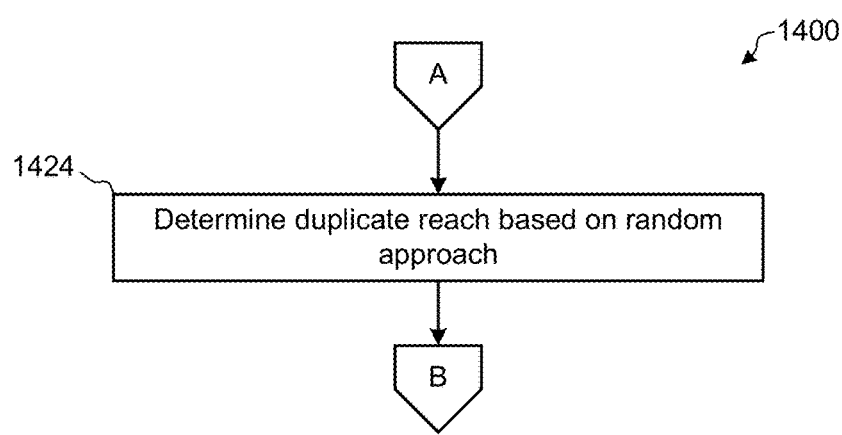

FIGS. 14A and 14B collectively illustrate a flowchart representative of example machine readable instructions 1400 that may be executed to implement the example impression monitor 1306 of FIG. 13 to de-duplicate audience and/or impression information received from multiple database proprietors (e.g., partners 1310, 1314 of FIG. 13). The example instructions 1400 are described below with reference to an example one of the demographic groups used in the example tables of FIGS. 15-22. The instructions 1400 may be executed (e.g., in an iterative form) for additional groups. However, the instructions 1400 may be applied to any other demographic group, division of audience members, or to the undivided impression information.

The example impression monitor 1306 of FIG. 13 (e.g., via the data collector 1316) determines a universe estimate for the demographic group (block 1402). For example, the data collector 1316 may request and/or receive one or more universe estimates of estimated total numbers of persons in the demographic group in a population. In some examples, the universe estimate is limited to a population within a geographic area of interest.

The example data collector 1316 of FIG. 13 receives first impression information (e.g., a number of impressions, a number of unique audience members, and/or associated demographic information for the impressions) from a first database proprietor (e.g., the partner 1310) (block 1404). For example, the data collector 1316 may receive impression information represented by the table 1600 of FIG. 16. The example data processor 1318 calculates reach and/or frequency information from the first impression information (block 1406). The example data collector 1316 also receives second impression information from a second database proprietor (e.g., partner 1314) (block 1408). For example, the data collector 1316 may receive impression information represented by the table 1700 of FIG. 17. The example data processor 1318 also calculates reach and/or frequency information from the second impression information (block 1410). In some examples, the data collector 1316 receives impression information from additional database proprietors and/or the data processor 1318 determines the reach and/or frequency from the second impression information.

The example data processor 1318 of FIG. 13 calculates audience proportions based on a panel (e.g., information from the panelist computers 202 of FIG. 2) (block 1412). For example, the data processor 1318 may calculate the proportions of the audience having cookies for one or more of the partners 1310, 1314 to generate the data in the table 1800 of FIG. 18. As an example, the data processor 1318 determines the value of column (b) for a demographic group to be the proportion of the panelist computers 202 on which a cookie associated with partner A 1310 was identified and a cookie associated with partner B 1314 was not identified.

The example de-duplicator 1322 of FIG. 13 determines whether both database proprietors (partners 1310, 1314) are represented in the audience proportion (block 1414). A database proprietor is considered to be represented in the panel when at least a threshold number of panelist computers 202 include cookies for the database proprietor. For example, the de-duplicator 1322 may determine whether the sum of columns (b) and (d) of FIG. 18 (e.g., representative of cookies associated with the partner A 1310 being identified in the panelist computers) and the sum of columns (c) and (d) of FIG. 18 (e.g., representative of cookies associated with the partner B 1314 being identified in the panelist computers) are both greater than 0. If both database proprietors are represented (block 1414), the example de-duplicator 1322 estimates the correlation (e.g., proportion of overlap) of users between the first and second database proprietor audiences from the panel audience proportions (block 1416). For example, the de-duplicator 1322 may determine the correlation and/or the adjusted correlation (e.g., adjusted proportion of overlap) between the database proprietors using Equations 2, 4, 5, 6, 7, and/or 8 as described above.

The example de-duplicator 1322 determines the duplicate reach based on the correlation and the reach of the database proprietors (block 1418). For example, the de-duplicator 1322 may use Equation 9 to determine the duplicate reach.

Returning to block 1414, if one or more database proprietors are not represented in the audience proportion, the example de-duplicator 1322 determines the duplicate audience and/or duplicate impressions using another method, such as a random duplication method. Turning to FIG. 14B, in the example random duplication approach, the de-duplicator 1322 determines a duplicate reach by multiplying the reach of the first database proprietor by the reach of the second database proprietor (block 1424). Control may then proceed to block 1420 of FIG. 14A to continue determining the duplicate audience and/or the duplicate impressions based on the duplicate reach.

Returning to FIG. 14A, the de-duplicator 1322 of the illustrated example determines a duplicate audience and/or duplicate impressions based on the duplicate reach (block 1420). For example, the de-duplicator 1322 multiplies the duplicate reach by the universe estimate to determine a number of unique audience members that are duplicated. The de-duplicator 1322 multiplies the duplicate audience by the unduplicated frequency to determine the duplicate impressions. Example correlation values, example adjusted correlation values, example duplicate reach values, example duplicate audience values, and example duplicate impression values are illustrated in the table 2000 of FIG. 20.

The example de-duplicator 1322 de-duplicates the impression information (e.g., the audience and/or the impression) (block 1422). For example, the de-duplicator 1322 subtracts the duplicate audience from the sum of the audiences of the database proprietors to determine the unduplicated audience. Similarly, the example de-duplicator 1322 subtracts the duplicate impressions from the sum of the impressions of the database proprietors to determine the unduplicated impressions.

After de-duplicating the impression information, the example instructions 1400 end. In other examples, the example instructions 1400 return control to block 1402 to iterate for another demographic group.

Figure 23:
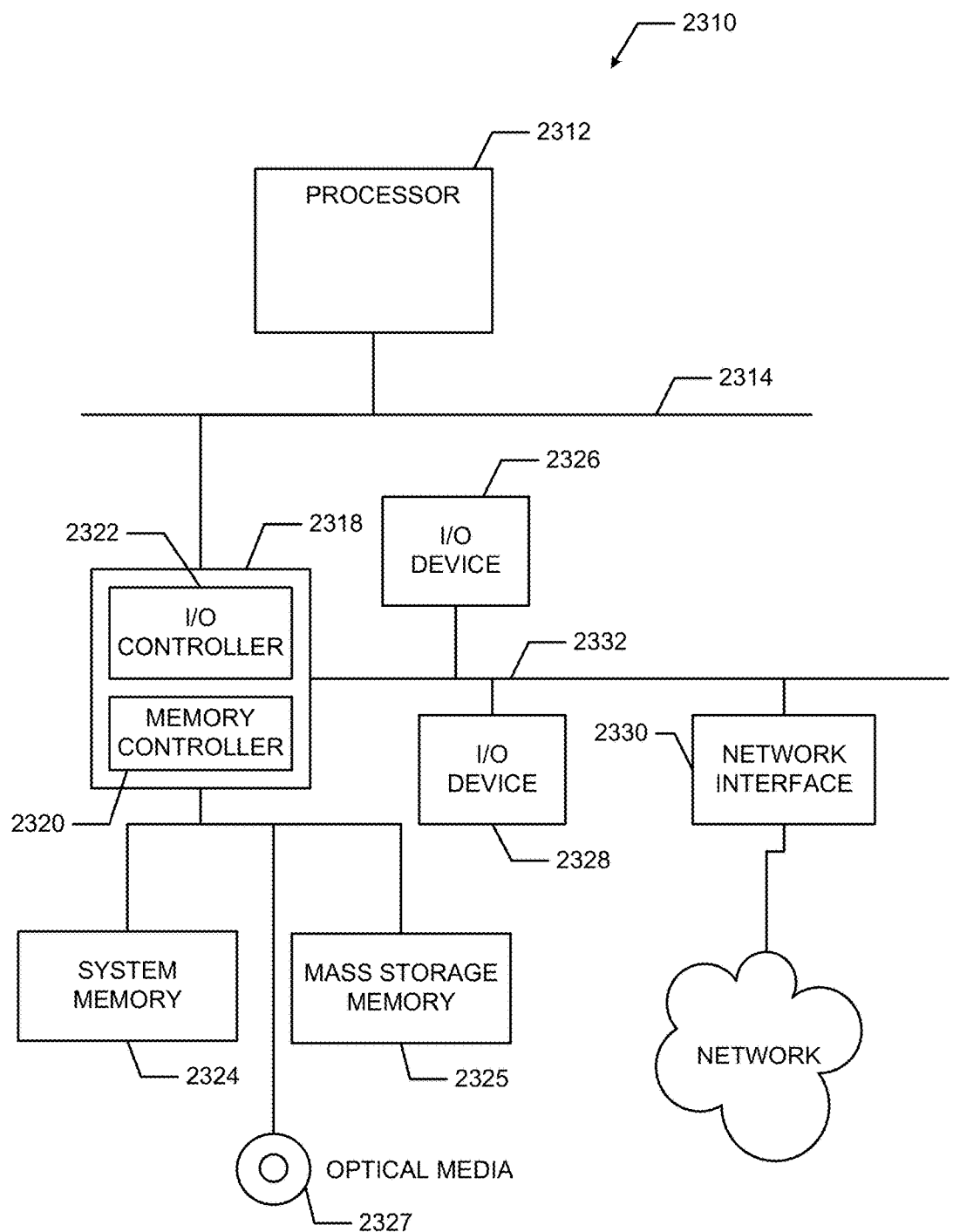
FIG. 23 is an example processor system that can be used to execute the example instructions of FIGS. 9, 10, 11, 12, and 14A-14B to implement the example impression monitor system, the example rules/ML engine, the example HTTP server communication interface, the example publisher/campaign/user target database, the example GRP report generator, the example panel collection platform, the example collector, the example loader, the example ratings entity database, the example panelist computers, the example client computers, the example impression monitor, the example data collector, the example data processor, the example duplication estimator, and/or the example de-duplicator disclosed herein.

FIG. 23 is a block diagram of an example processor system 2310 that may be used to implement the example impression monitor system 132, the example rules/ML engine 230, the example HTTP server communication interface 232, the example publisher/campaign/user target database 232, the example GRP report generator 130, the example panel collection platform 210, the example collector 117, the example loader 118, the example ratings entity database 120, the example panelist computer(s) 202, the example client computer 1304, the example impression monitor 1306, the example data collector 1316, the example panel data processor 1318, the example duplication estimator 1320, and/or the example de-duplicator 1322 disclosed herein. As shown in FIG. 23, the processor system 2310 includes a processor 2312 that is coupled to an interconnection bus 2314. The processor 2312 may be any suitable processor, processing unit, or microprocessor. Although not shown in FIG. 23, the system 2310 may be a multi-processor system and, thus, may include one or more additional processors that are identical or similar to the processor 2312 and that are communicatively coupled to the interconnection bus 2314.

The processor 2312 of FIG. 23 is coupled to a chipset 2318, which includes a memory controller 2320 and an input/output (I/O) controller 2322. A chipset provides I/O and memory management functions as well as a plurality of general purpose and/or special purpose registers, timers, etc. that are accessible or used by one or more processors coupled to the chipset 2318. The memory controller 2320 performs functions that enable the processor 2312 (or processors if there are multiple processors) to access a system memory 2324, a mass storage memory 2325, and/or an optical media 2327.

In general, the system memory 2324 may include any desired type of volatile and/or non-volatile memory such as, for example, static random access memory (SRAM), dynamic random access memory (DRAM), flash memory, read-only memory (ROM), etc. The mass storage memory 2325 may include any desired type of mass storage device including hard disk drives, optical drives, tape storage devices, etc. The optical media 2327 may include any desired type of optical media such as a digital versatile disc (DVD), a compact disc (CD), or a blu-ray optical disc. The instructions of any of FIGS. 9-12 and/or 14A-14B may be stored on any of the tangible media represented by the system memory 2324, the mass storage device 2325, and/or any other media.

The I/O controller 2322 performs functions that enable the processor 2312 to communicate with peripheral input/output (I/O) devices 2326 and 2328 and a network interface 2330 via an I/O bus 2332. The I/O devices 2326 and 2328 may be any desired type of I/O device such as, for example, a keyboard, a video display or monitor, a mouse, etc. The network interface 2330 may be, for example, an Ethernet device, an asynchronous transfer mode (ATM) device, an 802.11 device, a digital subscriber line (DSL) modem, a cable modem, a cellular modem, etc. that enables the processor system 1310 to communicate with another processor system (e.g., via a network such as the Internet 104 of FIG. 1).

While the memory controller 2320 and the I/O controller 2322 are depicted in FIG. 23 as separate functional blocks within the chipset 2318, the functions performed by these blocks may be integrated within a single semiconductor circuit or may be implemented using two or more separate integrated circuits.

Although the foregoing discloses the use of cookies for transmitting identification information from clients to servers, any other system for transmitting identification information from clients to servers or other computers may be used. For example, identification information or any other information provided by any of the cookies disclosed herein may be provided by an Adobe Flash® client identifier, identification information stored in an HTML5 datastore, an identifier used specifically for tracking advertising or other media (e.g., an AdID), etc. The methods and apparatus described herein are not limited to implementations that employ cookies.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to de-duplicate media impression information, comprising:

receiving a plurality of first network communications at a first server from client computers, the first network communications indicative of accesses to media at the client computers;

in response to the first network communications, instructing the client computers, via redirect network communications, to send third network communications to a second server of a first database proprietor and fourth network communications to a third server of a second database proprietor, the third and fourth network communications to be indicative of the accesses to the media at the client computers, a portion of the client computers including first cookies for use by the first database proprietor to identify users that are subscribers registered with the first database proprietor, and the portion of the client computers including second cookies for use by the second database proprietor to identify the same users as subscribers registered with the second database proprietor;

determining an overlap between the first cookies of the first database proprietor and the second cookies of the second database proprietor on the portions of the client computers based on first impressions including the first cookies and logged by the second server of the first database proprietor in response to the third network communications, and based on second impressions including the second cookies and logged by the third server of the second database proprietor in response to the fourth network communications;

generate, by performing an instruction-based process using a processor, a total impressions count, by summing the first impressions logged by the first database proprietor and the second impressions logged by the second database proprietor, the total impressions count having a duplication error;

determining, using the processor, duplicate reach based on the overlap, the duplicate reach corresponding to the media for which the first and second impressions are logged in association with the first and second cookies of the first and second database proprietors;

determining, using the processor, duplicate impression information based on: (1) the first impressions logged by the first database proprietor, (2) the second impressions logged by the second database proprietor, (3) the duplicate reach of the first and second database proprietors and (4) the overlap between the first cookies of the first database proprietor and the second cookies of the second database proprietor; and applying the duplicate impression information to the total impressions count to correct the instruction-based process of the processor by determining a corrected total impressions count to replace the total impressions count generated by the instruction-based process thereby reducing overcounting of impressions for the media.

2. The method as defined in claim 1, wherein the determining of the overlap between the first cookies of the first database proprietor and the second cookies of the second database proprietor includes determining a number of panelist computers having the first cookie associated with the first database proprietor and the second cookie associated with the second database proprietor.

3. The method as defined in claim 1, wherein the duplicated impression information includes a number of duplicated audience members.

4. The method as defined in claim 3, wherein the determining of the corrected total impressions count includes subtracting the number of duplicated audience members from a total of first and second audience members, the first audience members being associated with the first impression information and the second audience members being associated with the second impression information.

5. The method as defined in claim 1, wherein the overlap between the first cookies of the first database proprietor and the second cookies of the second database proprietor on the client computers includes a proportion of overlap.

6. The method as defined in claim 1, wherein the duplicate impression information includes a number of duplicated impressions, and the determining of the corrected total impressions count includes subtracting the number of duplicated impressions from a sum of the first impressions of the media collected by the first database proprietor and the second impressions of the media collected by the second database proprietor.

7. The method as defined in claim 1, wherein the duplicated impression information includes a number of duplicated impressions, the method further including determining the number of duplicated impressions by multiplying a number of duplicated audience members by a measured frequency.

8. An apparatus to de-duplicate media impression information, comprising:

a data collector to:
  receive a plurality of first network communications at a first server from client computers, the first network communications indicative of accesses to media at the client computers;
  in response to the first network communications, instructing the client computers, via redirect network communications, to send third network communications to a second server of a first database proprietor and fourth network communications to a third server of a second database proprietor, the third and fourth network communications to be indicative of the accesses to the media at the client computers, a portion of the client computers including first cookies for use by the first database proprietor to identify users that are subscribers registered with the first database proprietor, and the portion of the client computers including second cookies for use by the second database proprietor to identify the same users as subscribers registered with the second database proprietor;

a duplication estimator to:
  determine an overlap between the first cookies of the first database proprietor and the second cookies of the second database proprietor on the portions of the client computers based on first impressions including the first cookies and logged by the second server of the first database proprietor in response to the third network communications, and based on second impressions including the second cookies and logged by the third server of the second database proprietor in response to the fourth network communications;
  generate, by performing an instruction-based process using a processor, a total impressions count, by summing the first impressions logged by the first database proprietor and the second impressions logged by the second database proprietor, the total impressions count having a duplication error;
  determine duplicate impression information based on the first impressions logged by the first database proprietor, the second impressions logged by the second database proprietor, duplicate reach of the first and second database proprietors based on the overlap, the duplicate reach corresponding to the media associated with the first and second impression information; and a de-duplicator to apply the duplicate impression information to the total impressions count to correct the instruction-based process of the processor by determining a corrected total impressions count to replace the total impressions count generated by the instruction-based process thereby reducing overcounting of impressions for the media, at least one of the data collector, the duplication estimator and the de-duplicator implemented with memory coupled to a processor.

9. The apparatus as defined in claim 8, further including a panel data processor to determine a number of panelist computers having both the first cookie associated with the first database proprietor and the second cookie associated with the second database proprietor, the duplication estimator to determine the overlap between the first cookies of the first database proprietor and the second cookies of the second database proprietor for the client computers based on the number of the panelist computers determined by the panel data processor to have both the first cookie and the second cookie.

10. The apparatus as defined in claim 8, wherein the duplicated impression information includes a number of duplicated audience members.

11. The apparatus as defined in claim 10, wherein the de-duplicator is to determine the corrected total impressions count by subtracting the number of duplicated audience members from a total of first and second audience members, the first audience members being associated with the first impression information and the second audience members being associated with the second impression information.

12. The apparatus as defined in claim 8, wherein the duplicated impression information includes a number of duplicated impressions.

13. The apparatus as defined in claim 8, wherein the de-duplicator is to determine the corrected total impressions count by subtracting a number of duplicated impressions from a sum of the first impressions collected by the first database proprietor and the second impressions collected by the second database proprietor.

14. The apparatus as defined in claim 8, wherein the duplication estimator is to determine a number of duplicated impressions by multiplying a number of duplicated audience members by a measured frequency.

15. A non-transitory machine readable storage medium comprising machine readable instructions which, when executed, cause a processor of a first server to at least:
receive a plurality of first network communications from client computers, the first network communications indicative of accesses to media at the client computers;
in response to the first network communications, instructing the client computers, via redirect network communications, to send third network communications to a second server of a first database proprietor and fourth network communications to a third server of a second database proprietor, the third and fourth network communications to be indicative of the accesses to the media at the client computers, a portion of the client computers including first cookies for use by the first database proprietor to identify users that are subscribers registered with the first database proprietor, and the portion of the client computers including second cookies for use by the second database proprietor to identify the same users as subscribers registered with the second database proprietor;
determine an overlap between the first cookies of the first database proprietor and the second cookies of the second database proprietor on the portions of the client computers based on first impressions including the first cookies and logged by the second server of the first database proprietor in response to the third network communications, and based on second impressions including the second cookies and logged by the third server of the second database proprietor in response to the fourth network communications;
generate, by performing an instruction-based process using the processor, a total impressions count, by summing the first impressions logged by the first database proprietor and the second impressions logged by the second database proprietor, the total impressions count having a duplication error;
determine duplicate reach based on the overlap, the duplicate reach corresponding to the media for which the first and second impressions are logged in association with the first and second cookies of the first and second database proprietors;
determine duplicate impression information based on the first impressions logged by the first database proprietor, the second impressions logged by the second database proprietor, the duplicate reach of the first and second database proprietors and the overlap; and
applying the duplicate impression information to the total impressions count to correct the instruction-based process of the processor by determining a corrected total impressions count to replace the total impressions count generated by the instruction-based process thereby reducing overcounting of impressions for the media.

16. The storage device as defined in claim 15, wherein the instructions are to cause the processor to determine the overlap between the first cookies of the first database proprietor and the second cookies of the second database proprietor by determining a proportion of panelist computers having the first cookie associated with the first database proprietor and the second cookie associated with the second database proprietor.

17. The storage device as defined in claim 15, wherein the duplicated impression information includes at least one of a number of duplicated audience members.

18. The storage device as defined in claim 15, wherein the overlap between the first cookies of the first database proprietor and the second cookies of the second database proprietor on the client computers includes a proportion of overlap.

19. The storage device as defined in claim 15, wherein the duplicated impression information includes a number of duplicated impressions, and the instructions are to cause the processor to determine the number of duplicated impressions by multiplying a number of duplicated audience members by a measured impression frequency.

20. The storage device as defined in claim 15, wherein the duplicated impression information includes a number of duplicated impressions, and the instructions are to cause the processor to determine a measured impression frequency from an audience measurement panel.

* * * * *